US012434340B2

(12) United States Patent
Ward

(10) Patent No.: US 12,434,340 B2
(45) Date of Patent: Oct. 7, 2025

(54) CONCENTRATED LONGITUDINAL ACOUSTICAL/ULTRASONIC ENERGY FASTENER DESIGN AND MANIPULATION SYSTEM HAVING AT LEAST ONE OR A PLURALITY OF FLEXIBLE ULTRASONIC JOINTS

(71) Applicant: Gary Lee Ward, Pleasant Hill, OH (US)

(72) Inventor: Gary Lee Ward, Pleasant Hill, OH (US)

( * ) Notice: Subject to any disclaimer, the term of this patent is extended or adjusted under 35 U.S.C. 154(b) by 301 days.

(21) Appl. No.: 18/056,832

(22) Filed: Nov. 18, 2022

(65) Prior Publication Data

US 2023/0083901 A1 Mar. 16, 2023

Related U.S. Application Data

(63) Continuation-in-part of application No. 17/324,770, filed on May 19, 2021, now Pat. No. 11,890,728.

(51) Int. Cl.
*B23P 25/00* (2006.01)
*B23P 19/06* (2006.01)
*B25B 21/00* (2006.01)

(52) U.S. Cl.
CPC ............... *B23P 25/00* (2013.01); *B23P 19/06* (2013.01); *B25B 21/00* (2013.01)

(58) Field of Classification Search
CPC ....... B25B 21/00; B25B 21/023; B25B 23/00; B25B 23/12; B25D 11/064; B23P 19/06; B23P 25/00; A61B 17/1624; A61B 17/8875; A61B 17/8886; A61C 1/07; A61C 17/20; B06B 1/00; B06B 3/00; G10K 11/004; F16B 23/00; F16B 31/00
See application file for complete search history.

(56) References Cited

U.S. PATENT DOCUMENTS

| | | | | |
|---|---|---|---|---|
| 1,882,399 A | | 10/1932 | Pierce | |
| 2,220,711 A | | 11/1940 | Fitch | |
| 2,539,678 A | | 1/1951 | Thomas | |
| 2,616,223 A | | 11/1952 | Jonker | |
| 2,623,427 A | * | 12/1952 | Ornstein | B25B 13/481 81/3.43 |

(Continued)

FOREIGN PATENT DOCUMENTS

| | | | |
|---|---|---|---|
| CN | 101041233 | | 9/2007 |
| CN | 109175982 | A | 1/2019 |

(Continued)

*Primary Examiner* — Robert J Scruggs
(74) *Attorney, Agent, or Firm* — Jacox, Meckstroth & Jenkins

(57) ABSTRACT

A system and method and fastening tool that utilizes ultrasonic or acoustic energy and a horn that focuses the energy into the fastener at a predetermined location in order to facilitate tightening or loosening the fastener. The system, method and fastening tool comprise at least one flexible ultrasonic joint that permits a horn in the fastener tool to pivot in at least one or a plurality of planes and at least partially about at least one or a plurality of axes. The at least one flexible ultrasonic joint is adapted to facilitate transfer and focus of the ultrasonic energy through the tool and toward the fastener utilizing specially designed surfaces and a "dry" or "wet" environment.

102 Claims, 35 Drawing Sheets

(56) References Cited

U.S. PATENT DOCUMENTS

| | | | | |
|---|---|---|---|---|
| 2,834,158 | A | 5/1958 | Petermann | |
| 2,967,302 | A | 1/1961 | Loveless | |
| 2,982,255 | A | 5/1961 | Klenck | |
| 3,208,134 | A | 9/1965 | Krewson, Jr. | |
| 3,368,085 | A * | 2/1968 | Dettloff | B06B 3/00 59/51 |
| 3,485,307 | A | 12/1969 | Riley, Jr. et al. | |
| 3,521,348 | A * | 7/1970 | Pruder et al. | B25B 21/00 228/1.1 |
| 3,861,250 | A | 1/1975 | Zugai | |
| 4,728,843 | A | 3/1988 | Mishiro | |
| 4,771,661 | A | 9/1988 | Levchenko et al. | |
| 4,807,349 | A | 2/1989 | Blackmore | |
| 4,812,697 | A | 3/1989 | Mishiro | |
| 4,876,929 | A | 10/1989 | Kozak | |
| 4,958,541 | A | 9/1990 | Annis et al. | |
| 4,965,482 | A | 10/1990 | Ohnishi et al. | |
| 5,083,358 | A | 1/1992 | Jones et al. | |
| 5,774,978 | A | 7/1998 | Ishii | |
| 6,204,592 | B1 * | 3/2001 | Hur | A61C 1/07 310/323.12 |
| 6,421,902 | B1 | 7/2002 | Loffler | |
| 6,681,663 | B1 | 1/2004 | Hsien | |
| 7,392,727 | B1 | 7/2008 | Chiang | |
| 11,890,728 | B2 * | 2/2024 | Ward | B25B 23/14 |
| 2007/0157736 | A1 | 7/2007 | Kawano et al. | |
| 2007/0193420 | A1 | 8/2007 | Van Baal | |
| 2007/0289759 | A1 | 12/2007 | Hartmann et al. | |
| 2008/0134845 | A1 | 6/2008 | Shiao | |
| 2009/0066192 | A1 | 3/2009 | Taki et al. | |
| 2009/0208308 | A1 | 8/2009 | Kawano et al. | |
| 2009/0229846 | A1 | 9/2009 | Kawano et al. | |
| 2012/0024553 | A1 | 2/2012 | Speranza | |
| 2012/0292367 | A1 | 11/2012 | Morgan et al. | |
| 2013/0192389 | A1 | 8/2013 | Carlin et al. | |
| 2014/0069240 | A1 | 3/2014 | Dauvin et al. | |
| 2014/0188144 | A1 | 7/2014 | Taniguchi | |
| 2014/0284371 | A1 | 9/2014 | Morgan et al. | |
| 2014/0296873 | A1 | 10/2014 | Morgan et al. | |
| 2014/0296874 | A1 | 10/2014 | Morgan et al. | |
| 2014/0303645 | A1 | 10/2014 | Morgan et al. | |
| 2014/0303646 | A1 | 10/2014 | Morgan et al. | |
| 2015/0041169 | A1 | 2/2015 | Kumagai et al. | |
| 2016/0256229 | A1 | 9/2016 | Morgan et al. | |
| 2016/0262745 | A1 | 9/2016 | Morgan et al. | |
| 2017/0196558 | A1 | 7/2017 | Morgan et al. | |
| 2017/0238928 | A1 | 8/2017 | Morgan et al. | |
| 2017/0311944 | A1 | 11/2017 | Morgan et al. | |
| 2017/0319201 | A1 | 11/2017 | Morgan et al. | |
| 2017/0333034 | A1 | 11/2017 | Morgan et al. | |
| 2017/0333035 | A1 | 11/2017 | Morgan et al. | |
| 2019/0105036 | A1 | 4/2019 | Morgan et al. | |
| 2019/0105037 | A1 | 4/2019 | Morgan et al. | |
| 2019/0105039 | A1 | 4/2019 | Morgan et al. | |
| 2019/0120275 | A1 | 4/2019 | Junkers et al. | |
| 2019/0290264 | A1 | 9/2019 | Morgan et al. | |
| 2019/0343515 | A1 * | 11/2019 | Morgan | A61B 34/25 |
| 2020/0246187 | A1 * | 8/2020 | Yan | A61F 9/00745 |
| 2020/0367886 | A1 | 11/2020 | Shelton, IV et al. | |
| 2021/0085313 | A1 | 3/2021 | Morgan et al. | |
| 2021/0299832 | A1 * | 9/2021 | Abbott | B25F 5/00 |
| 2021/0301880 | A1 * | 9/2021 | Su | F16D 3/20 |
| 2023/0083901 | A1 | 3/2023 | Ward | |

FOREIGN PATENT DOCUMENTS

| | | | |
|---|---|---|---|
| GB | 2483072 | A | 2/2012 |
| GB | 2512320 | B | 10/2019 |
| WO | 2006025736 | A1 | 3/2006 |
| WO | 2016176518 | A3 | 12/2016 |

* cited by examiner

CONCENTRATED LONGITUDINAL ACOUSTICAL/ULTRASONIC ENERGY FASTENER DESIGN AND MANIPULATION SYSTEM HAVING AT LEAST ONE OR A PLURALITY OF FLEXIBLE ULTRASONIC JOINTS

CROSS-REFERENCE TO RELATED APPLICATIONS

The present application is a continuation-in-part of U.S. application Ser. No. 17/324,770, filed May 19, 2021, which application is incorporated herein by reference and made a part hereof.

BACKGROUND OF THE INVENTION

1. Field of the Invention

This invention relates to a system and method for loosening or fastening a fastener using ultrasonic or acoustic energy. This invention also relates to an optimal fastener design feature to accept ultrasonic or acoustic energy. This invention also relates to an optimal fastener design that includes features to accept ultrasonic and acoustic energy and to provide a tool which has a horn that can pivot in at least one or a plurality of axes.

2. Description of the Related Art

Various devices for loosening a threaded connection are known from U.S. Pat. Nos. 3,485,307; 3,861,250; 4,771,661; 4,807,349: 4,812,697; 5,083,358; 6,681,663 and U.S. Publication Nos. 2007/0193420; 2009/0229846 and 2012/0024553. As shown, many relate to vibrations/impact mechanisms that are driven by various means, such as compressed air. It is generally known to persons skilled in the art, especially in the automotive, engine, and airplane technology industries, that fasteners, screws, nuts, or bolts are oftentimes seized and are difficult to remove from the part. This is due to a number of factors, such as corrosion occurring between the threads of the fasteners, screws, nuts, or bolts and the threads of the structure to which they are threadably mounted. In some applications, carbon deposits and foreign debris can build up and slowly "eat away" at the various metals, such as aluminum, titanium, and steel. When fasteners, screws, nuts, or bolts are unloosened, there is a risk of the fastener head and/or nut breaking during removal, leaving the remaining fastener in the threaded opening.

Although most attention is paid to the problem of loosening a sticking connection, and in particular threaded connections, until now none of the cited solutions have proven adequate in the airplane engine industry and/or other industries (such as heavy industrial or automotive) to replace or remove fasteners, screws, nuts, or bolts with a high success rate (i.e. without the fasteners, screws, nuts, or bolts breaking during the removal procedure) especially in locations that are subject to severe conditions (i.e. high temperatures, large thermal gradience, corrosion by salt or dissimilar metals, and/or environmental sand/dust). Also, during the repeated heating and cooling cycling the parts grow and shrink at different rates which causes increased strain on the fastener which increases the likelihood of the fastener getting stuck.

There is, therefore, a need for further improvements and to provide further systems and tools particularly for loosening stuck fasteners, screws, nuts, and bolts.

The current available fastener designs are not optimized to receive acoustical or ultrasonic energies. What is also needed, therefore, is an improved design that facilitates acoustical or ultrasonic energy transfer to maximize the energy into the fastener.

While some of the prior art focuses on subjecting the sticking connection to axial and rotational vibrations, such as by an impact wrench and/or hammer, there is a need to provide an improved focused system and tool that increases the chances of successfully removing the fasteners, screws, nuts, and bolts.

What is needed, therefore, is an improved system, tool and method for overcoming one or more of the problems with the prior art tools of the past.

SUMMARY OF THE INVENTION

One object of the invention is to provide a system and fastening tool that comprises at least one flexible ultrasonic joint adapted to permit a pivoting of a horn so that an acoustic or ultrasonic energy may be applied.

Another object of the invention is to provide a system and method and tool that comprises a plurality of flexible ultrasonic joints.

Still another object of the invention is to provide a plurality of horns that may be used with at least one or a plurality of flexible ultrasonic joints.

Yet another object of the invention is to provide a plurality of tips that may be utilized with the fastening tool having at least one or a plurality of flexible ultrasonic joints.

Another object of the invention is to provide a system and fastening tool that may be dry coupled together with surface-to-surface contact.

Still another object of the invention is to provide a flexible ultrasonic coupler or sleeve to surround the at least one or a plurality of flexible ultrasonic joints so that an ultrasonic fluid may be used to facilitate transferring ultrasonic energy from the ultrasonic generator to the fastener.

Still another object of the invention is to provide an ultrasonic and acoustic tool having a plurality of flexible ultrasonic joints that pivot at least partially about different axes and in different planes.

Yet another object of the invention is to provide an ultrasonic fastening tool that comprises a plurality of flexible ultrasonic joints that permit a horn or top to pivot about different axes that are offset by approximately 90 degrees.

One object of the invention is to provide a system and fastening tool that is adapted to loosen or tighten a fastener using focused acoustic or ultrasonic energy.

Another object of the invention is to provide a system and method and a horn that is adapted and sized to transfer focused ultrasonic or acoustic energy to a predetermined location in the fastener.

Another object of the invention is to provide a plurality of horns each of which comprises a socket, screwdriver bit, and/or torque bit that generally have an optimized geometry and/or flat areas for performing work on a fastener.

Another object of the invention is to provide a fastening tool and system that utilizes an acoustic/ultrasonic generator for generating ultrasonic or acoustic energy that travels into the fastener and becomes concentrated or focused at a predetermined location in the fastener.

Still another object of the invention is to provide a rotational torque applicator that may be used substantially simultaneously as the ultrasonic or acoustic generator to further facilitate loosening or tightening the fastener.

Another object of the invention is to provide the ability to cycle/alternate between tightening and loosening to facilitate freeing the fastener by breaking up debris and corrosion.

Yet another object of the invention is to provide an ultrasonic or acoustic generator and horn that generates cyclic heating between the threads of the fastener and the threads of a structure that threadably receives the fastener.

Yet another object of the invention is to stretch the fastener with ultrasonic or acoustical energy which in turn raises the fastener head or nut from the surface structure.

Still another object of the invention is to provide a system and fastening tool that decreases the "break away torque or breaking force" necessary to loosen a fastener.

Still another object of the invention is to provide a system and method wherein the ultrasonic or acoustic energy is focused at a predetermined location in the fastener.

Another object of the invention is to provide a system and fastening tool wherein the predetermined targeted location is between the head and/or nut and its mating structure surface(s) along with the mating threads of the fastener and structure(s).

Still another object of the invention is to provide a horn having a horn body that either has a socket, screwdriver bit, and/or torque bit on its end or a threaded aperture adapted to receive at least one of a plurality of replaceable tips that are removably and threadably mounted to the horn body.

Yet another object of the invention is to provide a plurality of interchangeable or replaceable tips for mounting on a horn, wherein the plurality of interchangeable or replaceable tips comprises different shapes or sizes to accommodate fasteners of different shapes or sizes.

Another object of the invention is to provide a horn body that is threaded that receives at least one of the plurality of interchangeable or replaceable tips comprising mating threads and where a thread direction of the horn body threads being a direction or handedness that is generally the opposite thread direction of the threads of the fastener.

Another object of the invention is to provide a horn with at least one of the plurality of interchangeable or replaceable tips that is adapted to cause an acoustic energy in the fastener that results in a vortex or helical energy being applied to the fastener in a predetermined rotational direction.

Yet another object of the invention is to provide a system and tool that may comprise of at least one energy transfer facilitator that may comprise, but is not limited to Teflon, oil, water, gel, foam, glycol, glycerin, and/or a polymer film or a non-energy absorbing spacer.

Another object of the invention is to provide a system, method and tool that comprises of at least one flexible ultrasonic joint that transmits ultrasonic energy via at least one of a "dry" coupling or a "wet" coupling.

Still another object of the invention is to provide a system, method and tool that comprises a plurality of flexible ultrasonic joints that permits ultrasonic energy to transfer via a "dry" connection or a "wet" connection.

Yet another object of the invention is to provide a system, method and tool that utilizes ultrasonic energy and that focuses and directs the ultrasonic energy through the tool.

Another object of the invention is to provide a sleeve that may encase or envelop at least one flexible universal joint or a plurality of flexible universal joints.

Another object of the invention is to provide a system, method and tool that utilizes a single flexible ultrasonic joint that is either "wet" or "dry", depending on the application.

Another object of the invention is to provide a system, method and tool that utilizes a plurality of flexible ultrasonic joints that are either "wet" or "dry", depending on the application.

In one aspect, one embodiment of the invention comprises a fastener tool for loosening or tightening a fastener mounted on a structure, the fastener tool comprising a tool body; a horn adapted and sized to apply an acoustic or ultrasonic energy into the fastener; and an acoustic/ultrasonic generator for generating the acoustic or ultrasonic energy that passes through the horn and into the fastener to facilitate fastening or loosening the fastener; and a flexible ultrasonic joint that couples the tool body to the horn, the flexible ultrasonic joint permitting the horn to pivot about at least one predetermined axis, the flexible ultrasonic joint being adapted to transmit a rotational torque to the horn and permitting the horn to pivot so that an axis of the horn is not coaxial with an axis of the tool body while transmitting the acoustic or ultrasonic energy to the fastener.

In another aspect, another embodiment of the invention comprises a system for rotating a fastener that is fastened to a structure; the system comprising an acoustic/ultrasonic wave generator for generating an acoustic/ultrasonic signal that passes longitudinally through the fastener to elongate the fastener and to introduce a cyclic strain and heating within the fastener to reduce a frictional force between threads on the fastener and mating threads on the structure; a tool having a horn for transmitting the acoustic/ultrasonic signal into the fastener; and a flexible ultrasonic joint that couples the tool body to the horn, the flexible ultrasonic joint permitting the horn to pivot about at least one predetermined axis, the flexible ultrasonic joint being adapted to transmit a rotational torque to the horn and permitting the horn to pivot so that an axis of the horn is not coaxial with an axis of the tool body while transmitting the acoustic or ultrasonic energy to the fastener; wherein the acoustic/ultrasonic wave generator and the horn cooperate to focus or apply the acoustic/ultrasonic signal to a predetermined distance into the fastener in order to reduce a coefficient of friction between the fastener and the structure when the horn is in operative relationship with fastener and the acoustic/ultrasonic signal is applied thereto.

In still another aspect, another embodiment of the invention comprises an ultrasonic fastener tool for loosening or tightening a fastener, the ultrasonic fastener tool comprising a horn body adapted to transmit acoustic or ultrasonic energy; a horn end also adapted to transmit the acoustic or ultrasonic energy, the horn end being sized and adapted to receive at least a portion of the fastener so that the acoustic or ultrasonic energy may be applied to the fastener; and a flexible ultrasonic joint coupling the horn body to the horn end and permitting the horn end to pivot in at least one plane and at least partially about one pivot axis.

This invention, including all embodiments shown and described herein, could be used alone or together and/or in combination with one or more of the features covered by one or more of the following list of features:

The fastener tool wherein the horn comprises a generally flat surface for applying the acoustic or ultrasonic energy to the fastener.

The fastener tool wherein the fastener comprises an end that is directly or indirectly engaged by the horn during loosening or fastening when the acoustic or ultrasonic energy is applied thereto, the acoustic/ultrasonic generator generating the ultrasonic or acoustic energy that travels into the fastener and becomes concentrated or focused at a predetermined location in the fastener.

The fastener tool wherein the fastener tool comprises a rotational torque applicator for applying a rotational torque to the fastener while the ultrasonic or acoustic energy passes into the fastener; wherein the rotational torque is at least one of mechanical torque or an acoustic/ultrasonic torque that is applied substantially simultaneously as the horn causes the acoustic or ultrasonic energy to pass into the fastener.

The fastener tool wherein the horn is adapted to apply the rotational torque substantially simultaneously as the ultrasonic or acoustic energy passes into the fastener.

The fastener tool wherein the horn comprises a socket, screwdriver bit, and/or torque bit sized and adapted to receive a head and/or nut of the fastener.

The fastener tool wherein the end comprises an end that mates with a head and/or nut that engages the structure at a head and/or nut engagement area of the structure when the fastener is mounted thereto, the predetermined location being in the fastener.

The fastener tool wherein the end comprises a head and/or nut that becomes situated at a head and/or nut engagement area of the structure when the fastener is mounted thereto, the predetermined location being along a length of the fastener and downstream/upstream of the head and/or nut engagement area so that when the ultrasonic or acoustic energy is applied to the fastener, a friction or pressure between the head and/or nut mating surfaces and mating thread surfaces between the fastener and the structure is at least partly reduced.

The fastener tool wherein the fastener comprises threads that mate with mating threads at a thread-engagement location, the predetermined targeted location to be between the head and/or nut and its mating structure surface(s) along with the mating threads of the fastener and structure(s).

The fastener tool wherein the predetermined targeted location is between the head and/or nut and its mating structure surface(s) along with the mating threads of the fastener and structure(s).

The fastener tool wherein the predetermined location is between the head and/or nut and a distal end of the bolt, and a first thread of mating female threads.

The fastener tool wherein the acoustic/ultrasonic generator applies the ultrasonic or acoustic energy at a frequency equal to or larger than 1 kHz.

The fastener tool wherein the fastener has a head and/or nut, the horn being adapted and sized to receive or engage the head and/or nut to apply a tightening or loosening torque to the head and/or nut when the acoustic or ultrasonic energy passes therethrough.

The fastener tool wherein the horn comprises a socket, screwdriver bit, and/or torque bit tip that is sized and adapted to engage the head and/or nut and apply a rotational torque when the ultrasonic or acoustic energy passes into the fastener.

The fastener tool wherein the fastener tool comprises a plurality of horns that are sized and adapted for a plurality of fasteners that have a plurality of heads, respectively, of different shapes or sizes.

The fastener tool wherein the horn is configured or adapted to receive a plurality of sockets, screwdriver bits, and/or torque bit tips of different sizes so that the horn may be used to apply the ultrasonic or acoustic energy directly into and through the socket, screwdriver bit, and/or torque bit tip and into the fastener when the fastener is being tightened or loosened.

The fastener tool wherein the horn comprises a horn body; at least one replaceable tip that is removably coupled to the horn body.

The fastener tool wherein the fastener tool comprises a plurality of interchangeable or replaceable tips of different shapes or sizes to accommodate fasteners of different shapes or sizes, respectively, at least one replaceable tip being selected from the plurality of interchangeable or replaceable tips.

The fastener tool wherein the horn body comprises a plurality of replaceable tips to accommodate fasteners of different sizes.

The fastener tool wherein the horn body is threaded and at least one replaceable tip comprises mating threads, a thread direction of the horn body threads being a direction opposite the thread direction of threads of the fastener.

The fastener tool wherein the horn body is threaded and at least one replaceable tip comprises mating threads, mating thread on the horn being of a larger diameter than the mating threads on the fastener.

The fastener tool wherein at least one of the plurality of interchangeable or replaceable tips comprises a generally optimized geometry of at least a flat, conical, radial or curved fastener-engaging surface.

The fastener tool wherein the horn comprises a helical or frusto-conical surface for engaging the fastener to apply a longitudinal signal during loosening or tightening of the fastener.

The fastener tool wherein the fastener tool comprises a rotational force generator that is separate from the acoustic/ultrasonic generator, the rotational force generator generates the rotational tortional signal and force to rotate the fastener as the acoustic/ultrasonic generator generates the ultrasonic or acoustic energy that passes into the fastener.

The fastener tool wherein the end comprises a head and/or nut that engages a mating surface at a head and/or nut engagement area where the head and/or nut engages the structure when the fastener is mounted thereto, the predetermined location being downstream/upstream of the head and/or nut engagement area so that when the ultrasonic or acoustic energy is applied to the fastener, a friction or pressure between the head and/or nut and the mating surface along with mating threads between the fastener and structure is at least partly reduced.

The fastener tool wherein the fastener tool comprises an energy transfer facilitator for facilitating transferring the ultrasonic or acoustic energy into the fastener.

The fastener tool wherein the energy transfer facilitator comprises of at least one of a fluid or material and is arranged between the horn and at least one of the fastener or a socket, screwdriver bit, and/or torque bit tips mounted on the fastener, the fluid or material absorbing a minimal amount of the acoustic or ultrasonic energy traveling into the fastener.

The fastener tool wherein the energy transfer facilitator may be comprised of, but not limited, to Teflon, oil, water, gel, foam, glycol, glycerin, and/or a polymer film or a minimally energy absorbing spacer.

The fastener tool wherein the fastener tool is "dry coupled" such that any contact that surfaces carry or transmit the acoustic or ultrasonic energy to the fastener tool are in direct contact and without any energy transfer facilitation.

The fastener tool wherein the fastener is a bolt/screw and/or nut but not limited to an airplane component, large industrial, and/or automotive fastener for fastening at least two components together.

The fastener tool wherein the horn comprises a predetermined resonant frequency selected to generally correspond to the fastener resonant frequency.

The fastener tool wherein the fastener comprises at least one of a concave end surface, a convex end surface or a flat end surface.

The fastener tool wherein at least one predetermined axis comprises a first predetermined pivot axis, the flexible ultrasonic joint being adapted to permit the horn to pivot at least partially about the first predetermined pivot axis.

The fastener tool wherein the flexible ultrasonic joint is adapted to permit the horn to pivot at least partially about a plurality of predetermined pivot axes that are not coaxial with either each other or with a tool axis of the fastener tool.

The fastener wherein the flexible ultrasonic joint comprises a first flexible ultrasonic joint and a second flexible ultrasonic joint that enable the horn to pivot in a first predetermined plane and a second predetermined plane, respectively, the second predetermined plane being different from the first plane.

The fastener tool wherein the second predetermined plane is offset generally 90 degrees relative to the first predetermined plane.

The fastener tool wherein the flexible ultrasonic joint comprises a flexible ultrasonic adapter adapted to receive the horn and a flexible ultrasonic coupler adapter coupled to the tool body, the flexible ultrasonic adapter and the flexible ultrasonic coupler being pivotally coupled together to permit the horn to pivot in the first predetermined plane.

The fastener tool wherein the flexible ultrasonic joint comprises a flexible ultrasonic adapter that is adapted to define or receive the horn or at least one tip, a flexible ultrasonic coupler adapted to be coupled to the tool body, and an intermediate flexible ultrasonic coupler adapted to pivotally couple the flexible ultrasonic adapter to the flexible ultrasonic coupler, the flexible ultrasonic adapter, the flexible ultrasonic coupler and the intermediate flexible ultrasonic coupler being adapted to permit the horn to pivot or be pivoted at least partially about each of the plurality of predetermined pivot axes while substantially simultaneously applying the acoustic or ultrasonic energy that passes through the horn and into the fastener to facilitate fastening or loosening the fastener.

The fastener tool wherein the intermediate flexible ultrasonic coupler and the flexible ultrasonic coupler are adapted and configured to provide a second pivot connection to permit the horn to at least partially pivot about the first predetermined axis.

The fastener tool wherein the flexible intermediate ultrasonic adapter and the flexible ultrasonic coupler are adapted, configured and cooperate to provide a first fork and tongue coupling and a second fork and tongue coupling, the first and second fork and tongue couplings permitting the horn to at least partially pivot in the first predetermined plane about the first predetermined axis and also permitting the horn to at least partially pivot in the second predetermined plane about the second predetermined when the acoustic or ultrasonic energy passes through the horn and into the fastener to facilitate fastening or loosening the fastener.

The fastener tool wherein the flexible ultrasonic coupler comprises a first pair of legs that are generally opposed and spaced and that define a first groove therebetween, the flexible ultrasonic adapter comprising a cooperating mating male projection that is adapted and sized to be received in the first groove and to permit the flexible ultrasonic adapter to pivot in the first predetermined plane and at least partially about the first predetermined pivot axis, wherein the first predetermined pivot axis generally intersects a center axis of the fastener tool.

The fastener tool wherein the flexible ultrasonic coupler comprises a first pair of legs that are generally opposed and spaced and that define a first groove therebetween, the intermediate flexible ultrasonic coupler comprising a first end having a mating male projection adapted and sized to be received in the first groove and pivotally secured together with a first pivot pin, the intermediate flexible ultrasonic coupler comprising a second end having a second pair of legs that are generally opposed and spaced and that define a second groove therebetween, the flexible ultrasonic adapter having a first end adapted to receive the horn and a second end having a second male projection adapted and sized to be received in the second groove and pivotally secured together with a second pivot pin.

The fastener tool wherein the fastening tool comprises a sleeve for covering the flexible ultrasonic joint and for defining a fluid storage area about the flexible ultrasonic joint for storing a fluid, the fluid facilitating a transfer of the acoustic or ultrasonic energy through the horn and into the fastener to facilitate fastening or loosening the fastener.

The fastener tool wherein the sleeve is a flexible and adapted to permit the horn to pivot relative to and axis of the fastener tool and when a torque is applied to the horn.

The fastener tool wherein the flexible ultrasonic joint comprises a first pivot joint that permits the horn to pivot in a first plane.

The fastener tool wherein the flexible ultrasonic joint comprises a first pivot joint that permits the horn to pivot in a first plane and a second pivot joint that permits the horn to pivot in a second plane, the second plane being different from the first plane.

The fastener tool wherein the second plane is offset approximately 90 degrees relative to the first plane.

The fastener tool wherein the first and second pivot joints are pivot pin joints.

The fastener tool wherein the fastener tool comprises at least one of a transducer or a booster.

The system wherein the fastener comprises a head and/or nut having a shoulder (if present) that engages the structure at a shoulder engagement area of the structure, the predetermined distance being between the head and/or nut and its mating structure surface(s) along with the mating threads of the fastener and structure(s).

The system wherein an end of the fastener comprises a head and/or nut that becomes situated at a head and/or nut engagement area of the structure when the fastener is mounted thereto, a predetermined location being along a length of the fastener and downstream/upstream of the head and/or nut engagement area so that when the acoustic/ultrasonic signal is applied to the fastener, a friction or pressure between the head and/or nut and its mating surface(s) along with the mating threads of the fastener and structure(s) is at least partly reduced.

The system wherein the system comprises a rotational torque applicator adapted to apply a rotational torque to the fastener substantially simultaneously as the acoustic/ultrasonic signal passes through the fastener.

The system wherein a rotational torque applicator and the acoustic/ultrasonic wave generator are integrated into a common tool body The system wherein the horn is sized and adapted to receive a head and/or nut or end of the fastener.

The system wherein the flexible ultrasonic joint comprises a first pivot joint that permits the horn to pivot in a first plane.

The system wherein the flexible ultrasonic joint comprises a first pivot joint that permits the horn to pivot in a first plane and a second pivot joint that permits the horn to pivot in a second plane, the second plane being different from the first plane.

The system wherein the second plane is offset approximately 90 degrees relative to the first plane.

The system wherein the first and second pivot joints are pivot pin joints.

The system wherein the fastening tool comprises a sleeve for covering the flexible ultrasonic joint and for defining a storage area about the pivot joint for storing a fluid, the fluid facilitating a transfer of the acoustic or ultrasonic energy through the horn and into the fastener to facilitate fastening or loosening the fastener.

The system wherein the sleeve is a flexible and adapted to permit the horn to pivot relative to and axis of the fastener tool and when a torque is applied to the horn.

The system wherein the predetermined distance is located between the head and/or nut and its mating structure surface(s) along with the mating threads of the fastener and structure(s).

The system wherein the horn comprises a socket, screwdriver bit, and/or torque bit tip that is sized and adapted to engage the head and/or nut and apply a rotational torque when the acoustic/ultrasonic signal passes into the fastener.

The system wherein the system comprises a plurality of horns that are sized and adapted for a plurality of fasteners that have a plurality of heads respectively, of different shapes or sizes.

The system wherein the horn is configured or adapted to receive a plurality of sockets, screwdriver bits, and/or torque bit tips of different sizes so that the horn may be used to apply the acoustic/ultrasonic signal directly into and through the socket, screwdriver bit, and/or torque bit tips and into the fastener when the fastener is being tightened or loosened.

The system wherein the horn comprises a horn end; at least one replaceable tip removably coupled to the horn end.

The system wherein the horn body comprises a plurality of replaceable tips to accommodate fasteners of different sizes.

The system wherein the horn body comprises a threaded aperture and the at least one replaceable tip comprises mating threads, a thread direction of the threads of the horn body being a direction opposite a thread direction of threads of the fastener.

The system wherein the horn body is threaded and the at least one replaceable tip comprises mating threads, the horn body threaded diameter being larger than the fastener threaded diameter.

The system wherein the fastener comprises an end that is engaged by the horn during loosening or fastening, the acoustic/ultrasonic generator generating the acoustic/ultrasonic signal that travels into the fastener, the predetermined distance becomes concentrated or focused at a predetermined location in the fastener.

The system wherein the end comprises a head and/or nut that engages a mating surface of the structure at a head and/or nut engagement area where the head and/or nut engages the structure when the fastener is mounted thereto, the predetermined location being downstream/upstream of the head and/or nut engagement area so that when the acoustic/ultrasonic signal is applied to the fastener, a friction or pressure between the head and/or nut and its mating surface(s) along with the mating threads of the fastener and structure(s) is at least partly reduced.

The system wherein the horn is configured or adapted to receive a plurality of sockets, screwdriver bits, and/or torque bit tips of different shapes and sizes so that the horn may be used to apply the acoustic/ultrasonic signal directly into and through the socket, screwdriver bit, and/or torque bit tips and into the fastener when the fastener is being tightened or loosened.

The system wherein the acoustic/ultrasonic generator applies the acoustic/ultrasonic signal at a frequency equal to or larger than 1 kHz.

The system wherein the fastener has a head and/or nut, the horn comprises an end that is adapted and sized to receive the head and/or nut and to apply a tightening or fastening torque to the head and/or nut while the acoustic/ultrasonic signal passes therethrough.

The system wherein the tool comprises a plurality of horns that are sized and adapted for a plurality of fasteners that have a plurality of heads, respectively, of different shapes or sizes.

The system wherein the system comprises an energy transfer facilitator for facilitating transferring the acoustic/ultrasonic signal into the fastener.

The system wherein the fastener tool is “dry coupled” such that any contact surfaces that carry or transmit the acoustic or ultrasonic energy to the fastener tool are in direct contact and without any energy transfer facilitation.

The system wherein the energy transfer facilitator comprises at least one of a fluid or material is arranged between the horn and at least one of the fastener or a socket, screwdriver bit, and/or torque bit tips mounted on the fastener, the fluid or minimally absorbing material of the acoustic/ultrasonic signal traveling into the fastener.

The system wherein the energy transfer facilitator may be comprised of, but not limited, to Teflon, oil, water, gel, foam, glycol, glycerin, and/or a polymer film or a minimally energy absorbing spacer.

The ultrasonic fastener tool wherein the flexible ultrasonic joint comprises a single pivot joint that permits the horn end to pivot in a first predetermined plane and at least partially about a first predetermined axis.

The ultrasonic fastener tool wherein the flexible ultrasonic joint comprises a dual pivot joint that permits the horn end to pivot in a first predetermined plane and a second predetermined plane and at least partially about a second predetermined axis, respectively.

The ultrasonic fastener tool wherein the flexible ultrasonic joint comprising a plurality of parts having a plurality of engaging surfaces, respectively, the plurality of engaging surfaces comprising no fluid gap or spacing and defining or providing a “dry” engagement so that the plurality of engaging surfaces engage in order to facilitate transfer of the acoustic or ultrasonic energy to the horn end and ultimately to the fastener when the ultrasonic fastener tool is used to loosen or tighten the fastener.

The ultrasonic fastener tool wherein the plurality of engaging surfaces, respectively, the plurality of engaging surfaces are curved or angled to facilitate focusing the acoustic or ultrasonic energy through the plurality of parts.

The ultrasonic fastener tool wherein the single pivot joint comprises a plurality of parts having a plurality of engaging surfaces, respectively, the plurality of engaging surfaces comprising no fluid gap or spacing and defining or providing a "dry" engagement so that the plurality of engaging surfaces engage in order to facilitate transfer of the acoustic or ultrasonic energy to the horn end and ultimately to the fastener when the ultrasonic fastener tool is used to loosen or tighten the fastener.

The ultrasonic fastener tool wherein the plurality of engaging surfaces, respectively, the plurality of engaging surfaces are curved or angled to facilitate focusing the acoustic or ultrasonic energy through the plurality of parts.

The ultrasonic fastener tool wherein the dual pivot joint comprises a plurality of parts having a plurality of engaging surfaces, respectively, the plurality of engaging surfaces comprising no fluid gap or spacing and defining or providing a "dry" engagement so that the plurality of engaging surfaces engage in order to facilitate transfer of the acoustic or ultrasonic energy to the horn end and ultimately to the fastener when the ultrasonic fastener tool is used to loosen or tighten the fastener.

The ultrasonic fastener tool wherein the plurality of engaging surfaces, respectively, the plurality of engaging surfaces are curved or angled to facilitate focusing the acoustic or ultrasonic energy through the plurality of parts.

The ultrasonic fastener tool wherein the flexible ultrasonic joint comprises plurality of parts having a plurality of engaging surfaces, respectively, each of the plurality of engaging surfaces comprising a fluid gap or spacing therebetween for receiving an ultrasonic fluid and defining or providing a "wet" joint so that the ultrasonic fluid facilitates transferring the acoustic or ultrasonic energy directly between such plurality of engaging surfaces in order to facilitate transfer of the acoustic or ultrasonic energy to the horn end and ultimately to the ultrasonic fastener when the ultrasonic fastener tool is used to loosen or tighten the fastener.

The ultrasonic fastener tool wherein the ultrasonic fastener tool comprises a boot or sleeve that surrounds the flexible ultrasonic joint to retain the ultrasonic fluid about the flexible ultrasonic joint.

The ultrasonic fastener tool wherein the flexible ultrasonic joint comprises a plurality of parts having a plurality of engaging surfaces, respectively, each of the plurality of engaging surfaces comprising a fluid gap or spacing therebetween for receiving an ultrasonic fluid and defining or providing a "wet" joint so that the ultrasonic fluid facilitates transferring the acoustic or ultrasonic energy directly between such plurality of engaging surfaces in order to facilitate transfer of the acoustic or ultrasonic energy to the horn end and ultimately to the ultrasonic fastener when the ultrasonic fastener tool is used to loosen or tighten the fastener.

The ultrasonic fastener tool wherein the ultrasonic fastener tool comprises a boot or sleeve that surrounds the flexible ultrasonic joint to retain the ultrasonic fluid about the flexible ultrasonic joint.

The ultrasonic fastener tool wherein the flexible ultrasonic joint comprises a plurality of parts having a plurality of engaging surfaces, respectively, each of the plurality of engaging surfaces comprising a fluid gap or spacing therebetween for receiving an ultrasonic fluid and defining or providing a "wet" joint so that the ultrasonic fluid facilitates transferring the acoustic or ultrasonic energy directly between such plurality of engaging surfaces in order to facilitate transfer of the acoustic or ultrasonic energy to the horn end and ultimately to the ultrasonic fastener when the ultrasonic fastener tool is used to loosen or tighten the fastener.

The ultrasonic fastener tool wherein the ultrasonic fastener tool comprises a boot or sleeve that surrounds the flexible ultrasonic joint to retain the ultrasonic fluid about the flexible ultrasonic joint.

The ultrasonic fastener tool wherein the horn body and the horn end are adapted and configured to be pivotally coupled together so that the horn end may pivot with respect to the horn body while the acoustic or ultrasonic energy is being applied to the fastener of engaging surfaces.

The ultrasonic fastener tool wherein a first pivot pin joint pivotally secures the horn body to the horn end.

The ultrasonic fastener tool wherein the ultrasonic fastener tool comprises at least one intermediate coupler for pivotally coupling the horn body to the horn end, the at least one intermediate coupler adapted and configured to pivotally couple the horn body to the horn end so that the horn end may pivot with respect to the horn body in the plurality of planes and at least partially about the plurality of axes.

The ultrasonic fastener tool wherein a first pivot pin joint pivotally secures the horn body to a first end of the intermediate coupler and a second pivot pin joint pivotally secures the horn end to a second end of the intermediate coupler; the first pivot pin joint permitting the horn end to pivot at least partially about a first pivot axis and the second pivot pin joint permitting the horn end to pivot at least partially about a second pivot axis that is not the same as the first pivot axis.

The ultrasonic fastener tool wherein a first pivot axis and the second pivot axis is offset by about 90 degrees.

The ultrasonic fastener tool wherein the intermediate coupler comprises a groove on one end for pivotally receiving a male projection of the horn body and an intermediate coupler male projection for pivotally coupling to an end of the horn body.

The ultrasonic fastener tool wherein the intermediate coupler comprises a first channel or groove on a first end for pivotally receiving a male projection of the horn end and permitting the horn end to at least partially pivot about a first predetermined axis, the intermediate coupler also comprises a second channel or groove on a second end for receiving a second male projection for permitting the horn end to at least partially pivot about a second predetermined axis.

These and other objects and advantages of the invention will be apparent from the following description, the accompanying drawings and the appended claims.

BRIEF DESCRIPTION OF THE ACCOMPANYING DRAWINGS

DETAILED DESCRIPTION OF THE PREFERRED EMBODIMENTS

Figure 1:
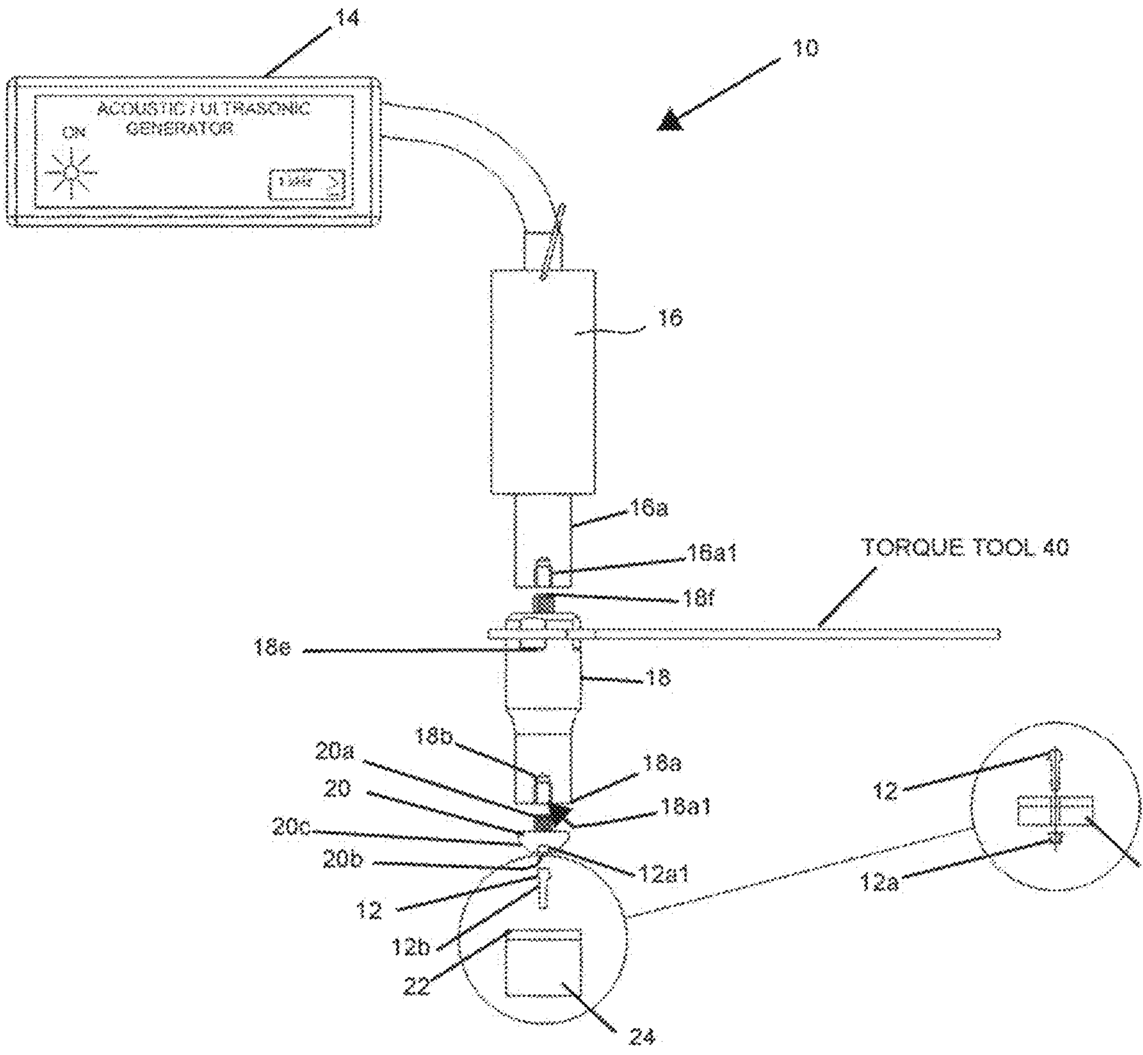
FIG. 1 is a view of the system and fastening tool having a replaceable tip.

Referring now to FIGS. 1-14 a tool or system 10 and method for loosening or tightening a fastener 12 will now be described. The system 10 (FIG. 1) comprises an acoustic/ultrasonic wave generator 14 for generating an ultrasonic or acoustic energy or signal that passes longitudinally through the fastener 12 to elongate and shorten the fastener 12 and to introduce a cyclic strain and heating within the fastener 12 to reduce a frictional force between the fastener 12 and structures 22 and 24. In this regard, details of the cyclic or acoustic/ultrasonic strain, heating and elongation of the fastener 12 will be described in more detail later herein.

The system 10 comprises the acoustic/ultrasonic generator 14 which, in a preferred embodiment, applies an ultrasonic or acoustic energy at a frequency equal to or larger than 1 KHz. The acoustic/ultrasonic generator 14 is coupled to a fastener tool 16 that comprises an armature 16*a*, which is coupled to a horn 18 as shown. Note that the horn 18 comprises a socket, screwdriver bit, and/or torque bit tip 20 for receiving a head and/or nut 12*a* of the fastener 12. The horn 18 comprises a threaded aperture 18*a*1 that threadably receives a threaded projection 20*a* of the socket, screwdriver bit, and/or torque bit tip 20. In other embodiments described later relative to FIG. 9, the socket, screwdriver bit, and/or torque bit tip 20 is integrally formed in an end 18*a* of the horn 18. In other embodiments illustrated in FIGS. 1 and 9, the horn 18 may have an interchangeable or replaceable socket, screwdriver bit, and/or torque bit tip 20 which will be described later herein relative to FIG. 9.

Figure 8:
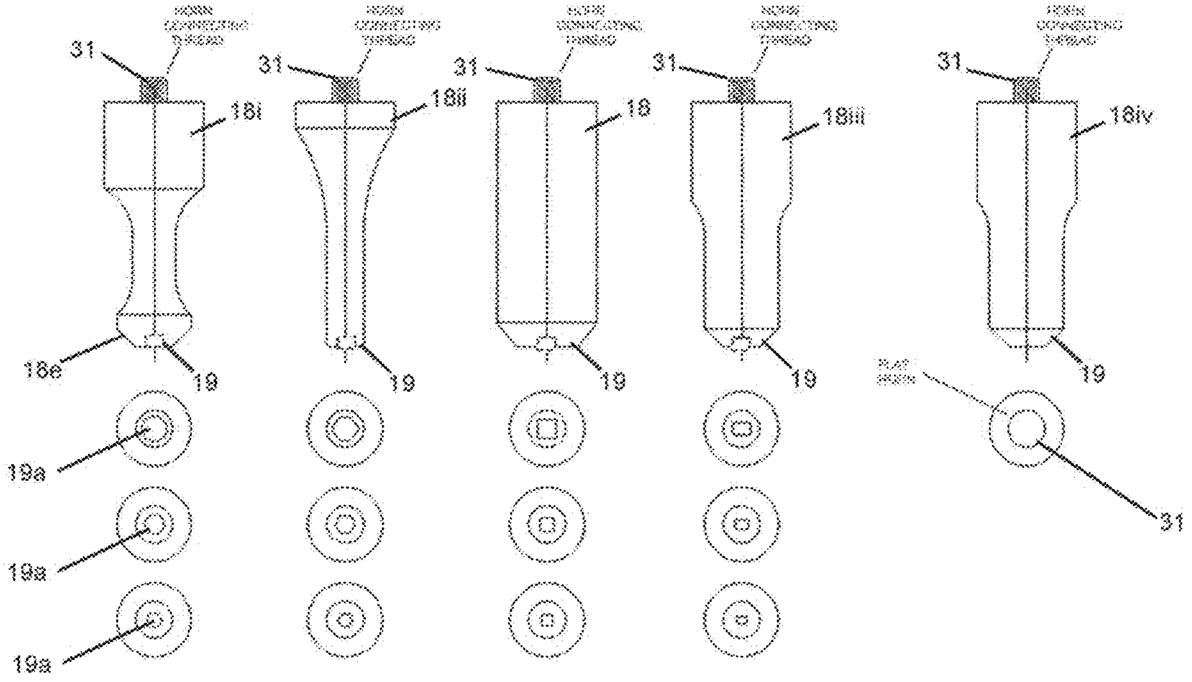
FIG. 8 is a view of a plurality of horns having a plurality of differently shaped sockets, screwdriver bits, and/or torque bits for receiving different shaped fasteners, as well as a horn having a generally optimized geometry and or flat end.

In the illustration being described relative to FIG. 8, the horn 18 comprises the end 19 which is adapted to define the socket, screwdriver bit, and/or torque bit opening 19 and is sized and adapted to complement the size and shape of the head and/or nut 12*a* of the fastener 12. The horn 18 may engage the fastener 12 and apply a cyclic or acoustic/ultrasonic energy thereto when the acoustic/ultrasonic generator 14 is energized. Thus, it should be understood that the horn 18 may be a uniform, monolithic construction with the end 19 having the socket, screwdriver bit, and/or torque bit opening 19 adapted and sized to mate with and receive the fastener head and/or nut 12*a*. This is illustrated in FIG. 8.

Figure 9:
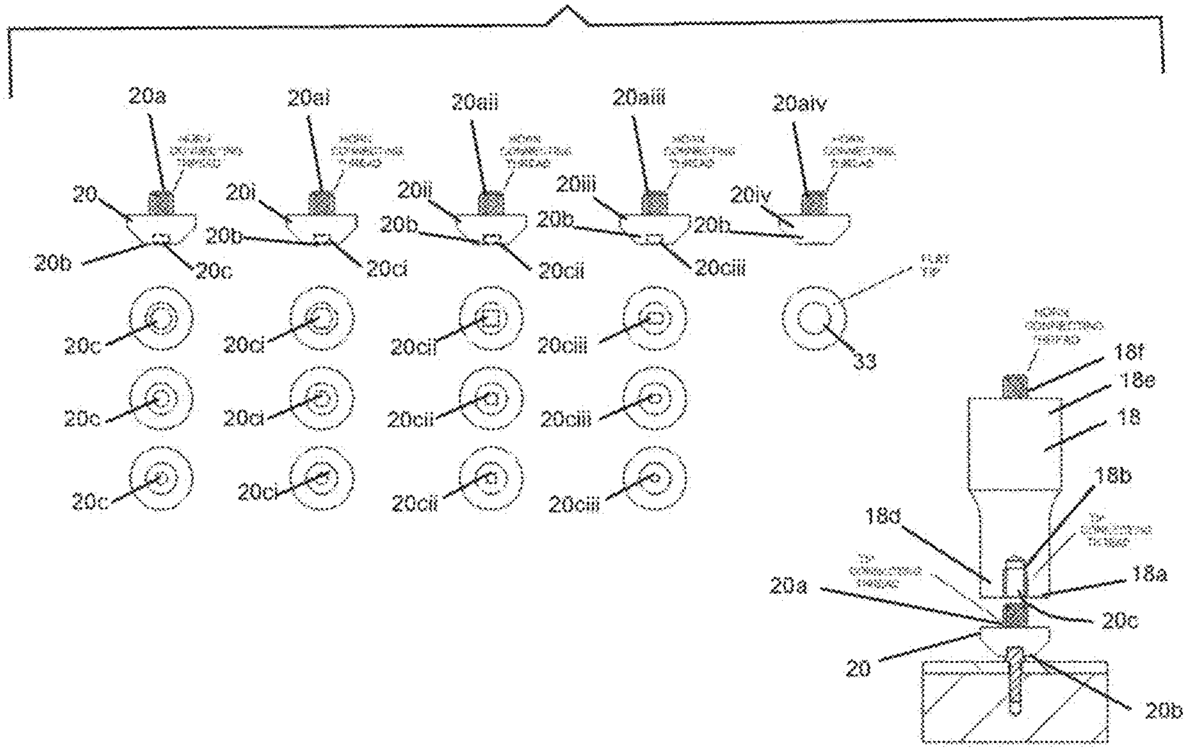
FIG. 9 is an illustration of a plurality of replaceable and interchangeable tips that are threadably mounted onto an end of a horn, with each of the tips having either a socket, screwdriver bit, and/or torque bit adapted to receive and mate with a fastener head and/or nut or a flat tip.

Alternatively in FIG. 9, the horn 18 may accept a generally optimized geometry and or flat and opposing tool-engaging surfaces that is adapted and sized to threadably receive at least one socket, screwdriver bit, and/or torque bit tip 20 that comprises the threaded projection 20*a* and on an opposite end 20*b* the aperture 20*c* that is adapted and sized to mate with the head and/or nut 12*a* of the fastener 12. In this regard, a user selects at least one socket, screwdriver bit, and/or torque bit tip 20 that is complimentary and sized to mate with the head and/or nut 12*a* of the fastener 12 to be worked on so that the tool can apply the cyclic and acoustic/ultrasonic energy described herein, as well as a rotational torque in some embodiments that will also be described later herein. Note that each of the sockets, screwdriver bits, and/or torque bit tips 20 can have the same or a different configuration or shape so that they can each accommodate and receive the head and/or nut 12*a* of the fastener 12 having a complimentary shape. FIG. 9 shows a plurality of sockets, screwdriver bits, and/or torque bit tips 20 that can be selectively and threadably mounted in the end 20*c* of the horn 18. Alternatively, and as mentioned herein relative to FIG. 8, the horn 18 may be a monolithic one piece construction that has the socket, screwdriver bit, and/or torque bit opening 19 that is adapted to receive the head and/or nut 12*a* of the fastener 12.

In one embodiment, a plurality of sockets, screwdriver bits, and/or torque bit tips 20 are provided in a set for selection by a user and the appropriate socket, screwdriver bit, and/or torque bit tips 20 for a particular fastener 12 is identified and selected and then threadably mounted in the threaded aperture 20*c* on the end 18*a* of the horn 18, as illustrated in FIGS. 1 and 9. FIG. 1 shows an exploded view of the various parts. In this illustration, the fastener 12 is used to secure a first part or structure 22 to the second part or structure 24. It should be understood that one primary feature or function of the system 10 is to unscrew or loosen the fastener 12 that is locked or frozen (i.e., won't loosen/remove without damage) to the structures 22 and 24. It is not uncommon, for example, in the airplane engine industry along with other industries, that the fasteners 12 and structures 22 and 24 are subjected to various environmental conditions, material mismatches, and temperatures during normal operation that can cause the fastener 12 to be seized/locked or difficult to "break" from the structures 22 and 24. When this happens, the fastener 12 cannot be unfastened without either stripping the head and/or nut 12*a* of the fastener 12 or causing the head and/or nut 12*a* to break off when a rotational torque is applied to the head and/or nut 12*a*. The inventor has found that by the selective and focused application of the cyclic and acoustic/ultrasonic energy as described herein by the acoustic/ultrasonic wave generator 14, armature or fastener tool 16 and horn 18, reductions in the "breaking/break away force" have been realized as will be described in more detail later herein relative to FIG. 7.

In this regard, the acoustic/ultrasonic wave generator 14 and the horn 18 or the socket, screwdriver bit, and/or torque bit tips 20 for the embodiments of FIGS. 1 and 9 cooperate to focus or apply the acoustic/ultrasonic signal to focus the ultrasonic or acoustic energy at a predetermined focus area 25 (FIG. 3), which is a predetermined distance PD (FIG. 3) into the fastener 12. This, in turn, reduces a coefficient of friction between the threads 12*b* (FIG. 3) of the fastener 12 and the threads 24*b* of the structure 24 when the horn 18 is in operative relationship with the fastener 12 and the acoustic/ultrasonic signal from the acoustic/ultrasonic generator 14 is applied thereto.

Figure 3:
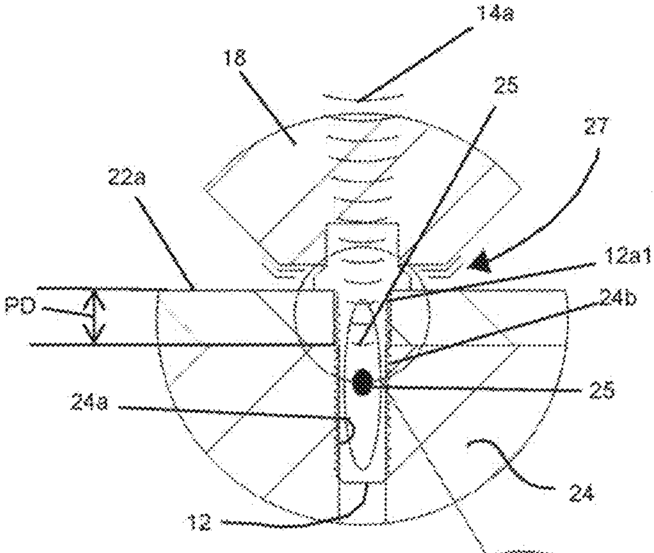
FIGS. 3, 3A and 3B are views illustrating a focus of the ultrasonic or acoustic energy passing into the fastener.
Figure 3B:
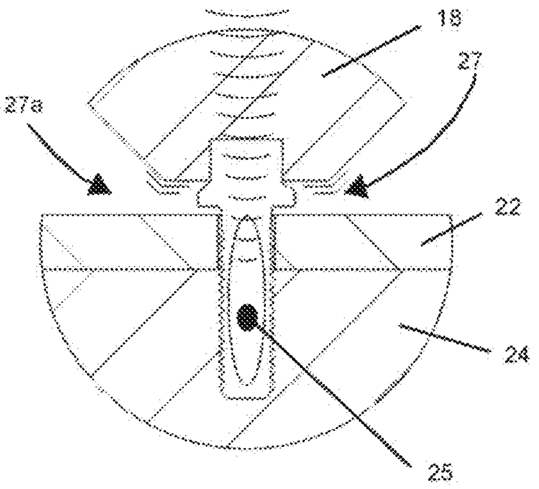
Figure 3A:
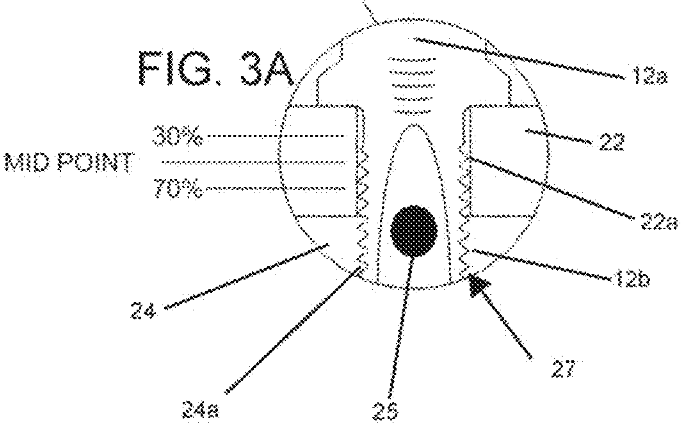
Figure 4:
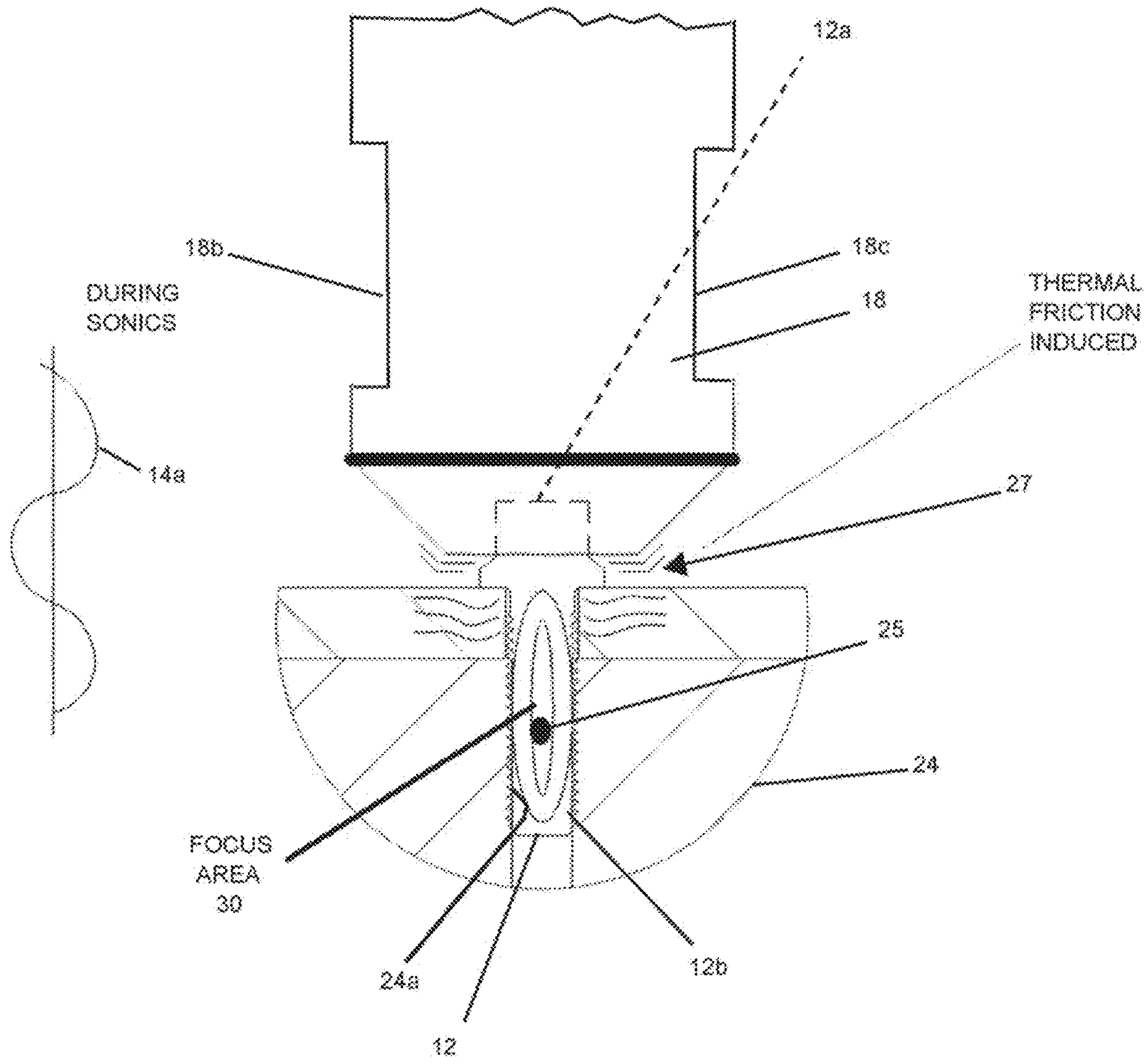
FIG. 4 is another view illustrating the focus area and a predetermined focus point, along with an energizing curve.

Referring now to FIGS. 3, 3A and 4, the acoustic/ultrasonic signal and the predetermined distance PD will now be described. Note that the fastener 12 secures the structure 22 to the structure 24. The structure 22 has the surface 22*a* that is sized and adapted to allow the fastener 12 to be inserted therethrough. The structure 24 comprises the threaded opening 24*a* that is adapted and sized to mate with and receive the threads 12*b* of the fastener 12. The acoustic/ultrasonic waveform 14*a* is illustrated in FIGS. 3, 3A and 3B and is generated by the acoustic/ultrasonic generator 14 and transmitted longitudinally (as viewed in FIGS. 3 and 3B) down the longitudinal length of the fastener 12. In one embodiment, the predetermined distance PD is a distance that is below the bolt/screw head and/or nut 12*a*1 of the head and/or nut 12*a* of the fastener 12 where it engages a surface 22*a* and the predetermined focus area or point 25 of concentrated energy applied by the acoustic/ultrasonic generator 14. Note that the predetermined focus area 25 is concentrated energy that is generally situated along a longitudinal length or axis of the fastener 12 and can be throughout the threaded surface 24*a* of the structure 24.

FIGS. 3-3B and 5A-5D illustrate the cyclic and acoustic/ultrasonic energy being applied to the fastener 12. This energy, in turn, causes a cyclic strain between the threads 12*b* (FIG. 5D) of the fastener 12 and the threads 24*a* of the structure 24. Notice that the head and/or nut 12*a* of the fastener 12 and the shoulder (if present) 12*a*1 become situated at a head and/or nut engagement area 27 (FIG. 5C) of the structure 22 or surface 22*a* when the fastener 12 is secured or screwed into the structure 24. It should be understood that the predetermined distance PD between the shoulder (if present) 12*a*1 and the predetermined focus area 25 is such that the predetermined focus area 25 is generally along a longitudinal length of the fastener threads 12 and downstream/upstream of the head and/or nut engagement area 27 so that when the ultrasonic or acoustic energy is applied to the fastener 12, a friction or pressure between the bolt and/or nut 12*a*1 and a mating surface 22*a* of the structure 22 (FIG. 5C) along with the frictional reduction between the fastener threads 12*b*1 and the structure thread 24*b*1 is at least partially reduced which in turn facilitates loosening the fastener 12, especially if a rotational torque is applied thereto. The inventor has found that the rotational torque necessary to loosen the fastener 12 is reduced compared to the torque that is necessary to loosen the fastener 12 when no acoustic/ultrasonic energy is applied. This will be described in more detail relative to FIG. 7.

Furthermore, during acoustic/ultrasonic energy application the bolt/screw head/nut elongates and a gap 27*a* becomes present between the bottom of the bolt/screw head 12*a*1 and the top of the surface of 22*a*. This gap 27*a* is illustrated in FIG. 3B. The lifting up the bolt/screw or nut head from the surface of 22 or 24 reduces the surface friction and ultimately the rotational torque require to loosen the fastener.

Figures 5A, 5B, 5C, 5D:
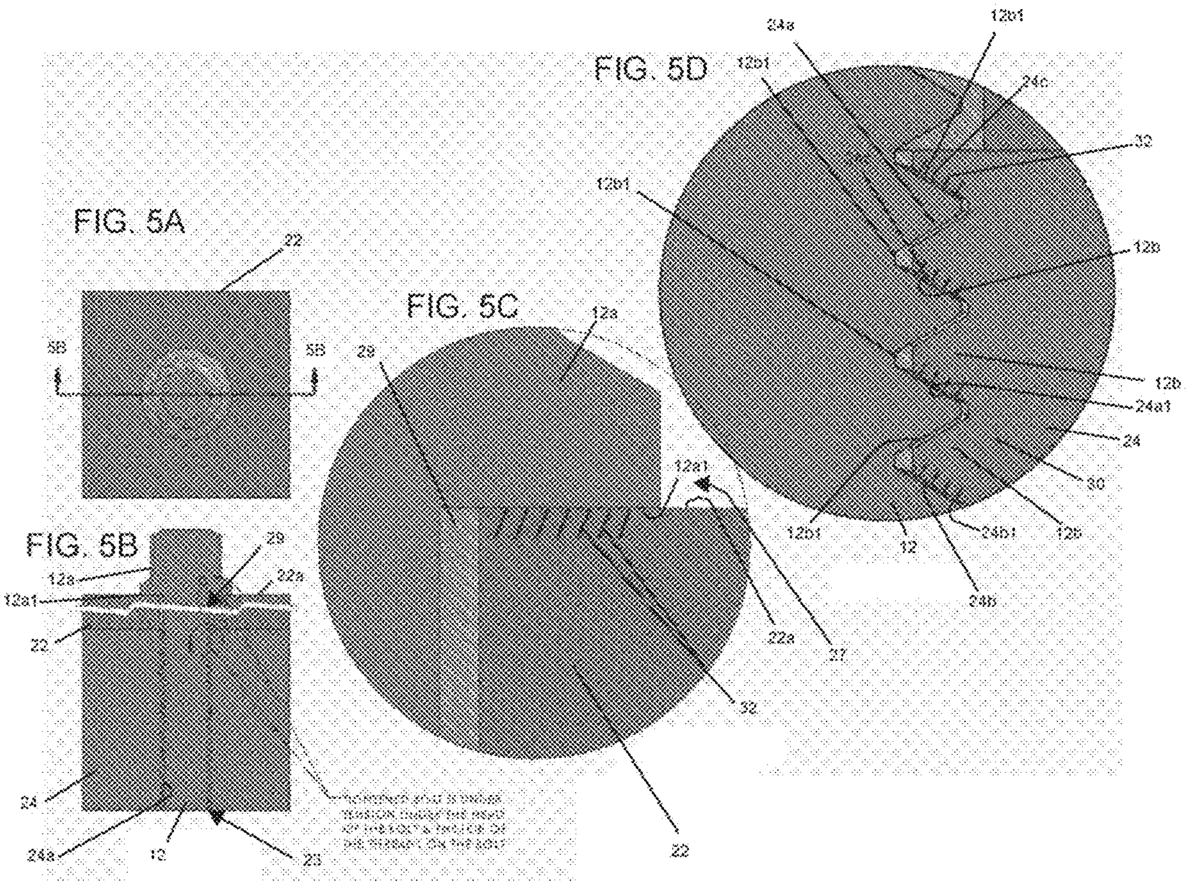
FIGS. 5A-5D are illustrations showing the cyclic stress and heating that results from applying the ultrasonic or acoustic energy into the fastener.

FIGS. 5A-5D illustrate these features in greater detail. For ease of understanding, FIG. 5B shows a simplified fragmented and sectional view showing that the structure 24 has an aperture 23 and internal threads 24*a*. In FIG. 5B, note that the fastener 12 secures the structure 22, which has the unthreaded aperture 29 (FIGS. 5B and 5C), so that the fastener 12 can pass therethrough. As illustrated in FIG. 5B, the fastener 12 secures the structure 22 to the structure 24. Note that as the fastener 12 is tightened, it places the head and/or nut 12*a* and shoulder (if present) 12*a*1 of the fastener 12 under tension (illustrated in FIG. 5C) against the top surface 22*a*. This is illustrated in FIG. 5C where the shoulder (if present) 12*a*1 cooperates with the top surface 22*a* which results in a tension between the surfaces 22*a* and bottom of the bolt/screw head 12*a*1. The tension introduces heat in the fastener 12 and is represented by tension or strain lines or curves 32 in FIG. 5C.

FIG. 5D illustrates the resulting tension between the threads 12*b* of the fastener 12 and the threads 24*b* of the structure 24. Note the tension and strain at the upper surfaces 12*b*1 of the threads 12*b* of the fastener 12 and the bottom surfaces 24*b*1 of the structure threads 24*b*.

Referring back to FIG. 4, notice that a focus area 25 is where the ultrasonic or acoustic energy is focused in the fastener 12. FIG. 3B illustrates the acoustic/ultrasonic waveform 14*a* that is applied to the horn 18 and which causes the acoustic/ultrasonic and cyclic elongation, shortening and strain between the fastener 12 and the structures 22 and 24. The energizing waveform 14*a* (FIG. 4) causes the acoustic/ultrasonic action, and a thermal friction is induced as illustrated by the tension or strain lines or curves 32 in FIGS. 5C and 5D. As mentioned, the acoustic/ultrasonic energy causes the fastener 12 to elongate and shorten in response to the sinusoidal input energy or waveform 14*a* which also causes a strain between the upper surfaces 12*b*1 of the threads 12*b* and the mating lower surfaces 24*b*1 of the threads 24*b*. Again, the tension or strain lines or curves 32 is represented by the tension or strain lines or curves 32 in FIGS. 5C and 5D. It should be understood that the tension or strain lines or curves 32 cause a cyclic heating of the threads 12*b* and threads 24*b* which causes an external expansion and contraction of the fastener 12 along its longitudinal length which in turn induces more heating. The application of the acoustic/ultrasonic energy in response to the sinusoidal waveform 14*a* (FIG. 4), along with the thermal friction inducement between the head and/or nut 12*a* of the fastener 12 and the structures 22 and 24, all cooperate to reduce or facilitate reducing the amount of torque necessary to unloosen or tighten the fastener 12 from or to, respectively, the structures 22 and 24.

Figure 6:
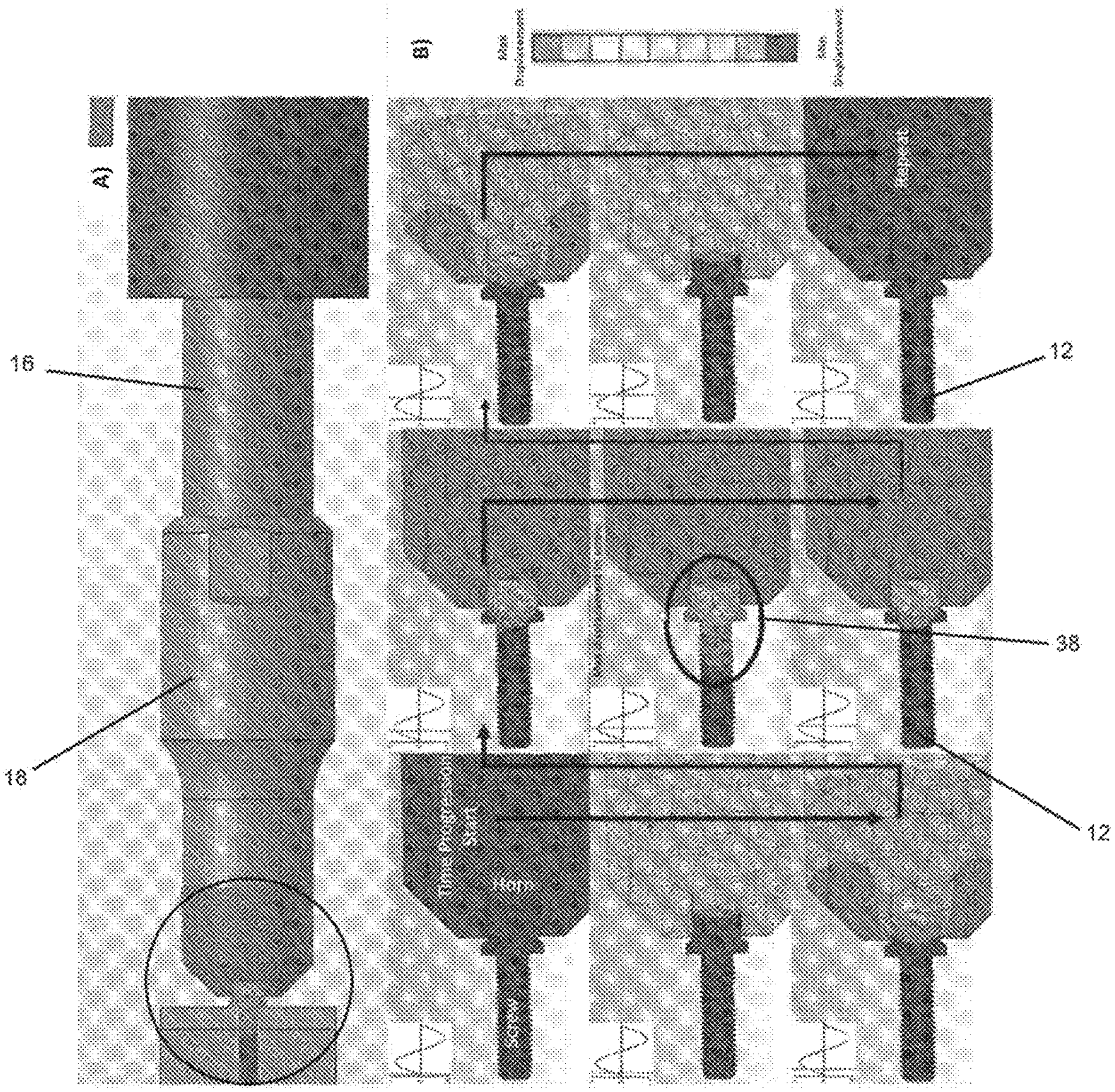
FIG. 6 is a progressive view illustrating the ultrasonic or acoustic energy traveling into the fastener.

FIG. 6 is a graphic example stress diagram of various stress levels that occur during the application of the acoustic/ultrasonic energy. Notice in the illustration that the stress and application of energy is zero in the bottom left-hand portion of the FIG. 6 and progresses along the progression arrows as illustrated. The sinusoidal waveforms associated with each view illustrate timing diagrams of the application of the energy. Note that as the acoustic/ultrasonic energy is applied, stress increases first from the top of the fastener 12 until the acoustic/ultrasonic energy is applied into the fastener 12 along its length in the area 38 as described earlier herein. Again, the acoustic/ultrasonic energy causes an expansion and contraction in response to the acoustic/ultrasonic waveform 14*a* which in turn causes the thermal friction to be induced during the application of the acoustic/ultrasonic energy. Preferably, when the acoustic/ultrasonic energy is in the area 38 and along the length of the fastener 12, a rotational torque may be substantially simultaneously applied to the horn 18 in order to rotate the fastener 12 and loosen it from the structures 22 and 24. Ultimately, as the acoustic/ultrasonic generator 14 reduces the application of the acoustic/ultrasonic energy applied to the horn 18 which causes the acoustic/ultrasonic energy to recede from the fastener 12 as illustrated. Note that a maximum heating or displacement, linear motion, longitudinal motion occurs in the central view. Notice that the color red indicates heat generation and blue is relatively cool or cold. The system 10 is energized for as long as it takes to free the fastener 12.

Figure 7:
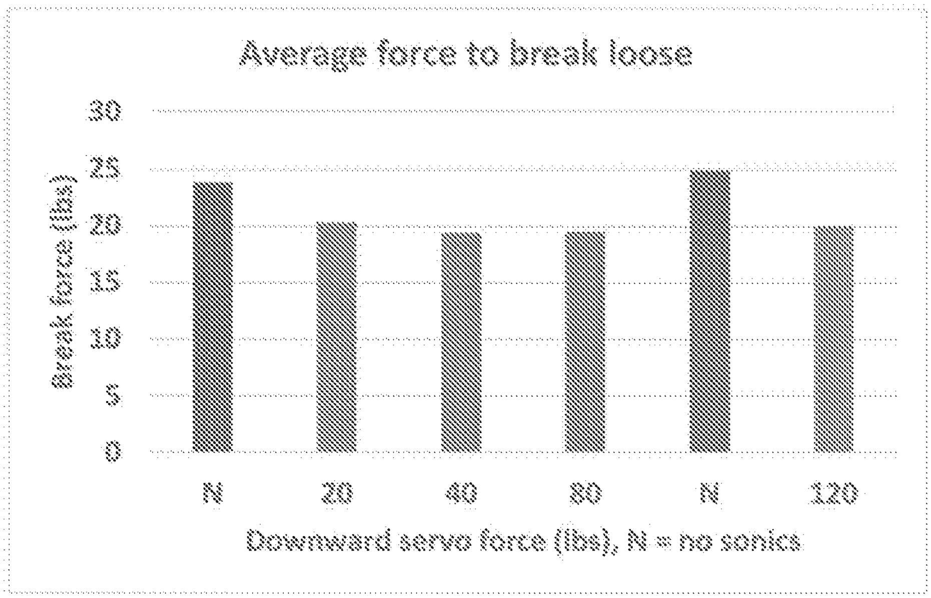
FIG. 7 is a bar diagram illustrating a reduction in the breakaway force required as a result of applying the system to a fastener.

FIG. 7 is an example bar graph showing an average force to break or loosen the fastener 12 from the structure 24 in the illustration being described. These numbers are illustrative only and will change depending on the size of the fastener 12, size of the structures 22 and 24, break force between the fastener 12 and the structures 22 and 24 and the like. The columns identified with the letter "N" illustrate examples of a similar size fastener 12, but where no acoustic/ultrasonic energy is applied through the horn 18 to the head and/or nut 12*a* of the fastener 12. The other columns illustrate several examples of the break force when sonics were applied. Note that in all examples where the system 10 was used, the break force was reduced by about 5 pounds force as a result of the acoustic/ultrasonic generator 14 applying acoustic/ultrasonic energy to the horn 18 and into the fastener 12. Notice that the break force without the acoustic/ultrasonic energy was roughly 5 pounds force greater.

Referring back to FIG. 3B, it should be understood that the acoustic/ultrasonic generator 14 applies the energizing waveform 14*a* (FIG. 4) to the fastener tool 16 which in turn imparts the acoustic/ultrasonic energy directly to the horn 18. When the horn 18 is mounted on the head and/or nut 12*a* of the fastener 12, that energy is transmitted directly into the fastener 12 along its longitudinal length. As was also mentioned earlier herein, this creates tension and thermal friction is induced between the threads 12*b* of the fastener 12 and the threads 24*b* of the structure 24. Note that the predetermined location of the predetermined focus area 25 is in the fastener 12 and spaced from the head and/or nut engagement area 27 as illustrated in FIGS. 3, 3A and 3B. The predetermined focus area 25 with focused energy is along the length of the fastener 12 and under the head and/or nut engagement area 27 so that when ultrasonic or acoustic energy is applied to the fastener 12, the friction pressure or break force between the head and/or nut 12*a* and the mating surface 24*a* is at least partly reduced. As mentioned earlier, this also causes a reduction in the stress between the shoulder (if present) 12*a*1 of the head and/or nut 12*a* and the surface 22*a* of the structure 22. Moreover, it also causes a reduction in the friction or pressure between the upper surfaces 12*b*1 and the thread surfaces 12*a*1 as a result of the application of the ultrasonic or acoustic energy in response to the input waveform 14*a*.

As mentioned earlier herein, during the application of the ultrasonic or acoustic energy by the acoustic/ultrasonic generator 14, it is preferable to apply a rotational torque to the fastener 12. Accordingly, the system 10 has multiple means and apparatus for generating or performing such rotational torque which will now be described.

Figure 2A:
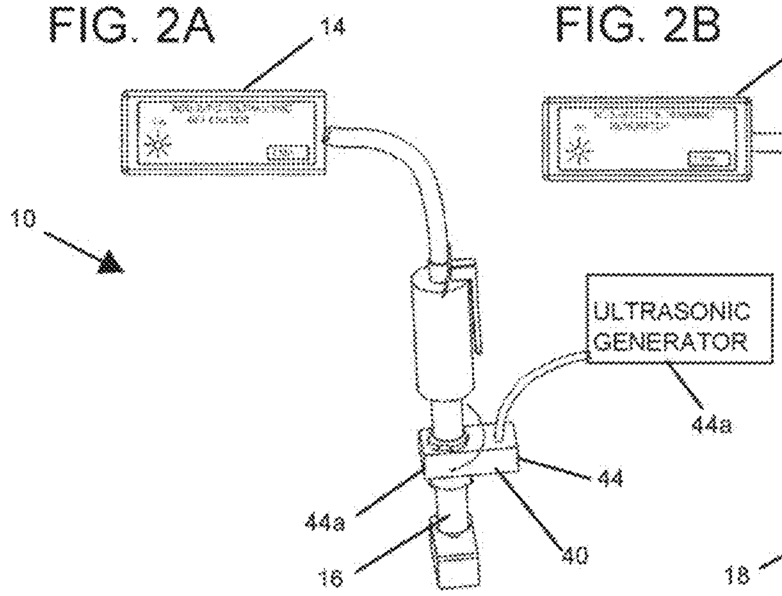
FIGS. 2A-2B are views of a system and fastening tool and also a rotational torque applicator example.
Figure 2B:
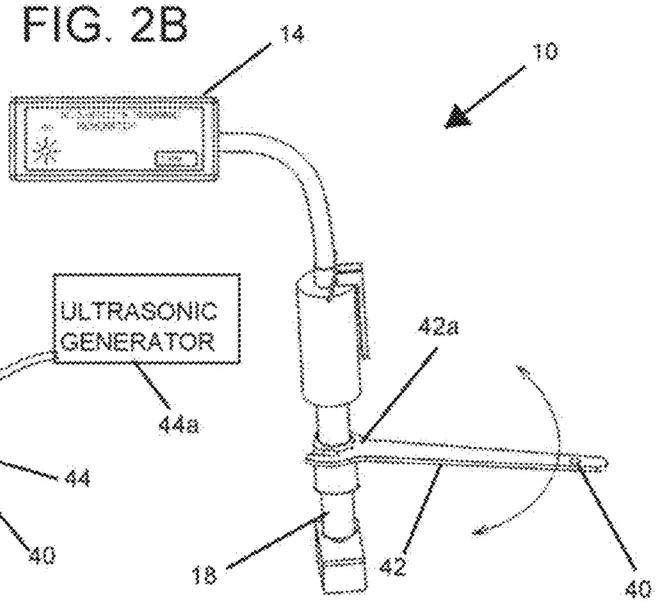

Referring now to FIGS. 2A and 2B, it should be understood that the system 10 may comprise a rotational torque applicator 40 for applying a rotational torque to the fastener 12 substantially simultaneously as the ultrasonic or acoustic energy passes into the fastener 12. The rotational torque applicator 40 may comprise at least one of a mechanical torque applicator in the form of a wrench 42 (FIG. 2B) or tool sized and adapted to engage the generally optimized geometry and or flat and opposing tool-engaging surfaces 18*b* and 18*c* (FIG. 4) in order to permit manual rotational torque application. Alternatively, an acoustic/ultrasonic torque applicator 44 that is coupled to an acoustic/ultrasonic generator 44*a* which generates an acoustic or ultrasonic signal which energizes the wrench 42 to rotationally drive the horn 18 which in turn rotatably drives the fastener 12. The torque applicator may also just provide just a rotational motion without acoustic/ultrasonics as illustrated in item 40 and 44. In this regard, note that the horn 18 may have a plurality of generally optimized geometry and or flat areas and opposing tool-engaging surfaces 18*b* and 18*c* (FIGS. 1 and 3B) that are sized and adapted to receive the working end 42*a* of the wrench 42. Likewise, the tool 40 also has a mating tool end (not shown) that is adapted and sized to engage the generally optimized geometry and or flat and opposing tool-engaging surfaces 18*b* and 18*c* in order to rotatably drive the horn 18. Other means for rotatably driving the tool may also be applied, such as pneumatic, electric or other automatic tool.

In one illustrative embodiment, the acoustic/ultrasonic generator 14 and the rotational torque applicator 40 may be either the Dukane IQ 600W handheld or a Dukane IQ 2400W Servo, both of which are available from Dukane Corp. located at 2900 Dukane Drive St. in Charles, Illinois 60174.

It is important to understand that the rotational torque applicator 40 preferably applies the rotational torque to the horn 18 substantially simultaneously as the ultrasonic or acoustic energy from the acoustic/ultrasonic generator 14 passes into the fastener 12. The inventors have found that by causing the acoustic or ultrasonic energy to pass to the predetermined focus area 25 causes the elongation of the fastener 12 in the cyclic heating and stress between the threads 24*a* and the threads 12*b* of the fastener 12 as mentioned earlier, which facilitates loosening the fastener 12 when a rotational torque is applied substantially simultaneously.

Referring now to FIGS. 8 and 9, further details of various embodiments of the horn 18 and the at least one replaceable tip socket, screwdriver bit, and/or torque bit tips 20 will be described relative to FIGS. 8 and 9. The inventor has found that the individual horns 18 may be configured and adapted to have a predetermined shape that is selected depending upon the acoustic effect and focus desired Different shapes affect the characteristics of the sonics through the horn such as horn amplitude, the resonance frequency, location of focused energy, internal stress of the horn. Different sizes are also needed for the different sized fasteners and also for fitting in different locations. Helix is a shape as well. In the illustrations being described, the inventor has found that different shapes cause the predetermined focus area 25 of the focused ultrasonic or acoustic energy to be adapted or changed depending on various parameter, such as the size and type of fastener 12, the length of the fastener 12, and the like. For ease of illustration, FIG. 8 shows five different embodiments of horns (18, 18*i*, 18*ii*, 18*iii*, 18*iv*), but it should be understood that other shapes and sizes of horns 18 with a predetermined working end socket, screwdriver bit, and/or torque bit tips may be selected as well and that these are only exemplary.

In the embodiment illustrated in FIG. 8, the fastener tool 16 comprises a plurality of horns, 18, 18*i*, 18*ii* and 18*iii* that are sized and adapted for a plurality of fasteners 12 that have a plurality of heads of different shapes or sizes, respectively. Note in FIG. 8 that a plurality of each of these shapes and sizes may be provided to accommodate fasteners 12 having heads/nuts 12*a* that are complementary in shape and size, respectively. Notice in FIG. 8 that each of the horns 18, 18*i*, 18*iv* each have an end that has an aperture or socket, screwdriver bit, and/or torque bit tip 19 in order to accommodate different shapes and sizes of heads 12*a* of different fasteners, respectively. Below each of the horns 18, 18*i*, 18*ii* and 18*iii* is shown illustrative ends of a plurality of horns 18, each of which having different apertures or sockets, screwdriver bits, and/or torque bit tips 19 to accommodate different shapes and sizes of heads 12*a* of the fasteners 12. Of course, more or fewer horns 18 may be provided. Thus, it should be understood that each of the horns 18, 18*i*, 18*ii* and 18*iii* is configured or adapted to provide a plurality of horns 18 that are sized and adapted for a plurality of different fasteners 12 that have a plurality of heads 12*a* of different shapes or sizes.

With respect to the horn 18*iv*, notice that the end does not have the socket, screwdriver bit, and/or torque bit tip 19, but rather, a flat area 31 for engaging a top surface of the head/nut. Although not shown, this horn 18*iv* is adapted to engage not only the head and/or nut 12*a*, but it could engage either end of the fastener 12, especially if the fastener 12 does not have a head and/or nut 12*a* of the type shown and described herein. This particular horn 18*iv* may also be used to engage a head and/or nut 12*a* and apply acoustic/ultrasonic energy into the fastener 12, without receiving the fastener head and/or nut 12*a*. The benefits of a flat horn 19 is for when a bolt/screw is in a place where the full socket cannot or will not fit over the bolt/screw head and/or nut, where one might need to use different torque applicator on the bolt/screw head and/or nut that is not the horn itself, or when access to the bolt/screw head and/or nut face and a nut is on an opposite side, where axis is to an end of the bolt/screw shank.

Referring now to FIG. 9, other embodiments are illustrated. In these embodiments, the horn 18 may be configured or adapted to receive a plurality of sockets, screwdriver bits, and/or torque bit tips 20, 20*i*, 20*ii*, 20*iii* and 20*iv* of different sizes so that the horn 18 may be used to apply the ultrasonic or acoustic energy into and through the socket, screwdriver bit, and/or torque bit tips 20 and into the fastener 12 when the fastener 12 is being tightened or loosened. Notice in the right-most portion of FIG. 9 that the horn 18 comprises a horn body 18*e* having a threaded projection 18*f* which is mounted into the threaded aperture 16*a*1 (FIG. 1) of the armature 16*a* of the fastener tool 16. The end 18*d* (FIG. 9) also comprises a threaded aperture 20*c* for receiving the threaded projection 20*a* of at least one of the sockets, screwdriver bits, and/or torque bit tips 20. Again, and similar to FIG. 8, notice that the sockets, screwdriver bits, and/or torque bit tips 20, 20*i*, 20*ii*, 20*iii* and 20*iv* each have the end 20*b* having the working apertures 20*c*, 20*ci*, 20*cii*, 20*ciii* and 20*civ* that is adapted and sized to receive and mate with the head and/or nut 12*a* of the fastener 12. As with the embodiments discussed earlier herein, the aperture 20*c* is adapted and sized to complement a shape of the head and/or nut 12*a* of the fastener 12. Again, the plurality of sockets or tips 20, 20*i*, 20*ii*, 20*iii* and 20*iv* may be provided in a set or kit to accommodate fasteners 12 of different shapes and sizes. As with the horn 18*iv* in FIG. 8, at least one socket, screwdriver bit, and/or torque bit tips 20*iv* may be provided with a flat area 33 for engaging at least a part or surface of the fastener 12.

As illustrated in FIG. 9, the horn 18 is threadably mounted onto the armature 16*a* (FIG. 1) and then at least one socket, screwdriver bit, and/or torque bit tip 20 is selected and then threadably mounted to the end 18*a* of the horn 18 as shown. Accordingly, after a user determines the fastener 12 that needs to be loosened or tightened, the user selects the appropriate socket, screwdriver bit, and/or torque bit tip 20, 20*i*, 20*ii*, 20*iii* and 20*iv* that mates with the head and/or nut

12*a* of the fastener 12. Alternatively, the user may select the socket, screwdriver bit, and/or torque bit tip 20*iv* if it was desired to use a tip with a flat end 33.

Advantageously, the at least one replaceable socket, screwdriver bit, and/or torque bit tip 20 comprises a plurality of interchangeable or replaceable tips or sockets of different sizes and shapes to accommodate fasteners 12 of different sizes and shapes, respectively, with at least one of the replaceable sockets or tips 20 being selected from the plurality of interchangeable or replaceable sockets or tips 20 during use of the system 10. During use, the sockets or tips 20, 20*ai*, 20*aii*, 20*aiii*, and 20*aiv* are threadably secured to the horn 18 when the threaded projection 20*a* is mounted into the threaded receiving area 20*c* as illustrated in FIG. 9. The horn 18 is then used to loosen or tighten the fastener as described herein.

Figure 10A:
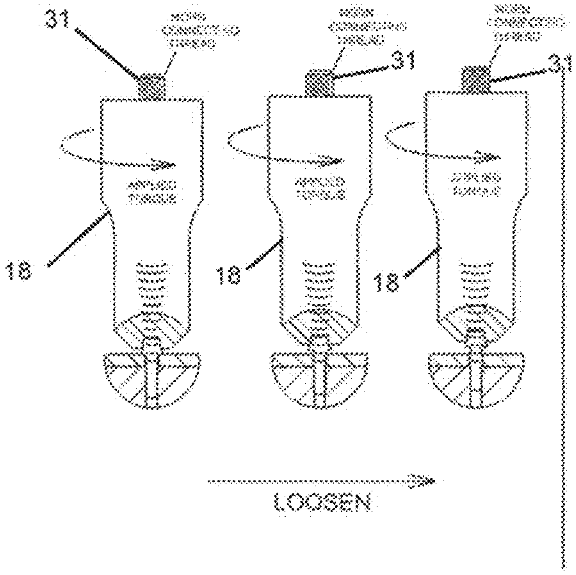
FIGS. 10A-10B illustrate an applied force during loosening or tightening, respectively.
Figure 10B:
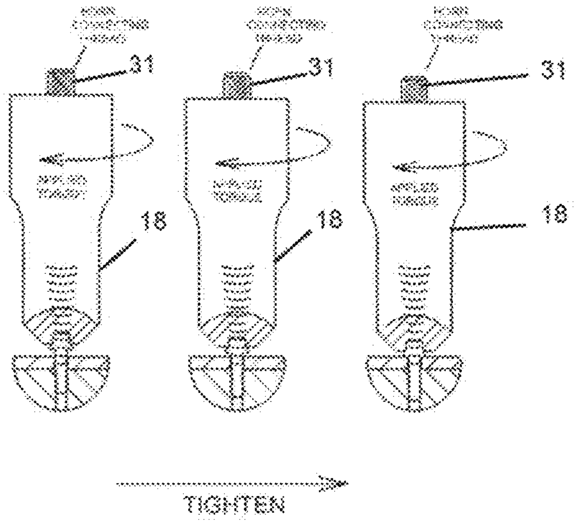

Referring now to FIGS. 10A and 10B, notice the thread direction or thread handedness of the threaded projection 31 on the horn 18 (FIG. 8) and of threaded projection 20*a* in FIG. 9 are generally in a direction that is directly opposite of a thread direction of the fastener 12. In other words and as illustrated in FIG. 10A, if it is desired to loosen the fastener and rotate the horn 18 in a counter-clockwise direction, then the threads 31 of the horn 18 are provided in a clockwise direction. Alternatively, if the horn 18 is being applied to tighten a fastener 12 by rotating the fastener 12 in a clockwise direction, then the direction of the threads 31 on the horn 18 are in a counter-clockwise direction. One could also use a substantially larger threaded connector that is in the same direction but torqued much higher than the bolt/screw that is being unfastened. Either of these are to prevent the horn/horn tip from becoming unthreaded when applying sonic or acoustic energy.

Figure 11:
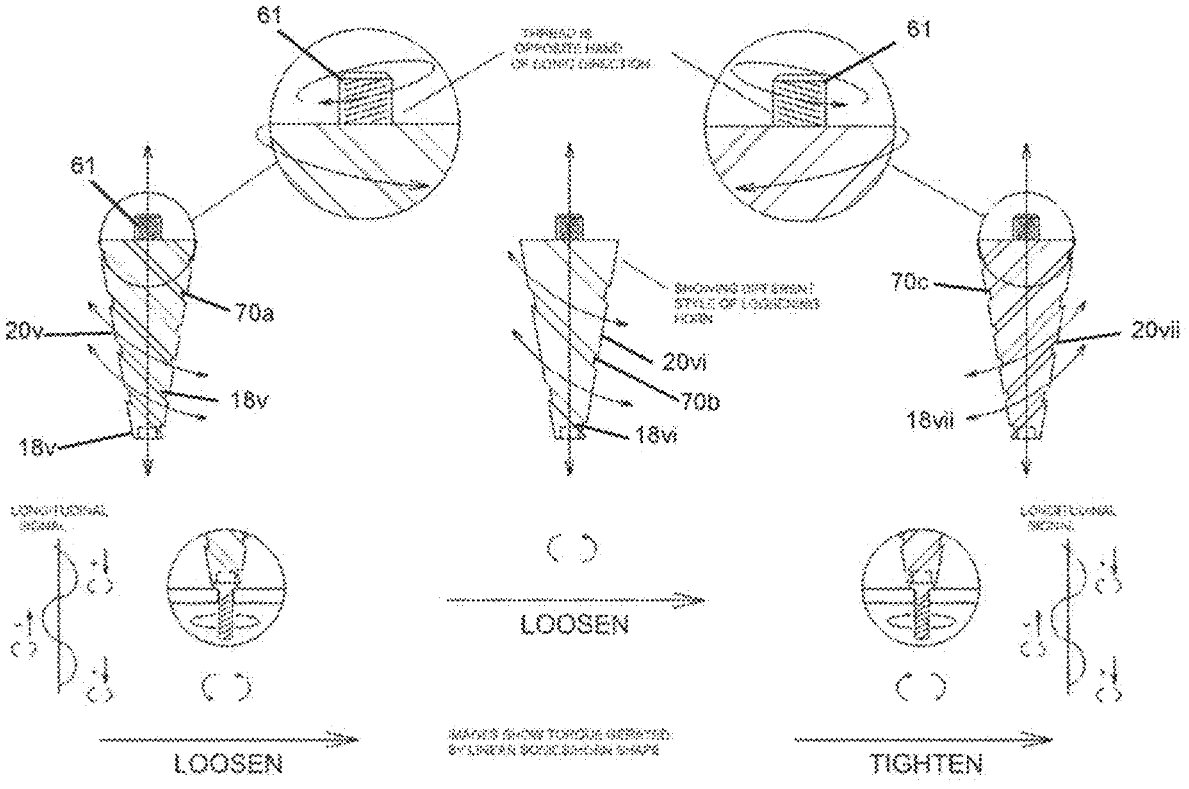
FIG. 11 is an illustration of a plurality of horns or tips that have a helical channel adapted to use a vortex within the fastener that facilitates loosening or tightening the fastener.
Figure 12:
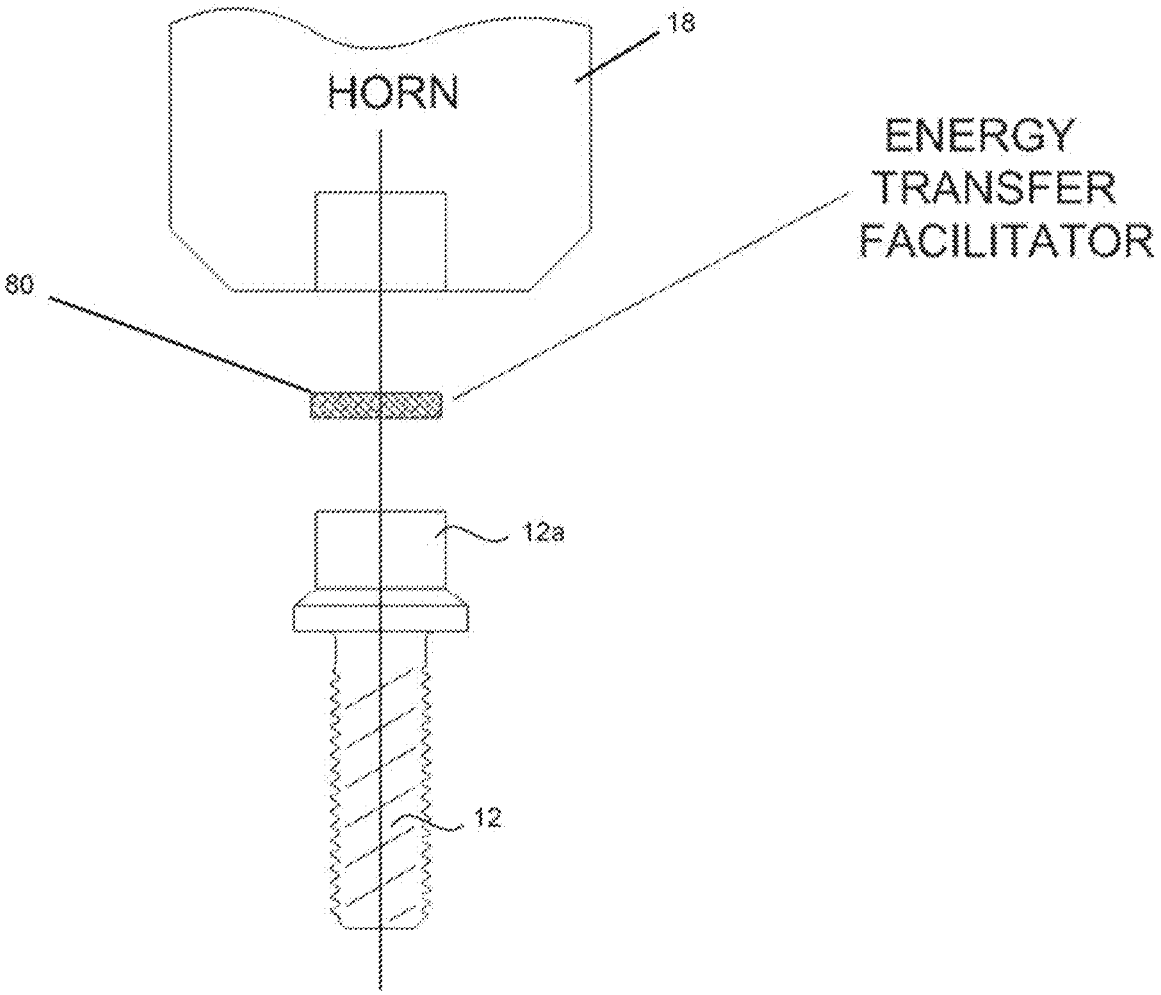
FIG. 12 is a view of the horn and fastener further illustrating an energy transfer facilitator for facilitating transfer of energy from the horn into the fastener.

FIG. 11 illustrates still another embodiment of possible horns 18 or sockets or tips 20*v*, 20*vi* and 20*vii*. For ease of illustration, FIG. 11 illustrates both a plurality of horns 18*v*, 18*vi* and 18*vii* and a plurality of sockets or tips 20*v*, 20*vi* and 20*vii* that are adapted to cause an acoustic or ultrasonic energy that causes a vortex or helical energy internally in the fastener 12 which, in turn, facilitates loosening or tightening the fastener 12. In this regard, the vortex or helical energy is selected to be in a predetermined direction which is defined by the shape of the horn 18, three of which are illustrated in FIG. 11. Note that the horns 18*v*, 18*vi* and 18*vii* or sockets or tips 20*v*, 20*vi* and 20*vii* are frusto-conical in shape and each comprise a helical groove 70*a*, 70*b* and 70*c*. FIG. 11 shows three illustrative embodiments of the horns 18*v*, 18*vi* and 18*vii*. Notice that the horns 18 or sockets or tips 20*v* and 20*vi* cause a counter-clockwise rotational vortex or helical application of energy to be applied to the screw. The thread of the threaded projection 20*a* has a thread direction that is opposite hand of the sonic direction caused by the vortex or helical energy. It should be understood that the vortex or helical energy travels into the fastener 12 and causes not only an elongation and shortening of the fastener 12 but also a slight rotational force or movement of the fastener 12 when the horn 18 is energized after it is placed on the head and/or nut 12*a* of the fastener 12.

In contrast, note that the horn 18*viii* or socket, screwdriver bit, and/or torque bit or tip 20*vii* has a helical groove 70*b* in a clockwise direction which causes an acoustic vortex or helical energy to apply a clockwise rotational and helical force to be applied to the fastener 12 which results in tightening the fastener 12 after the horns 18*v*, 18*vi*, 18*vii* or sockets or tips 20*v*, 20*vi* or 20*vii* are mounted to the horn 18.

Advantageously, the system 10 comprises at least one or a plurality of helical grooves 70*a*-70*c* that cause the acoustic/ultrasonic signal to vortex in a predetermined direction that is selected depending on whether or not the user wishes to loosen or tighten the fastener 12. For example, the vortex may be selected to be counter-clockwise for a right-handed threaded fastener 12 or clockwise for left-handed threaded fastener 12 to facilitate rotating the fastener 12 when the acoustic/ultrasonic signal passes therein to loosen it. Likewise, the vortex may be selected to be clockwise for a right-handed threaded fastener 12 or counter-clockwise for a left-handed threaded fastener 12 to facilitate rotating the fastener 12 when the acoustic/ultrasonic signal passes therein to tighten it.

During operation, the horn 18 and/or socket, screwdriver bit, and/or torque bit tips 20 are selected in response to the shape and size of the head and/or nut 12*a* of the fastener 12. The horn 18 is mounted to the armature 16*a*. Alternatively, and for the embodiment illustrated in FIG. 9, the replaceable socket, screwdriver bit, and/or torque bit tips 20 is selected in response to the fastener head and/or nut 12*a* and mounted onto the horn 18 as mentioned earlier herein. To accommodate the sockets, screwdriver bits, and/or torque bit tips 20 illustrated in FIG. 9 or, similar to FIG. 8, the horns 18 or sockets, screwdriver bits, and/or torque bit tips 20 may be provided with the helical groove 70*a*, 70*b* or 70*c* as described earlier. Once the appropriate horn 18 and/or socket, screwdriver bit, and/or torque bit tip 20 is selected and assembled together as described herein and the horn 18 and/or socket, screwdriver bit, and/or torque bit tips 20 is mounted directly onto the head and/or nut 12*a* of the fastener 12. Thereafter, the acoustic/ultrasonic generator 14 is energized and causes the acoustic/ultrasonic input signal 14*a* to be applied to the horn 18 and/or socket, screwdriver bit, and/or torque bit tips 20 and then ultimately to create the focused energy at the predetermined focus area 25 in the fastener. In a preferred embodiment, the rotational torque applicator 40 described earlier herein is also energized or the wrench 42 is used manually to rotatably drive the fastener 12 substantially simultaneously as the acoustic/ultrasonic energy passes into the fastener 12.

To facilitate the energy transfer, the system 10 may comprise an energy transfer facilitator 80 (FIG. 12) for facilitating transferring the ultrasonic or acoustic energy from the horn 18 and into the fastener 12. In the illustration being described, the energy transfer facilitator 80 may comprise at least one of an acoustic/ultrasonic fluid or material that is arranged between the horn 18 and the head and/or nut 12*a* of the fastener 12 or a socket, screwdriver bit, and/or torque bit tip that is mounted on the fastener 12. The acoustic/ultrasonic fluid may absorb minimal acoustic energy while traveling into the fastener 12, but it has been found that the use of the energy transfer facilitator 80 does facilitate transferring the acoustic or ultrasonic energy into the fastener 12. In the illustration being described, the energy transfer facilitator 80 may be comprised of, but not limited to, Teflon, oil, water, gel, foam, glycol, glycerin, and/or a polymer film or a minimally absorbing spacer.

Figure 13:
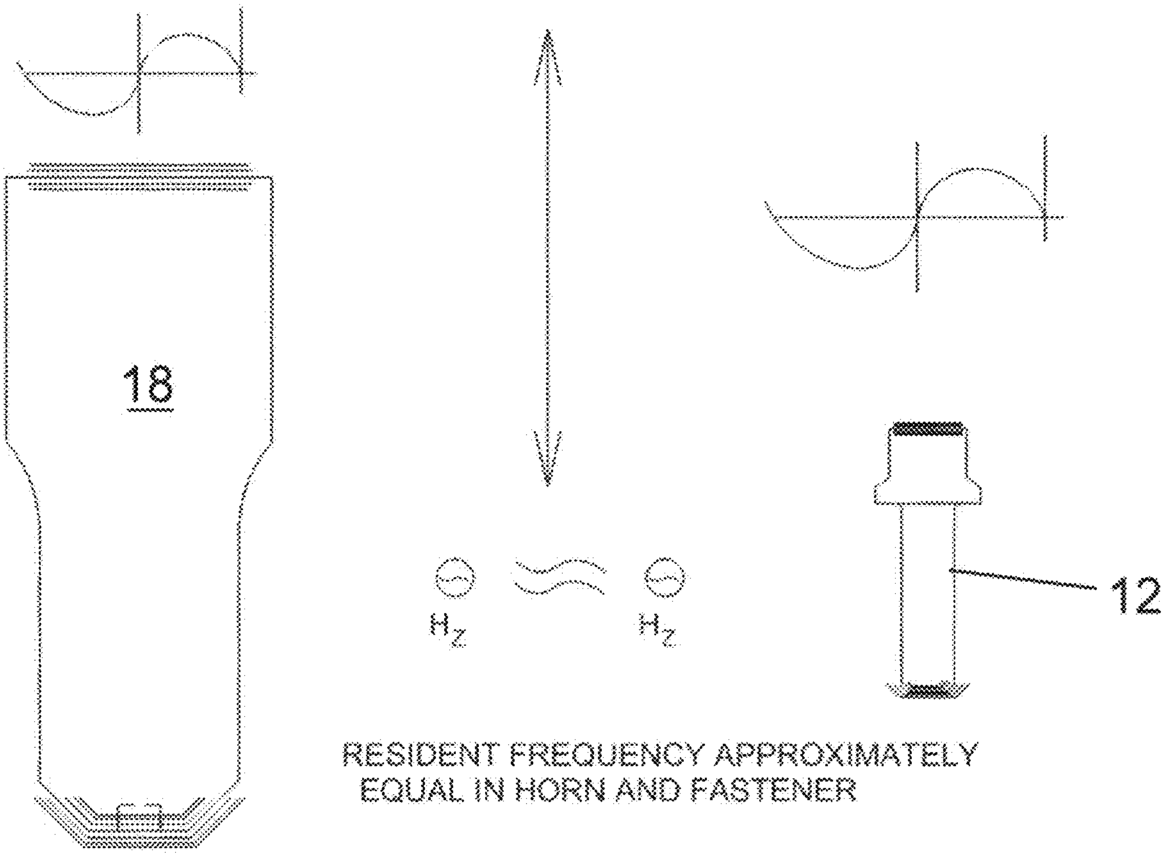
FIG. 13 is a view illustrating the resonant frequency of the horn corresponding to the resonant frequency of the fastener.

FIG. 13 illustrates still another embodiment of the horn 18 and a mating fastener 12. In this embodiment, it should be understood that the resonant or non resonant frequency of the horn 18 corresponds to the resonant or non-resonant frequency of the fastener 12 which also facilitates the transfer of the ultrasonic or acoustic energy into the fastener 12. In FIG. 13 and in this illustration, the resonant or non-resonant frequencies are approximately similar in both the horn 18 and the fastener 12. The inventors have found that matching the resonant or non-resonant frequency of the horn 18 to the resonant or non-resonant frequency of the fastener 12 further facilitates loosening or tightening the fastener 12 as desired.

Figure 14:
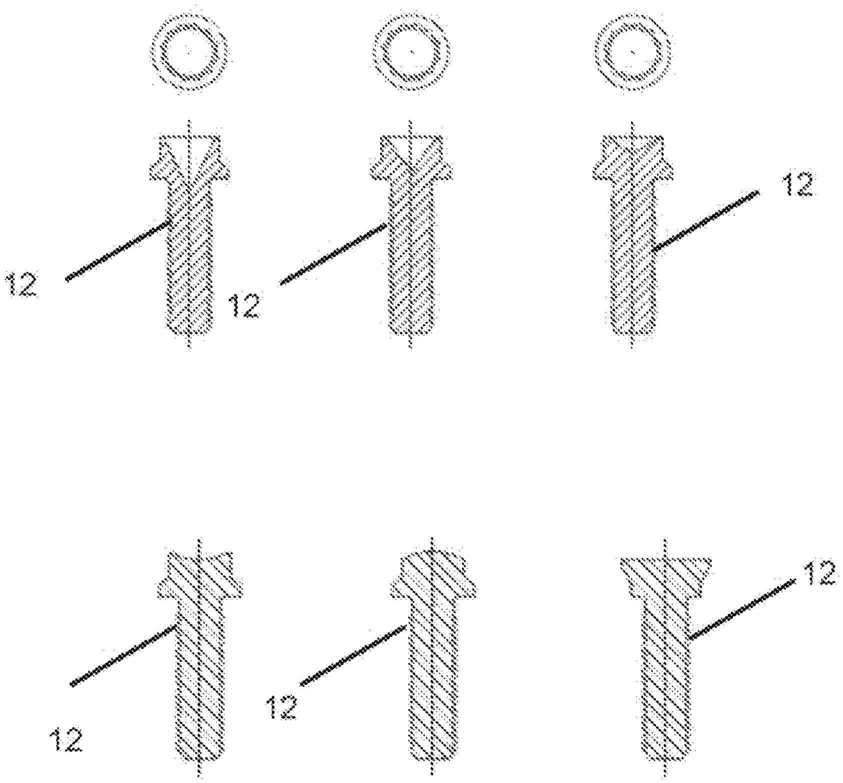
FIG. 14 is a view of various representative bolt head designs used to facilitate energy transfer.

In FIG. 14 the inventor has found that the bolt head designs can be optimized to allow for transfer for acoustic energy. In this regard, the fastener heads may comprise predetermined characteristics, such as at least one of a concave end surface, a convex end surface or a flat end surface.

Referring now to FIGS. 15-20G, other embodiments of the ultrasonic fastener tool and system 10 are shown. For ease of illustration and description, like or similar parts in each of the embodiments are identified with the like part numbers, except a prime mark ("'"), a double prime mark ("''") and a triple prime mark ("'''") has been added as shown.

Figure 15:
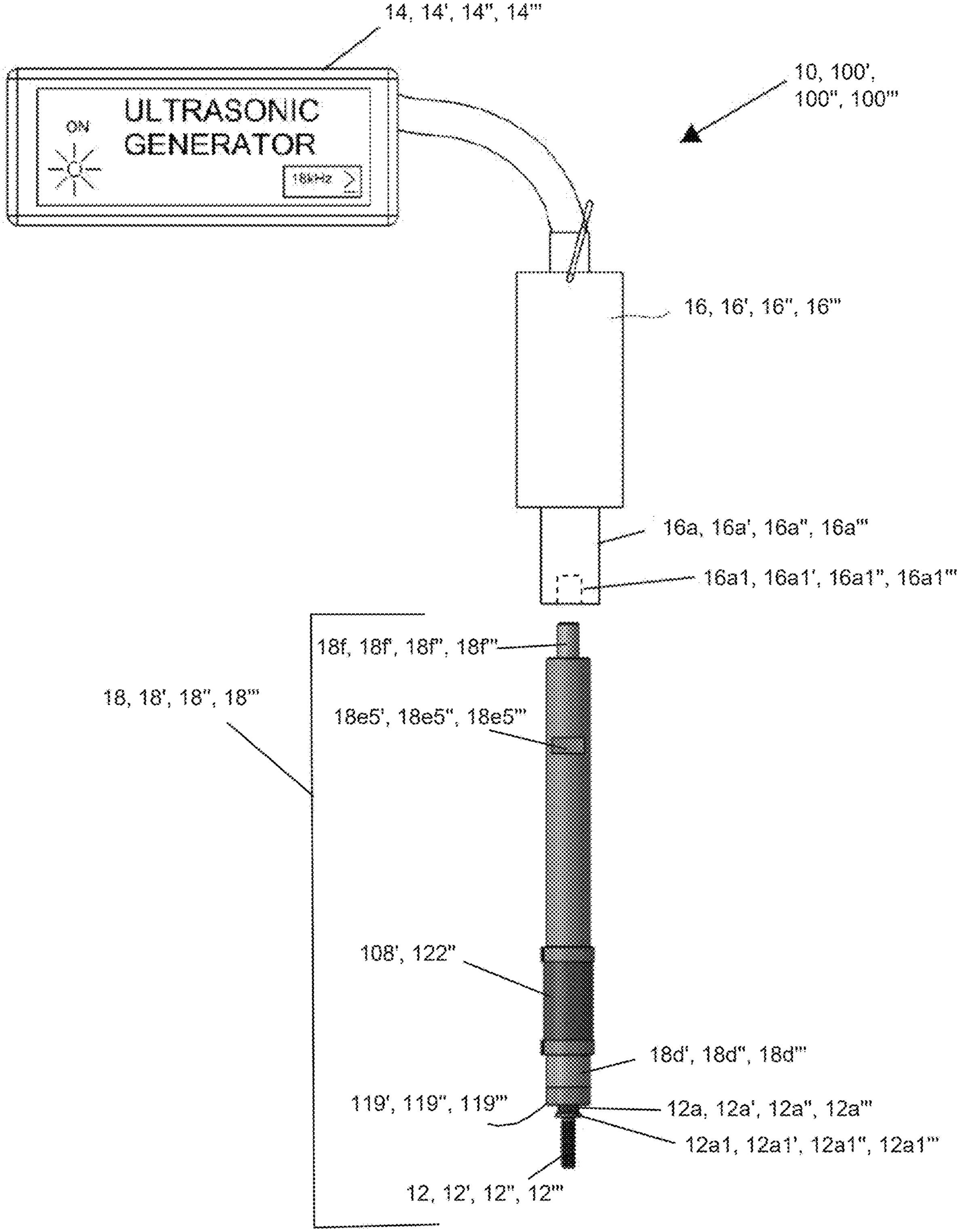
FIG. 15 is a view of another embodiment of other embodiments of the invention comprising a horn having at least one or a plurality of flexible ultrasonic joints that permit the horn end to pivot in at least one or a plurality of planes and at least partially about at least one or a plurality of axes.

Referring now to FIGS. 15-20G, another system 100', 100'' is shown that comprises at least one or a plurality of flexible ultrasonic joints 102', 120''. As with the prior embodiments, the systems 100', 100'' (FIGS. 16A-16H and 17A-17H, respectively) comprises the ultrasonic generator 14', 14'' that operates and is adapted to function like the acoustic ultrasonic generator 14 of the prior embodiments of FIGS. 1-14. In the embodiments of FIGS. 15-16H, the system 100', comprises the fastener tool 16' having an armature 16*a*' and an aperture 16*a*1' that is threaded and that threadably receives a mating male threaded projection 18*f*' so that an ultrasonic or acoustic energy may be applied through the armature 16*a*', through the horn 18' and ultimately to the fastener 12' as shown. For ease of illustration, some figures show the male threaded projection 18*f*' without threads, but it should be understood that they are also threaded. It should be understood that the embodiments of FIGS. 1-20G permit the selection of an appropriate fastener tool 16, 16', 16'' and 16'' (described later herein) in response to whether the application requires a pivoting horn 18' and 18'' that comprises at least one flexible ultrasonic joint 102', 120''.

Figure 16A:
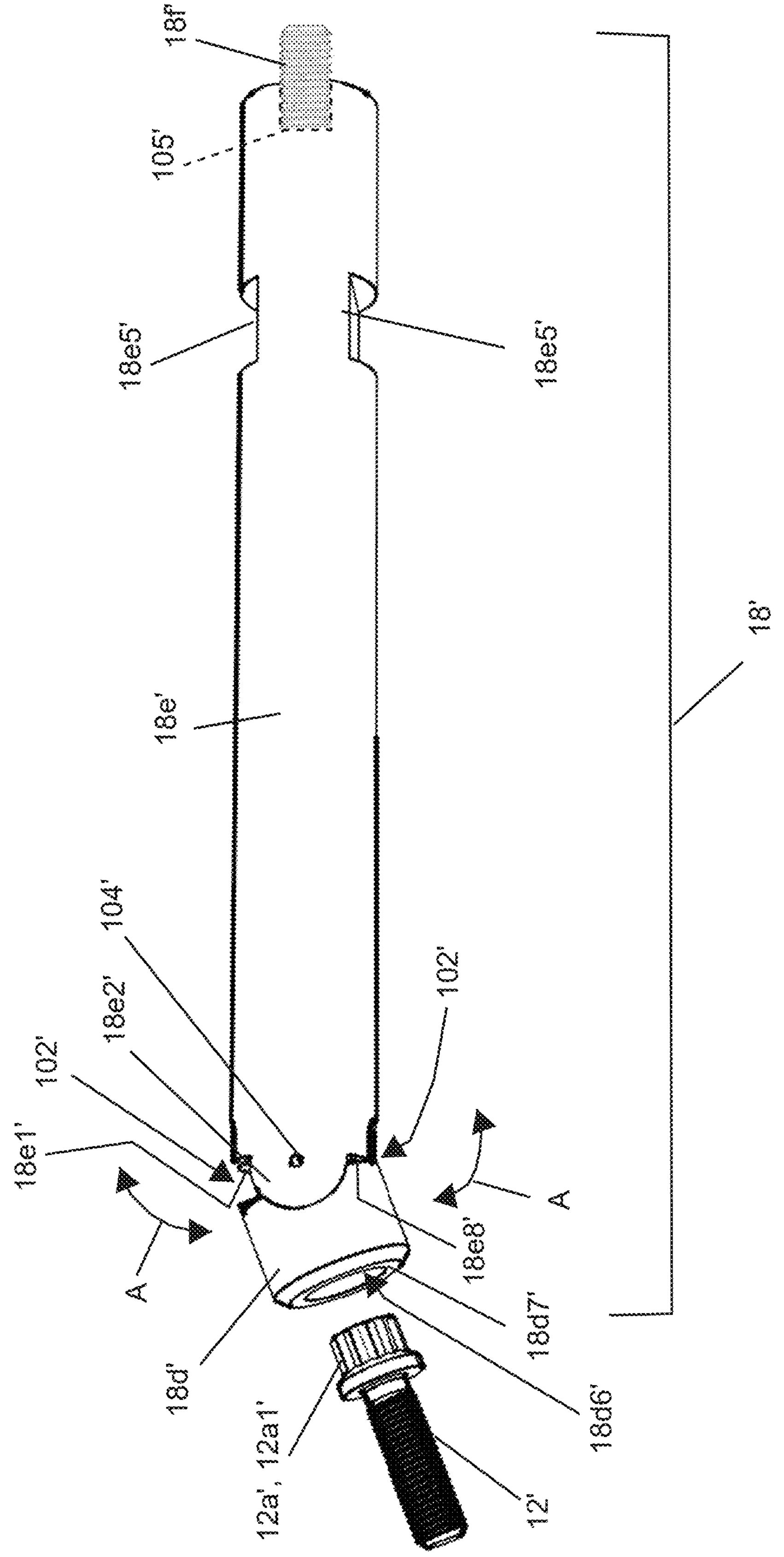
FIGS. 16A-16B are views of an embodiment showing a single flexible ultrasonic joint.
Figure 16B:
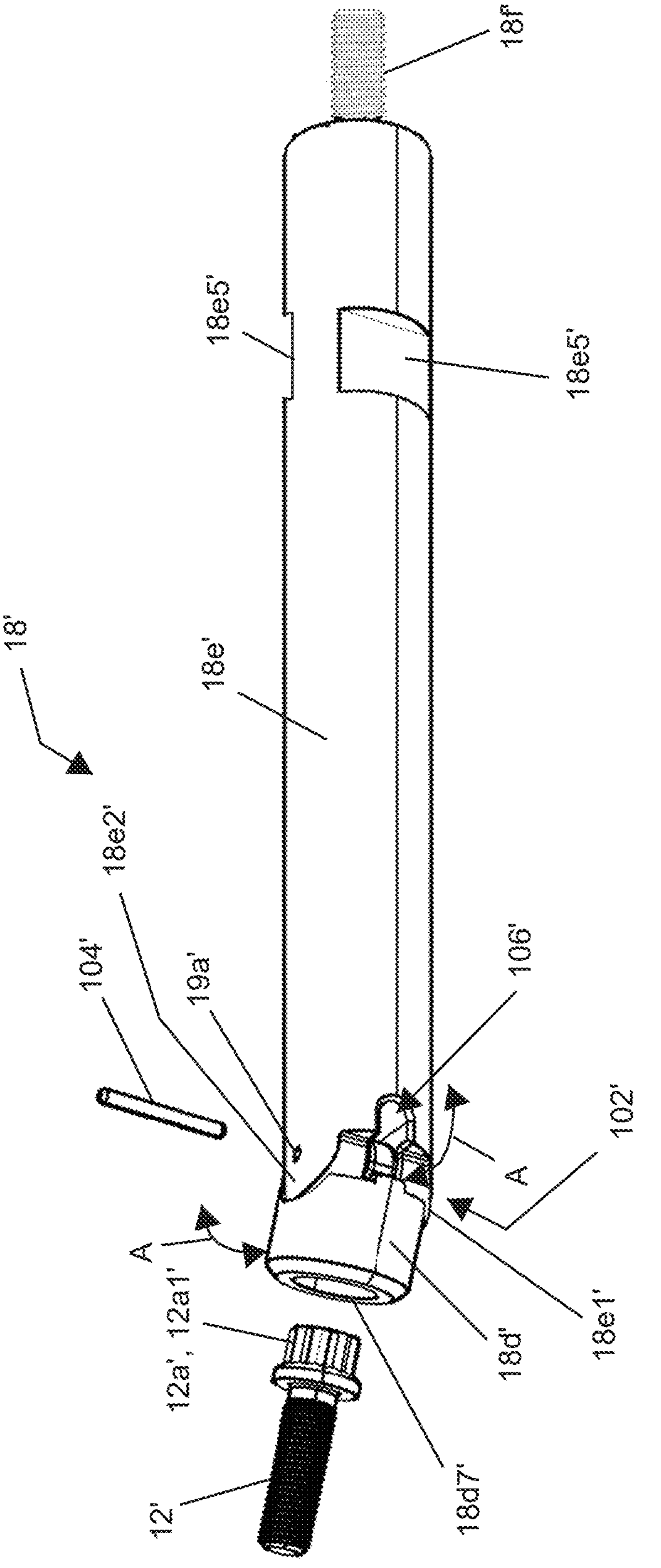
Figure 16C:
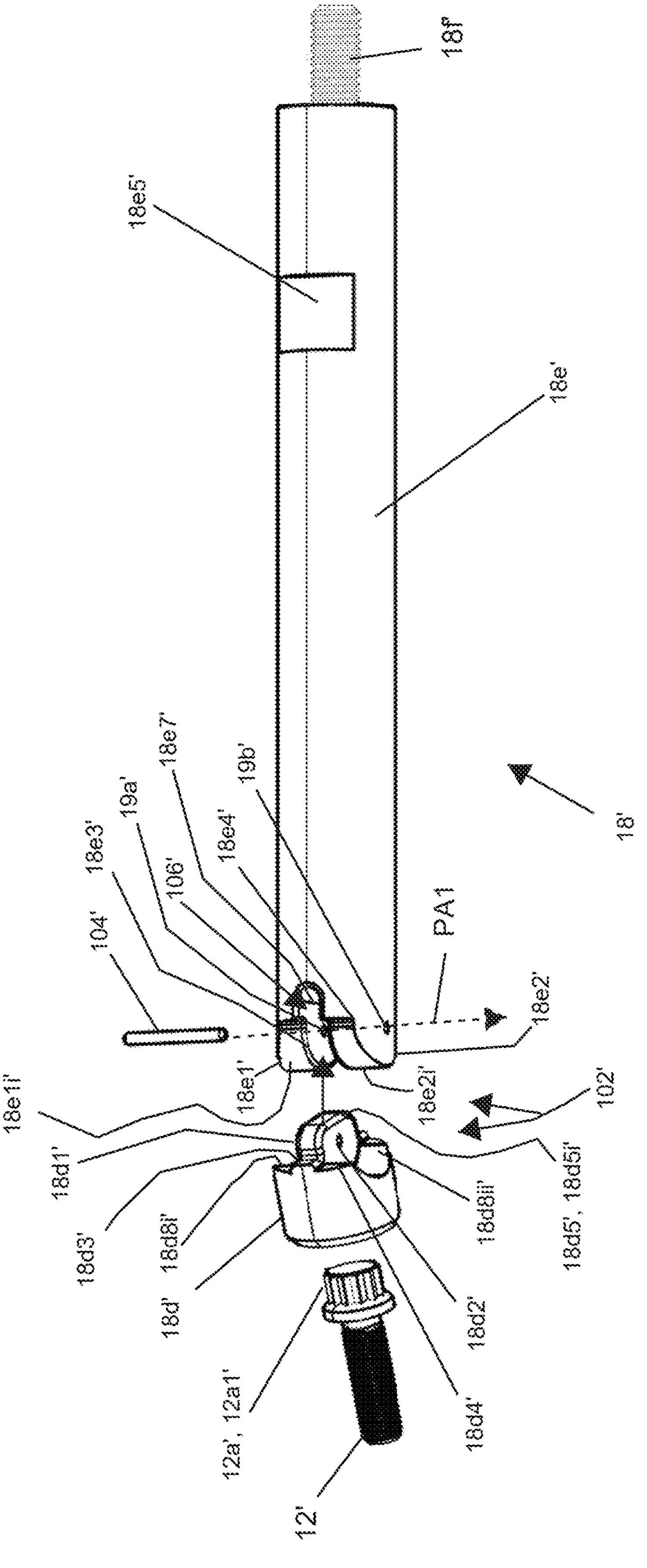
FIG. 16C is a view similar to FIG. 16A showing the pivoting horn end adapted to receive a head of the fastener.
Figure 16D:
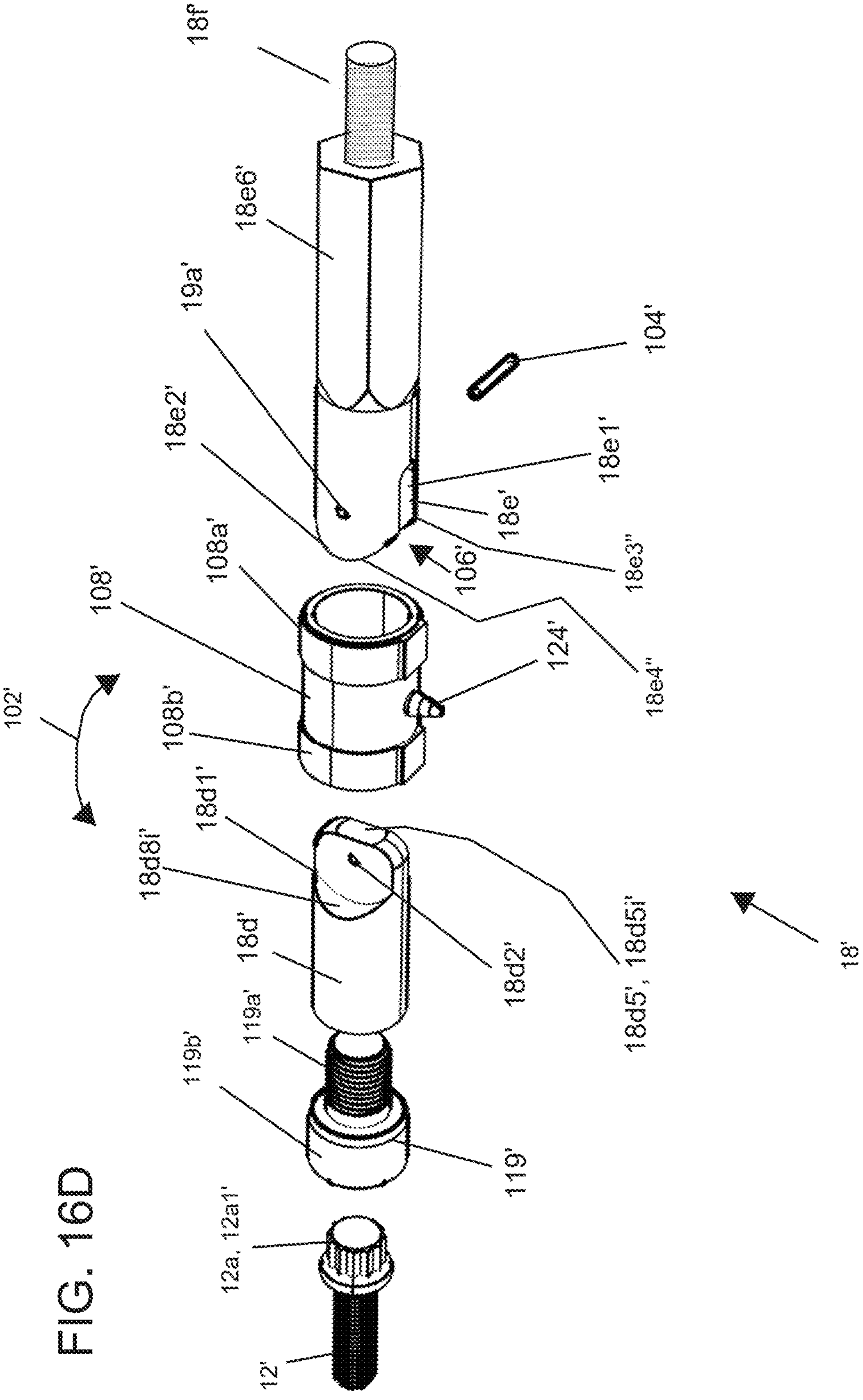
FIG. 16D is a view similar to FIGS. 16A-16C showing various features of another embodiment including a horn end receiving a tip and also showing a sleeve for covering the flexible ultrasonic joint and showing a body having a hex working surface.
Figure 16E:
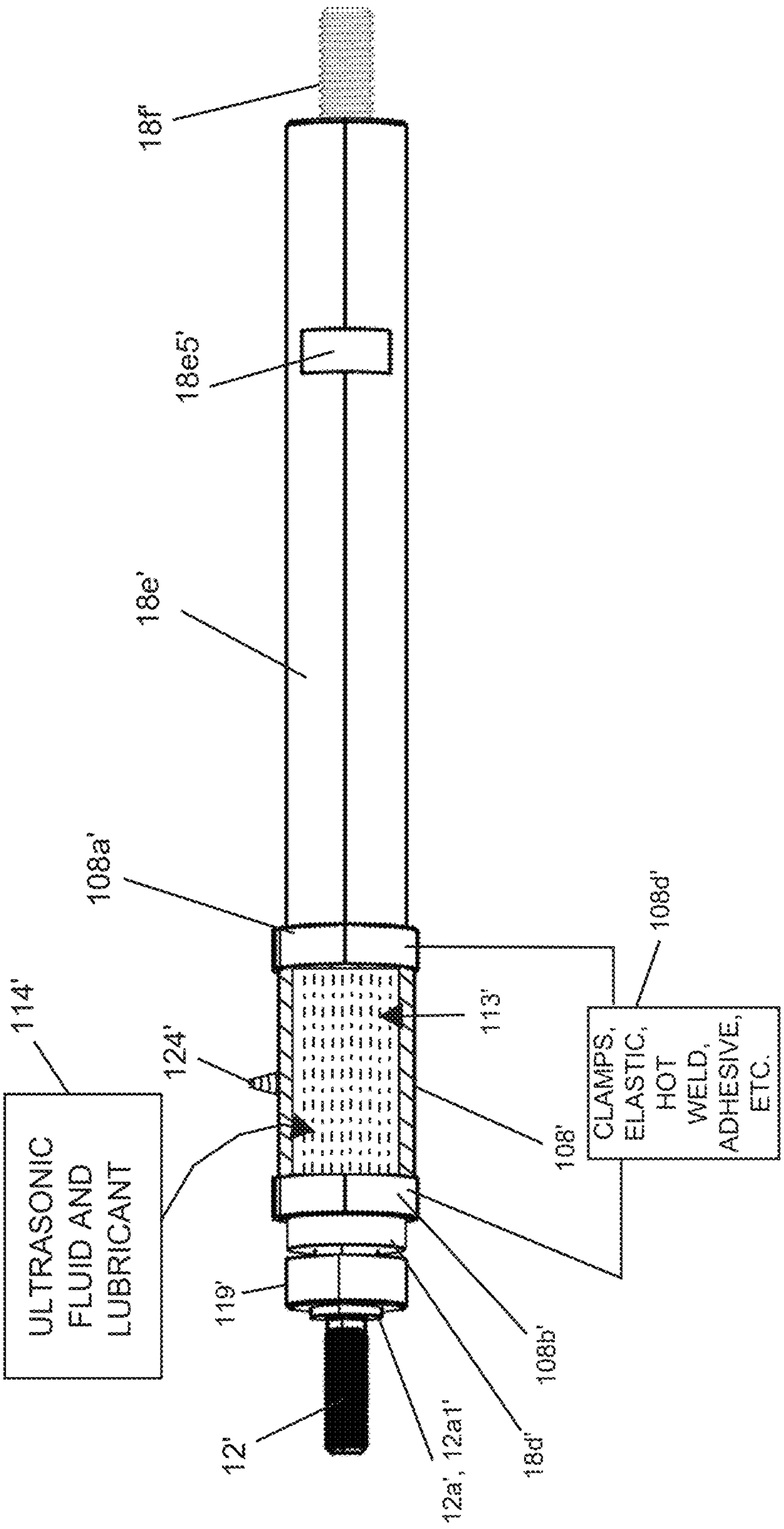
FIG. 16E is an assembled and partial fragmentary view of the embodiment shown in FIG. 16B illustrating an ultrasonic fluid and/or lubricant situated in a fluid storage area defined by a sleeve.

In general, the horn 18' in FIG. 16A is secured to the armature 16*a*' as described earlier herein. In the illustration being described, the fastener tool 16' and the components described herein relative to the embodiments of FIGS. 15-16H are adapted to provide an ultrasonic tool for loosening or tightening the fastener 12' that is typically mounted on a structure, such as a jet engine component. As described earlier, the fastener 12' can become extremely difficult to loosen or tighten during maintenance or repair, and the embodiments described herein facilitate providing an acoustic/ultrasonic generator 14' for generating an acoustic or ultrasonic energy that passes through the armature 16*a*' and ultimately to the fastener 12' in order to facilitate tightening or loosening the fastener 12' when the ultrasonic energy is applied. As mentioned herein, a rotational torque may also be applied to the armature 16*a*' and horn 18', either during or separate from the application of the acoustic or ultrasonic energy, to facilitate applying such torque to the fastener 12'.

Advantageously, in the system, method and tool of the embodiments being described, the horn 18' comprises at least one flexible ultrasonic joint 102'. Notice that the embodiment of FIGS. 16A-16H comprises at least one flexible ultrasonic joint 102' that permits the horn end 18*d*' to pivot in a plane, such as the imaginary plane represented by double arrows A in FIGS. 16A and 16B. Thus, the horn end 18*d*' can pivot in the plane and at least partially about at least one predetermined axis PA1, which is defined by the pivot axis PA1 of the pivot pin 104' (FIG. 16C). These embodiments utilize the at least one flexible ultrasonic joint 102' between the horn body 18*e*' and the horn end 18*d*'. In this regard, the horn 18' of the embodiment illustrated in FIGS. 16A-16H comprises the horn body 18*e*' and the horn end 18*d*' that pivots in the at least one predetermined plane and at least partially about the axis PA1 (FIG. 16C) after the components are assembled and secured together with the pivot pin 104' as described herein. Details of the at least one flexible ultrasonic joint 102' will be described later herein. It is important to note that the at least one flexible ultrasonic joint 102' permits the horn end 18*d*' and/or any interchangeable tip 20' or horns 18*i*'-18*iv*' that may be coupled thereto to pivot at least partially in the predetermined plane, such as the plane represented by the double arrow A in FIGS. 16A and 16B, and at least partially about the axis PA1.

As best illustrated in FIG. 16C, the horn body 18*e*' is pivotally coupled to the pivoting horn end 18*d*' with the at least one flexible ultrasonic joint 102' with the at least one flexible ultrasonic joint 102' and these parts are adapted and configured to mate as illustrated in FIG. 16C. The horn end 18*d*' and horn body 18*e*' are pivotally secured together with the at least one flexible ultrasonic joint 102' using the pivot pin 104' as illustrated. In this regard, note that the horn body 18*e*' comprises a fork or pair of legs or projections 18*e*1' and 18*e*2' that cooperate to define a groove, channel or slot 106' that is adapted to receive a male projection 18*d*1' of the horn end 18*d*'. The male projection 18*d*1' comprises an aperture 18*d*2' that generally becomes co-aligned or co-axial with the apertures 19*a*' and 19*b*' in the projections or legs 18*e*1' and 18*e*2', respectively of the horn body 18*e*'. After the male projection 18*d*1' is inserted in the slot 106', and a pivot pin 104' is inserted in the apertures 18*d*2', 19*a*' and 19*b*' to pivotally fasten or couple the components 18*d*' and 18*e*' together to create the flexible ultrasonic joint 102'. This permits the working horn end 18*d*' to pivot relative to the horn body 18*e*' to facilitate accessing tough-to-access fasteners 12' in a structure or part.

FIGS. 16B, 16C, 16F and 16G illustrate features of the horn end 18*d*' and male projection 18*d*1'. FIG. 16A illustrates a complete assembly with the horn end 18*d*' pivotally secured to the body 18*e*'. Notice in FIG. 16C that the legs or projections 18*e*1' and 18*e*2' have surfaces 18*e*1*i*' and 18*e*2*i*', respectively, that are radiused or have a radius of curvature to permit smooth pivoting and travel of the horn end 18*d*' on the horn body 18*e*'. These surfaces of the projections or legs 18*e*1*i*' and 18*e*2*i*' mate with the surfaces 18*d*8*i*' and 18*d*8*ii*', respectively. As will be described later, these embodiments will be in direct engagement and contact with no fluid gap or space when used "dry" and without ultrasonic fluid and lubricant 114' (FIG. 16E) described later. Alternatively, they can be spaced or provided with a fluid gap when a "wet" coupling is desired so that the ultrasonic fluid and lubricant 114' may be used. The "dry" versus "wet" coupling will be describer described later herein. The surfaces of part 18*d*5' (FIG. 16C) and the surface of part 18*e*7' directly engage in the "dry" embodiment to facilitate permitting the ultrasonic energy to pass therethrough as explained later.

Thus, the horn end 18*d*' comprises the radiused surfaces 18*d*8*i*' and 18*d*8*il*' which are adapted and complementarily sized to mate with and receive the curved ends or surfaces 18*e*1*i*' and 18*e*2*i*', respectively, so that the curved surfaces 18*e*1*i*' and 18*e*2*i*' of the projections 18*e*1' and 18*e*2' provide a travel guide for and direct contact for ultrasonic wave transmission. This also facilitates permitting the horn end 18*d*' to pivot on the horn body 18*e*' after the pivot pin 104' secures the horn end 18*d*' to the horn body 18*e*'. A pair of flat areas 18*e*3' and 18*e*4' cooperates with the radiused surfaces

18*d*3', 18*d*4' to provide a travel stop to facilitate preventing unwanted pivot travel of the horn end 18*d*' relative to the horn body 18*e'*.

Once the horn end 18*d*' is pivotally secured to the horn body 18*e*' with the at least one flexible ultrasonic joint 102' in the manner described herein, a threaded projection 18*f*' is mounted in a threaded aperture 105' (illustrated in FIG. 16A) and secured into the threaded aperture 16*a*1' of the armature 16*a*', thereby securing the tips 20' or horn 18' to the fastener tool 16'. Once the horn body 18*e*' is coupled to the fastener tool 16', the horn end 18*d*' may be placed directly on the nut or fastener head 12*a*1'. Alternatively, the interchangeable tip 20' may be secured to the horn end 18*e*' and threadably secured in the threaded aperture 18*d*6' (FIG. 16A) with the threaded projection 20*a*' in a manner similar to the embodiments of FIGS. 1-14. It should be understood that as with the prior embodiments, the threaded projection 20*a*' couples the interchangeable tip 20' or preselected horn 18' to the horn end 18*d*'. It should be understood that as with the prior embodiment, features of the horn 18' shown in FIGS. 8, 9, 10A-10B, 11 and 12-13 may be utilized with the embodiment described herein relative to FIGS. 15-20G. Moreover, the fastener 12' used with this embodiment can also comprise the predetermined shapes shown and described earlier herein relative to FIG. 14 or other shapes as well. The fasteners 12' shown in FIGS. 15-16H may also be used.

Notice in FIG. 16A that a pair of generally opposing flat areas 18*e*5' may be provided on or in the armature body 18*e*' so that a wrench or the torque tool 40' (shown in FIG. 1) may be used to tighten or loosen the horn body 18*e*' to or from the armature 16*a*'. Alternatively, and as illustrated in FIG. 16D, the horn body 18*e*' may be manufactured or machined to provide a hexagonal or polygonal shape or surface 18*e*6' (FIG. 16D) to facilitate using a wrench or tool 40' on the horn body 18*e*' to apply a rotational torque.

The horn end 18*d*' and horn body 18*e*' may be "dry" or "hard" coupled together so that the materials of the components engage directly, such as steel on steel, so that there is no fluid gap or material (such as a polymer material) between any of the contact surfaces that carry the ultrasonic or acoustic energy to the fastener 12', including the at least one flexible ultrasonic joint 102'. The "dry" embodiment is described later herein relative to FIGS. 18A-18C. They may also be coupled using a "wet" coupling which will also be described later.

In the illustration being described, the design and shape of the components (such as the horn body 18*e*, 18*e*', 18*e*" and 18*e*", the horn end 18*d*, 18*d*', 18*d*" and 18*d*" and the flexible ultrasonic joints 102', 120") comprise a predetermined geometric shape that facilitates focusing the acoustic and ultrasonic energy towards the distal tip or horn end 18*d*', 18*d*" and the fastener 12'. In the prior art, no other tool has a need to focus acoustic or ultrasonic energy within the tool to a fastener, such as fastener 12, 12', 12" and 12". The mating component surfaces are specially designed surfaces, such as radiused or angled surfaces 18*e*1'-18*d*8*i*', 18*e*2*i*'-18*d*8*ii*' and 18*d*5*i*'-18*e*7', that are in direct engagement. The direct engagement facilitates permitting the ultrasonic or acoustic energy to pass toward the tip or horn end 18*d*', 18*d*" and fastener 12', 12".

Figure 16F:
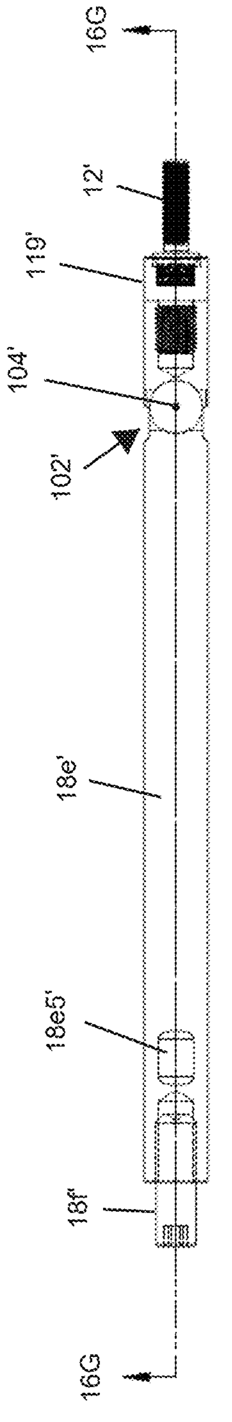
FIG. 16F is a schematic view of the embodiments of FIGS. 16A-16E.
Figure 16G:
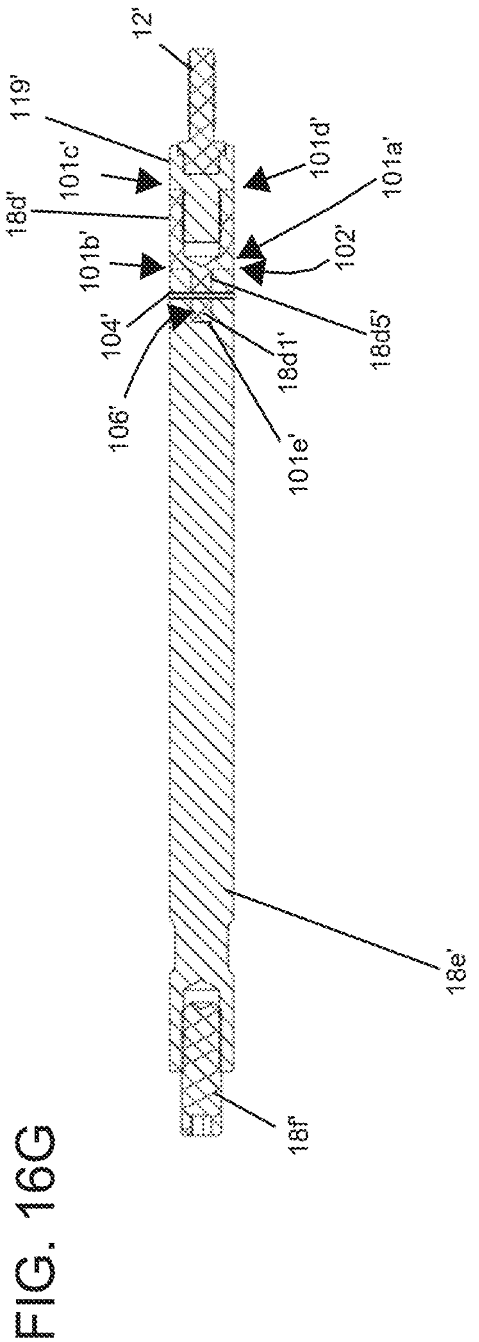
FIG. 16G is a sectional view along the line 16G-16G in FIG. 16F.
Figure 16H:
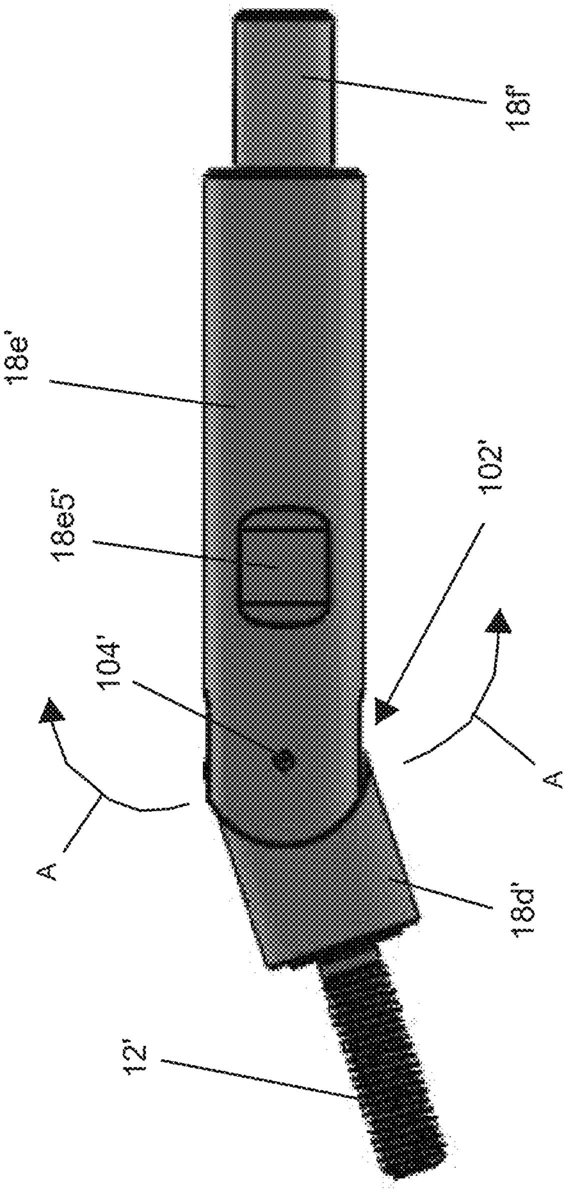
FIG. 16H is a view illustrating how the flexible ultrasonic joint as it would pivot about the axis.

FIGS. 16F-16G are assembled and/or sectional views of the embodiments of FIGS. 16A-16D with FIG. 16G being a sectional view taken along the line 16G-16G in FIG. 16F. Notice that the horn body 18*e*' is a solid one-piece construction and all of the components of the flexible ultrasonic joint 102' are in positive and direct engagement as illustrated so that the acoustic or ultrasonic energy is efficiently passed from the tool armature 16*a*' through the horn body 18*e*', through the flexible ultrasonic joint 102', through the horn end 18*d*' and ultimately to the fastener 12'. Notice in FIG. 16G that the intersections 101*a*', 101*b*', 101*c*', 101*d*' and 101*e*' between engaging surfaces may be metal-on-metal or fluid tight to facilitate providing a dry or hard coupling between and among the various components in order to facilitate the transfer of the acoustic or ultrasonic energy to the fastener 12'. Alternatively, they may be spaced and adapted to define a fluid gap for permitting the ultrasonic fluid and lubricant 114' described later, to pass in and between to facilitate transmission of the ultrasonic energy through the flexible ultrasonic joint 102'.

Alternatively, it should be noted that an optional flexible ultrasonic sleeve 108' may be provided so that the ultrasonic fluid and lubricant 114' may be used to facilitate transfer of the ultrasonic energy. The flexible ultrasonic sleeve 108' is adapted and sized to fit over at least a portion of the body 18*e*' and at least a portion of the horn end 18*d*' to encase and seal the at least one flexible ultrasonic joint 102'. While optional in the illustration being described, the flexible ultrasonic sleeve 108' may be comprised of a flexible or elastic material, such as a polymer construction, plastic, rubber or PVC. The sleeve 108' provides a boot or protective covering for the at least one flexible ultrasonic joint 102'. It should be appreciated and understood that after the flexible ultrasonic sleeve 108' is mounted on the horn body 18*e*' and horn end 18*d*', the flexible ultrasonic sleeve 108' provides a fluid tight seal about the flexible ultrasonic joint 102'. The ends 108*a*' and 108*b*' of the flexible ultrasonic sleeve 108' may be secured via heat shrink, an adhesive or weld (not shown) or a plurality of small metallic or plastic clamps 108*d*' (FIG. 16E) on both ends 108*a*' and 108*b*' of the flexible ultrasonic sleeve 108'. In one embodiment, the ends 108*a*', 108*b*' of the sleeve 108' are elastic and are adapted to securely fit on the horn body 18*e*' and the horn end 18*d*'. The clamps 108*d*' for securing and sealing the ends 108*a*', 108*b*' of the sleeve 108' on the horn end 18*d*' and horn body 18*e*' may be conventional. As mentioned, the ends 108*a*', 108*b*' of the sleeve 108' are elastic and sized and adapted to fit on the horn body 18*e*' and the horn end 18*d*'. The clamped or adhered ends 108*a*' and 108*b*' of the sleeve 108' provide a fluid-tight seal about the flexible ultrasonic joint 102'. In one embodiment or optionally, the sleeve 108' may be provided with a fluid nipple 124' (FIG. 16D) for applying the ultrasonic fluid and lubricant 114' about the at least one flexible ultrasonic joint 102' and in an interior fluid storage area 113' (FIG. 16E) inside the sleeve 108' and that surrounds and envelops the at least one flexible ultrasonic joint 102'. Notice in FIG. 16E that the interior fluid storage area 113' is sized or adapted to receive the ultrasonic fluid and lubricant 114'.

Advantageously, the ultrasonic fluid and lubricant 114' may comprise, but is not limited to, any fluid, grease, Teflon, oil, water, gel, foam, glycol, glycerin or liquid that facilitates transmission of the acoustic and ultrasonic energy from the fastener tool 16' through the horn body 18*e*', through the at least one flexible ultrasonic joint 102', through the horn end 18*d*' and ultimately to the fastener 12'. The ultrasonic fluid and lubricant 114' not only facilitates transferring ultrasonic and acoustic energy to the fastener 12', but also provides means for lubricating the components of the at least one flexible ultrasonic joint 102' during use of the fastener tool 16'. The fluid may have a viscosity similar to oil or grease in one embodiment. Features of a "dry" coupling versus a "wet" coupling, where the sleeve 108' is most likely to be used, are described in detail later herein.

Advantageously, the flexible ultrasonic joint 102' is assembled using the pivot pin 104' so that the horn end 18*d*' is pivotally coupled to the horn body 18*e*' to provide or use the at least one flexible ultrasonic joint 102'. The fastener tool 16' may be used in a working environment, such as during the repair of a jet engine component (not shown), other product or where at least one fastener 12' needs to be loosened or tightened. In this regard, the end 18*d*' may be pivoted in the at least one plane and at least partially about the pivot axis PA1 as illustrated in FIG. 16C and aligned with the fastener 12' to be loosened or tightened. After the horn end 18*d*' is pivoted and aligned with the head 12*a*1' of the fastener 12' and the head 12*a*1' may then be received in the horn end 18*d*' that is serrated or adapted to mate with and receive the head 12*a*1'. The fastener tool 16' may then be energized to apply acoustic or ultrasonic energy to the fastener 12', either during rotation of the horn end 18*d*', horn body 18*e* and fastener 12' or when it is not rotating, to facilitate loosening or tightening the fastener 12'. It has been found that the at least one flexible ultrasonic joint 102' enables the fastener tool 16' to be utilized in environments where the fasteners 12' are not easily accessed with the tool 16' and/or where there is a need to pivot the horn end 18*d*' (FIGS. 16A-16B) in order to align its axis with an axis of the fastener 12' to be loosened or tightened.

As mentioned earlier herein, the horn body 18*e*' may comprise the generally opposing flat areas 18*e*5' (FIG. 16A) for use of a torque tool 40 (FIG. 1). As shown in FIG. 16D, the body 18*e*' may be machined to have a hex surface 18*e*6' (FIG. 16D) so that the wrench or tool 40' can be used to rotatably torque and drive the horn body 18*e*' either clockwise or counterclockwise during use.

Advantageously, the embodiments of FIGS. 15-16H show the at least one flexible ultrasonic joint 102' that is adapted to transmit a rotational torque to the horn end 18*d*' and permit the horn end 18*d*' to at least partially pivot about axis PA1 so that an axis of the horn end 18*d*' is not co-axial with an axis of the horn body 18*e*' and while substantially simultaneously permitting transmission of the ultrasonic or acoustic energy from the ultrasonic generator 14' to the fastener 12'. It should be understood that a significant feature of the embodiments is that they permit application of ultrasonic energy when the horn end 18*d*' is pivoted. This is significant in that normally ultrasonic waves travel linearly and do not bend or curve easily.

As mentioned earlier, one significant feature of the illustration being described is that the flexible ultrasonic joints 102', 120" (described later herein) may be operated in a "dry" environment where no ultrasonic fluid and lubricant 114', sleeve 108' or the like is used. In other words, in the illustrations being described, they can be operated with a "wet" flexible ultrasonic joint 102', 120" or they can be operated without the optional sleeve 108', 122" and operated in a "dry" environment without any ultrasonic fluid and lubricant 114". Features of the "wet" versus "dry" will be described later herein.

Because surfaces of the parts are in direct contact in a "dry" environment as explained and are made of metal, the horn end 18*d*" can be stiff or difficult to move initially until some wear has occurred. In some respects, the stiffness of the flexible ultrasonic joint 102' is advantageous because the parts remain relatively fixed after the horn end 18*d*' has been actuated or articulated to a desired position. This is important because oftentimes the tool 16' is used in tight quarters when repairing or working on parts, such as a jet engine component.

Advantageously, the "dry" connection of the single flexible ultrasonic joint 102' enables the acoustic or ultrasonic energy to transfer directly from the armature 16*a*' of the tool 16' through the flexible ultrasonic joint 102', through the horn end 18*d*' and ultimately to the fastener 12'. Again, the direct surface contact between the surfaces of the flexible ultrasonic joint 102' enable the efficient transmission of the ultrasonic energy to the fastener 12' even when the flexible ultrasonic joint 102' is pivoted and the horn end 18*d*' is not co-axial with the horn body 18*e*'. This is explained in more detail later herein in the section of the disclosure entitled "MAINTAINING AND FOCUSING ULTRASONIC ENERGY."

It should be understood that the ultrasonic energy transfer facilitator 80' (FIG. 12) may also be utilized in this embodiment in order to facilitate the transmission of the acoustic or ultrasonic waveforms through the fastener tool 16', the armature 16*a*' and into the fastener 12'. Again, the pivotal coupling between the components 18*d*' and 18*e*' permit the loosening or tightening of the fastener 12' whose axis is not co-axial with the axis of the horn body 18*e*' and after the horn end 18*d*' is pivoted. During use, the fastener tool 16' may apply the ultrasonic and acoustic energy to the fastener 12' either with or without a rotational torque being applied to the horn body 18*e*' and is transmitted directly to the horn end 18*d*' while the ultrasonic and acoustic energy is applied to the fastener 12'.

Figure 17A:
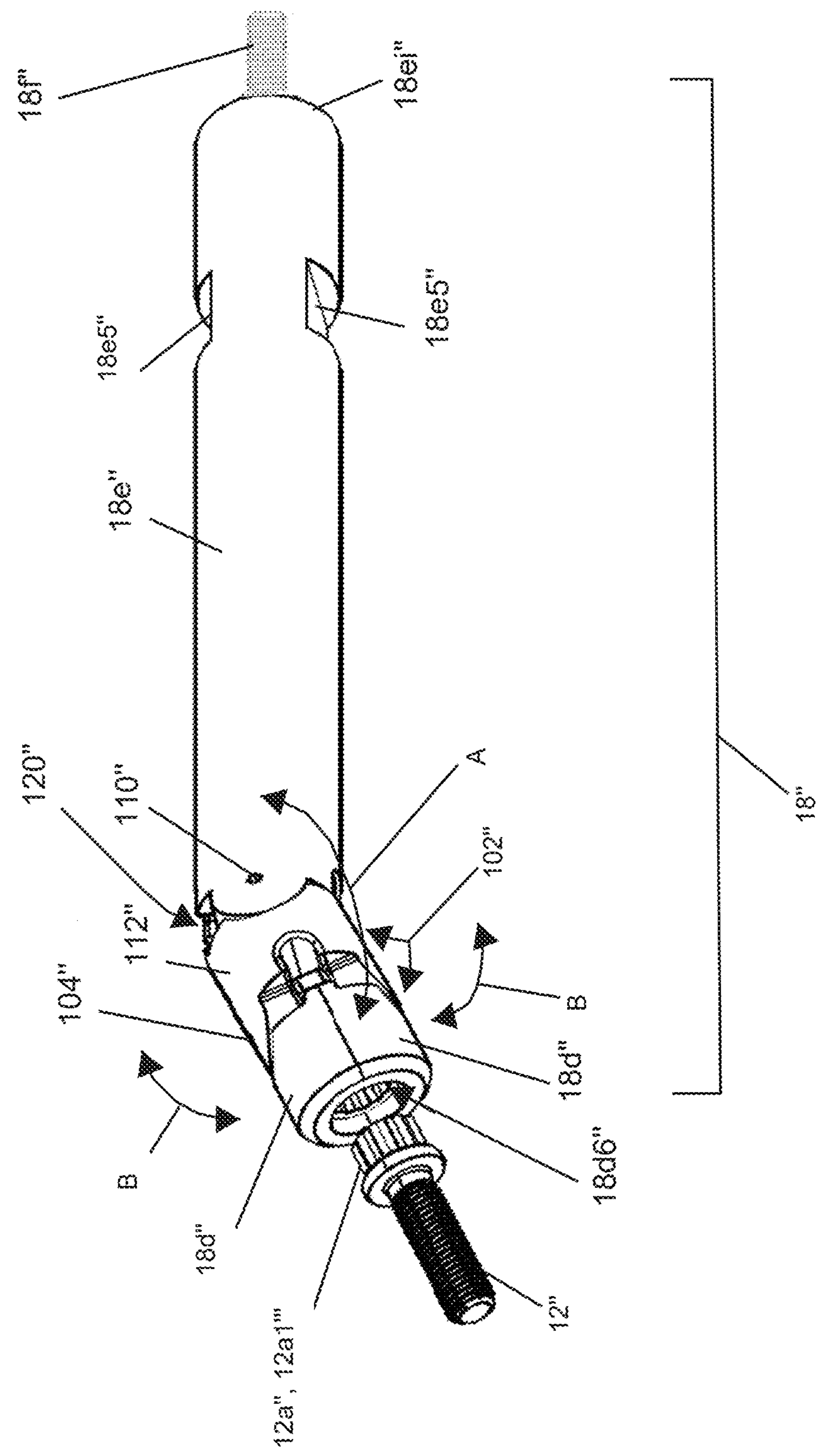
FIG. 17A is a view of another embodiment showing a horn having pivot joints that permit the horn to pivot in a plurality of different planes and at least partially about a plurality of different axes.
Figure 17B:
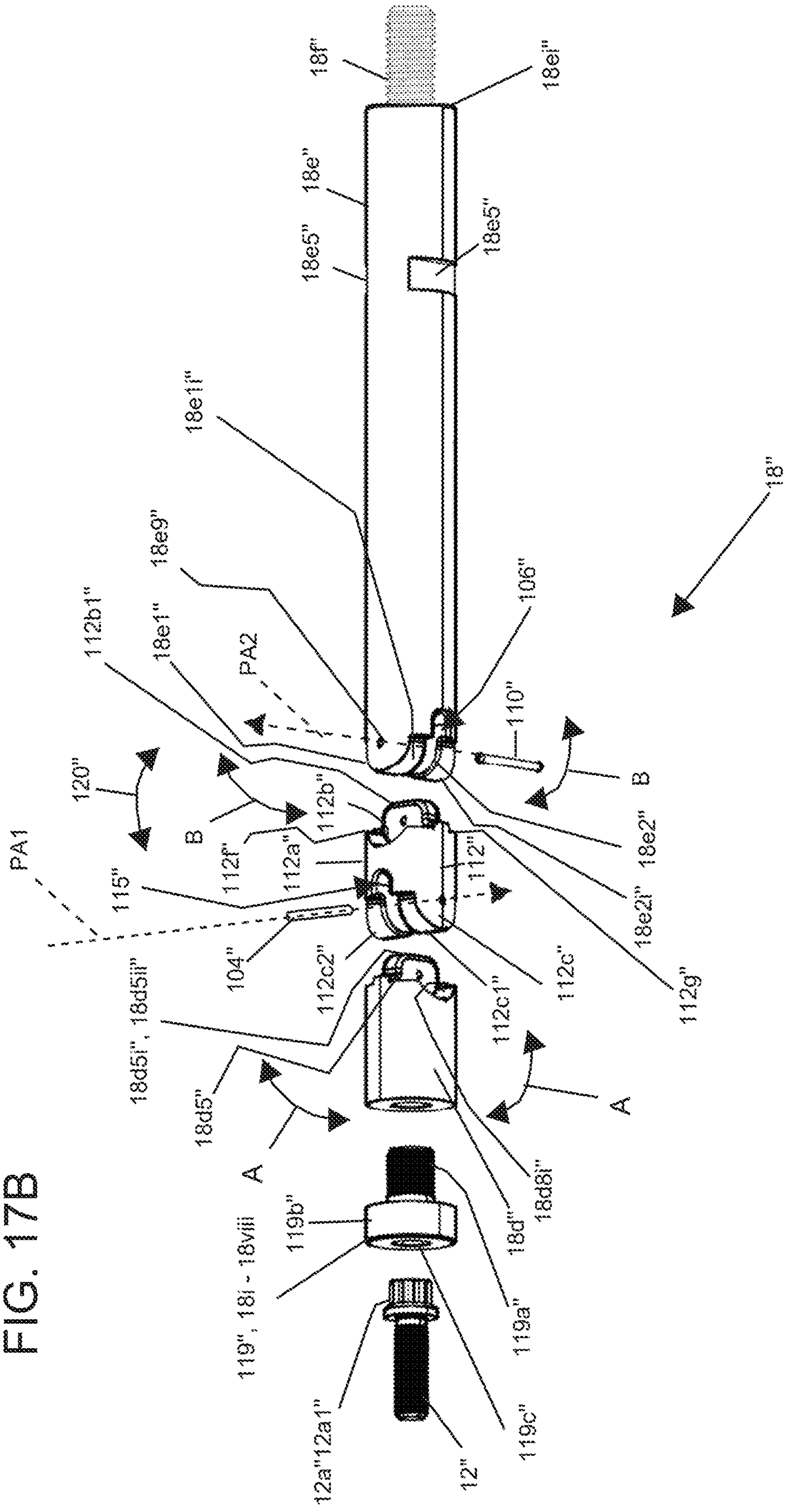
FIGS. 17B-17C are exploded views showing various details of the embodiment shown in FIG. 17A.

Referring now to 17A-17H, another embodiment(s) of the fastener tool 16" is/are shown with like parts in each of the embodiments being identified with the like part numbers, except a double prime mark ("''") has been added thereto. In these embodiments, it should be apparent that the horn 18" (FIG. 17A) has the at least one flexible ultrasonic joint 120" adapted to permit the horn end 18*d*" to pivot at least partially about a plurality of predetermined pivot axes that can be moved so that they are neither coaxial with each other nor coaxial with a tool axis of the fastener tool 16". In this embodiment, similar design features of the embodiment shown in FIGS. 15-16H apply. The horn end 18*d*" pivots in the plane represented by the double arrows A (FIGS. 16A and 17A) in a manner described earlier herein. In the embodiment of FIGS. 17A-17H, the at least one universal flexible ultrasonic joint 120" comprises a second pivot axis PA2 (FIG. 17B) that permits the horn end 18*d*" to pivot in a second imaginary plane represented by double arrows B-B (FIG. 17A). Thus, the horn end 18*d*' in this embodiment can pivot at least partially in multiple axes and in multiple planes.

In the embodiment of FIGS. 17A-17H, the horn 18" comprises multiple sections or components that will now be described. In this embodiment, the horn 18" comprises the at least one flexible ultrasonic joint 120" that permits the horn end 18*d*" to pivot in a plurality of planes and at least partially about a plurality of axes PA1 and PA2. The at least one flexible ultrasonic joint 120" comprises the horn end 18*d*", the horn body 18*e*" and an intermediate pivoting coupler 112" that pivotally couples the horn end 18*d*" to the horn body 18*e*" as shown. In short, the parts 18*d*", 18*e*", 120" and 112" provide or define the at least one flexible ultrasonic joint 120" that permits the horn end 18*d*" to pivot in a plurality of planes, such as the imaginary planes represented by the double arrows A-A and B-B in FIGS. 17B and 17C. Similar to the embodiment illustrated and described relative to FIG. 16C, the horn body 18*e*" of the embodiments of FIG. 17A-17H comprises a pair of opposed and spaced legs 18*e*1" and 18*e*2" (FIGS. 17B-17C) that define a channel, gap or slot 106" (FIGS. 17B, 17C) therebetween that is adapted to receive a tongue or male projection 112*b*" that projects from a first end 112*a*" of the intermediate pivoting coupler 112". Once the male projection 112*b*" is received in the gap or slot 106", a second pivot pin 110" is inserted and press fit into the apertures 18*e*9" (FIG. 17C) on ends 18*e*1" and 18*e*2" and in aperture 112*b*1" (FIG. 17B) to pivotally secure the two parts together and to provide a pin joint connection that permits the intermediate pivoting coupler 112" and the horn end 18*d*" to pivot at least partially in the direction of double arrow A-A in FIGS. 17B and 17C.

Figure 17C:
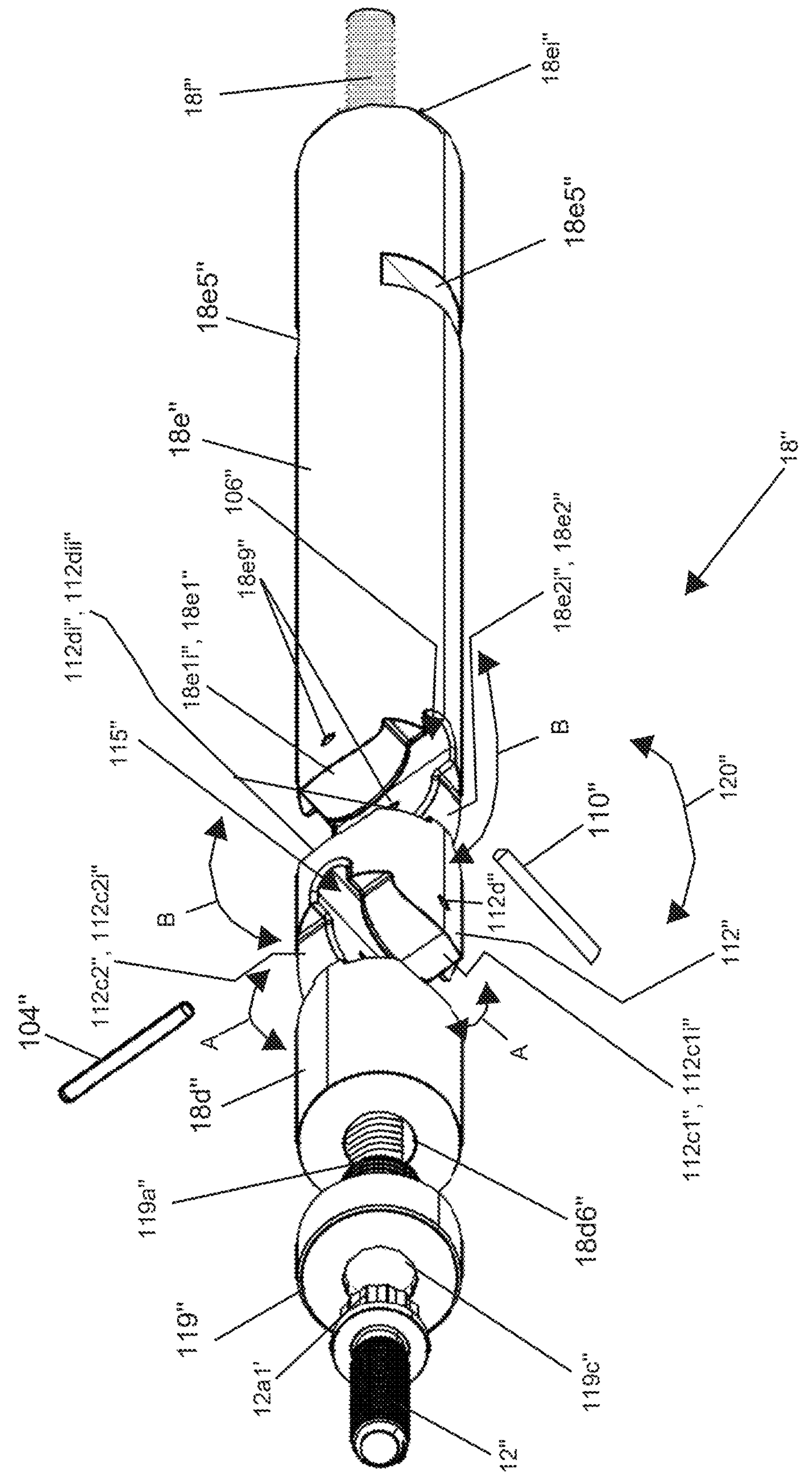
Figure 17D:
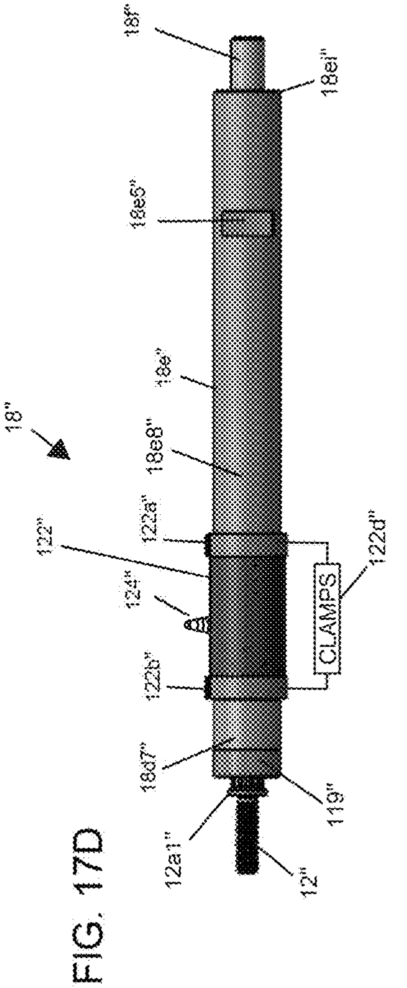
FIG. 17D is an assembled view illustrating a sleeve mounted around the flexible ultrasonic joint.

A second end 112*c*" (FIG. 17B) of the intermediate pivoting coupler 112" also comprises a pair of spaced male projections or legs 112*c*1" and 112*c*2" that cooperate to define a channel, groove or slot 115" (FIG. 17C) sized and adapted to receive a male projection 18*d*5" of the horn end 18*d*" and be pivotally secured thereto with the pivot pin 104" that is inserted into aperture 112*d*" (FIG. 17C). The pivot pin 104" pivotally couples the intermediate pivoting coupler 112" to the horn end 18*d*" to enable it to pivot in a plurality of planes, such as the plane represented by the double arrows A-A and B-B in FIG. 17B. It should be understood that the axes of the pivot pins 104" and 110" are not coaxial and therefore permit the horn end 18*d*" to at least partially pivot about the axes PA1 and PA2 and in the imaginary planes represented by the double arrows A-A and B-B, respectively. In one embodiment, these axes are offset by approximately 90 degrees.

It should be understood that the legs 18*e*1"-18*e*2" and 112*c*1"-112*c*2" are spaced and define the channels, grooves, gaps or slots 106" and 115", respectively, that are sized, spaced and adapted to receive the tongues or male projections 112*b*" and 18*d*5", respectively, which are pivotally secured therein with the pivot pins 110", 104".

As with the embodiment of FIGS. 16A-16H, note that the end surfaces 18*e*1*i*" and 18*e*2*i*" (FIGS. 17B-17C) are curved or have a common radius of curvature that complements a curve and radius of curvature of the walls 112*f*" and 112*g*" (FIGS. 17B-17C) when the intermediate flexible ultrasonic coupler 112" is pivoted in the direction of double arrows B-B. Likewise, the horn end 18*d*" comprises the male projection 18*d*5" received in the channel, grove, gap or slot 115" and secured therein with the pivot pin 104" in the manner described herein.

It should be understood that the intermediate flexible ultrasonic joint 120" enables both the horn end 18*d*" and the intermediate flexible ultrasonic coupler 112" to pivot together or in different planes if desired when the intermediate flexible ultrasonic coupler 112" is pivoted. In contrast, as illustrated in FIGS. 17A-17D, it should be appreciated that the horn end 18*d*" of the embodiments of FIGS. 17A-17D may also at least partially pivot in the direction of double arrow A-A in FIG. 17B without the intermediate flexible ultrasonic coupler 112" pivoting. Thus, the embodiment of FIGS. 17A-17H permit the horn end 18*d*" to pivot at least partially about multiple axes.

As with the prior embodiment, a threaded projection 18*f*" is provided on the end 18*ei*" (FIG. 17A) of the horn body 18*e*" and threadably mounted to the threaded aperture 16*a*1" of the fastener tool 16" as with prior embodiments. The assembly may then be used to loosen or tighten the fastener 12" as shown and described herein.

In the embodiments of FIGS. 15-17H, it should be understood that the horn end 18*d*" may define the torque bit tip 20" that is adapted, sized and dimensioned to receive a fastener head 12*a*1', 12*a*1" so that the acoustic or ultrasonic energy may be transferred from the tool 16', 16" through the horn body 18*e*', 18*e*", through the intermediate ultrasonic coupler 112", through the flexible ultrasonic joint 102', 120" and into the horn end 18*d*" so that the acoustic or ultrasonic energy may be imparted directly to the fastener 12', 12". A rotational torque may also be applied by the rotational torque generator to the flexible ultrasonic coupler 112" or the horn body 18*e*', 18*e*" either separately or while the acoustic or ultrasonic energy is applied to either loosen or tighten as desired. Thus, as with prior embodiments, it should be appreciated that the acoustic or ultrasonic energy may be applied at the same time that a rotational torque is applied to the horn body 18*e*', 18*e*" or it may be applied when a rotational torque is not applied during the rotation of the horn body 18*e*', 18*e*".

Alternatively, and as illustrated in FIGS. 16C-16F and 17B-17H, at least one or a plurality of tips, such as the horns 18*i*"-18*viii*" and/or tips 20*ai*"-20*aiv*", may be mounted on the horn end 18*d*" as described earlier herein. In such an event, the tips or a horn, such as horn 119', 119" (FIGS. 16E-16F and 17B-17F) may be mounted onto the horn end 18*d*". In such embodiment, a threaded aperture 18*d*6" (FIG. 17C) provides a threaded female opening for receiving a male threaded projection 119*a*" (FIG. 17B) that is integral with the tip or horn 119". An interior wall 119*c*" (FIG. 17C) of the tip or horn 119" is adapted, sized and shaped to receive the head 12*a*1" of the fastener 12" and to apply acoustic or ultrasonic energy to the fastener nut 12*a*". With the embodiments of FIGS. 16A-16H and 17A-17H, either the horn 18*d*", another horn 119" or one of the tips 20" and its aperture 18*d*6" receive the head 12*a*1" of the fastener 12" directly. Alternatively, the horn end 18*d*" may have the threaded female aperture 18*d*6" (FIG. 17C) that is adapted and sized to receive the threaded projections 119*a*" of the tip or horn 119". Thus, it should be appreciated that the tips 20*ai*"-20*aiv*" of the type shown in the embodiment relative to FIGS. 1-14 may be used with the embodiments of FIGS. 15-17H.

During use of the embodiments of FIGS. 16A-16H and 17A-17H, the user selects the desired horn end 18*d*" or he selects the desired tip 20", horn 18" or horn 119" to be mounted by the horn end 18*d*" for the fastener 12" to be loosened or tightened. The horn 18", tip 20" or horn 119" is threadably fastened to the horn end 18*d*" and then is guided onto the head 12*a*1" of the fastener 12" to be loosened or tightened. The acoustic or ultrasonic energy is applied thereto by actuating a power switch (not shown) coupled to the ultrasonic generator 14, 14' and 14". Optionally, this could occur while a rotational torque is applied to the fastener 12".

As mentioned earlier, the flexible ultrasonic joints 102', 120" can be "dry" or "wet". In one embodiment, the flexible ultrasonic joints 102', 120" and the sleeves 108' and 122", mentioned earlier relative to FIGS. 16E and 17E, may retain the ultrasonic fluid and lubricant 114', 114" described earlier that conducts the acoustic and ultrasonic energy from the tool fastener 16', 16" through the horn end 18*d*', 18*d*" through the flexible ultrasonic joint 102', 120" so that the ultrasonic energy is focused and transmitted through the parts and ultimately to the fastener 12', 12". In contrast, in the "dry" embodiment, the various engaging surfaces of the various components, especially the flexible ultrasonic joints 102', 120", cause the acoustic or ultrasonic energy to be focused and transmitted without a fluid and through the various components of the system 100', 100". The "dry" connection and engagement of the engaging surfaces of the components are selected to comprise a contact surface shape that is conducive to conducting and transmitting the acoustic or ultrasonic energy. In contrast, conventional wrenches do not send or conduct ultrasonic or acoustic energy. This is explained in detail later herein in the section "MAINTAINING AND FOCUSING ULTRASONIC ENERGY." In this regard, it should be appreciated that the geometry of the components as you move proximal from the fastener tool 16' to the horn end 18*d*', 18*d*" is always radiused or angled so that when acoustic or ultrasonic energy is applied, the energy travels and is transmitted from the proximal to the distal horn end 18*d*', 18*d*" and ultimately to the fastener 12', 12". As mentioned earlier, the "dry" connection feature can be used with the embodiments of FIGS. 16A-16H.

Advantageously, the embodiments of FIGS. 16A-17H provide geometrically shaped components and surfaces that cooperate to focus the energy towards the distal tip or horn end 18*d*', 18*d*" and ultimately to the fastener 12', 12".

Alternatively, and as with the sleeve 108' illustrated and described earlier relative to the embodiment of FIGS. 16A-16F, this embodiment may also comprise a sleeve 122" that is adapted and sized to fit over the entire flexible ultrasonic joint 120" as illustrated in FIGS. 17D-17G. Note in FIG. 17D, the sleeve 122" encases the flexible ultrasonic joint 120" as shown and the fluid storage area 113" surrounding it. As with the prior embodiments, a fluid nipple 124" provides fluid communication with the fluid storage area 113" (FIG. 17E) inside the sleeve 122" so that the ultrasonic fluid and lubricant 114" can be inserted therein. The sleeve 122" provides a boot or protective covering for the flexible ultrasonic joints 102" and 120". The sleeve 122" is elastic and made of a polymer construction and the ends 122*a*" and 122*b*" of the sleeve 122" are elastic and provide a fluid tight seal against the outer surface 18*e*8" (FIG. 16A) of the horn body 18*e*" and the outer surface 18*d*7" of the horn end 18*d*", respectively. Alternatively, a pair of conventional clamps 122*d*" (FIGS. 17D-17F) may be mounted on the ends 122*a*" and 122*b*" to secured the sleeve 122" thereon. Alternatively, elastic ends 112*a*" and 122*b*", a hot weld, adhesive or other means may be used to secure the sleeve 122" on the horn body 18*e*" and horn end 18*d*". Once the sleeve 122" is mounted thereon, the fluid nipple 124" may be used to inject or insert the ultrasonic fluid and lubricant 114" into the fluid storage area 113" (FIG. 17E) similar to the embodiment shown in FIG. 16F. As with the prior embodiment, the ultrasonic fluid and lubricant 114" may be a lubricating fluid or a fluid adapted and selected to facilitate transmitting the acoustic and ultrasonic energy from the fastener tool 16" to the fastener 12". Thus, it should be understood that the sleeve 122" not only permits the retention of the ultrasonic fluid and lubricant 114" in the storage area 113" but also protects and lubricates the flexible ultrasonic joints 102' and 120". As with the prior embodiment, the sleeve 122" and ultrasonic fluid and lubricant 114" are optional and are not used in the "dry" embodiment, but they could be.

Figure 17E:
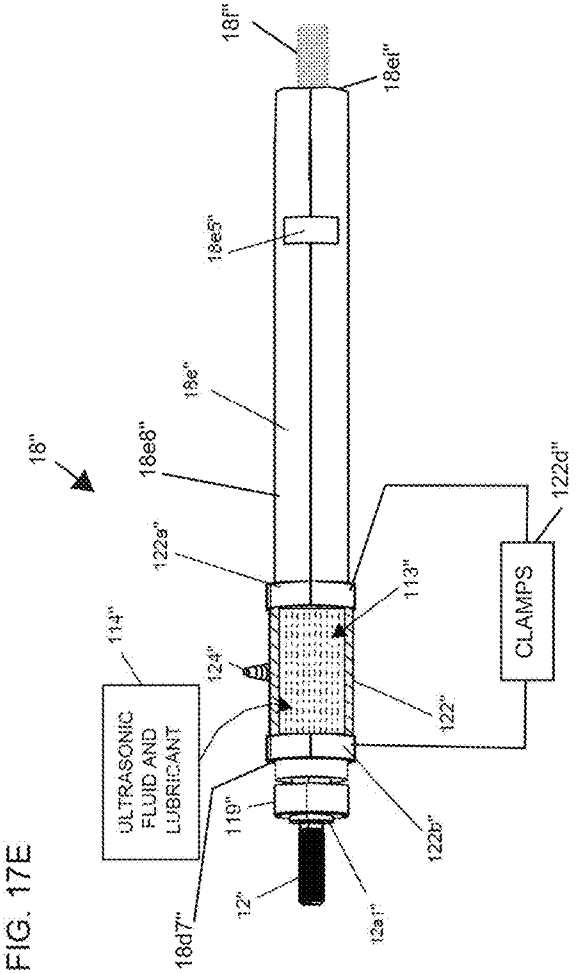
FIG. 17E is a partial fragmentary view illustrating a fluid storage area about the flexible ultrasonic joint and showing a universal fluid and/or lubricant therein.
Figure 17F:
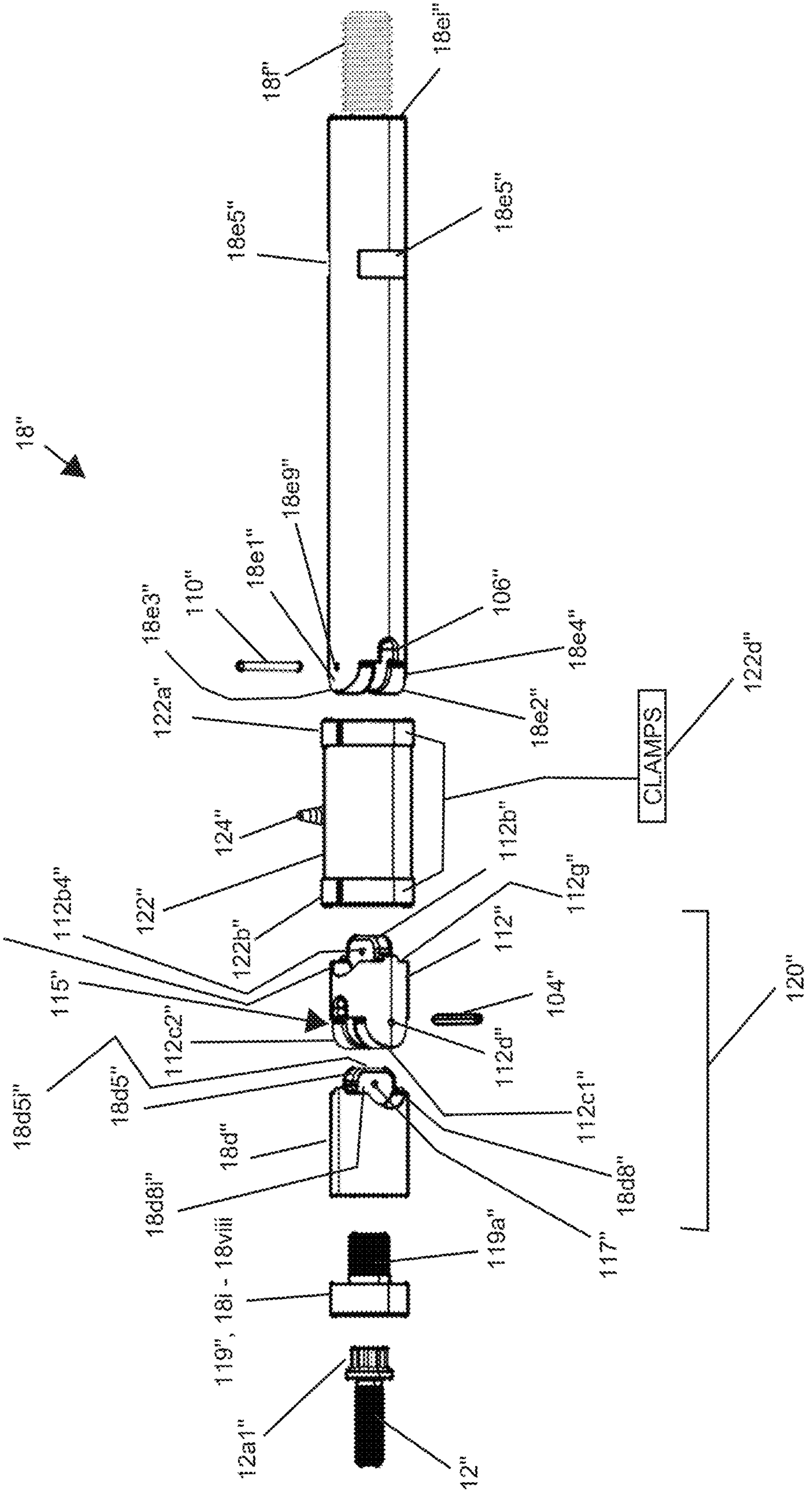
FIGS. 17F-17G are other exploded views showing various details of the embodiments shown in FIGS. 17A-17E showing the use of a tip adapted to receive the head of the fastener.
Figure 17G:
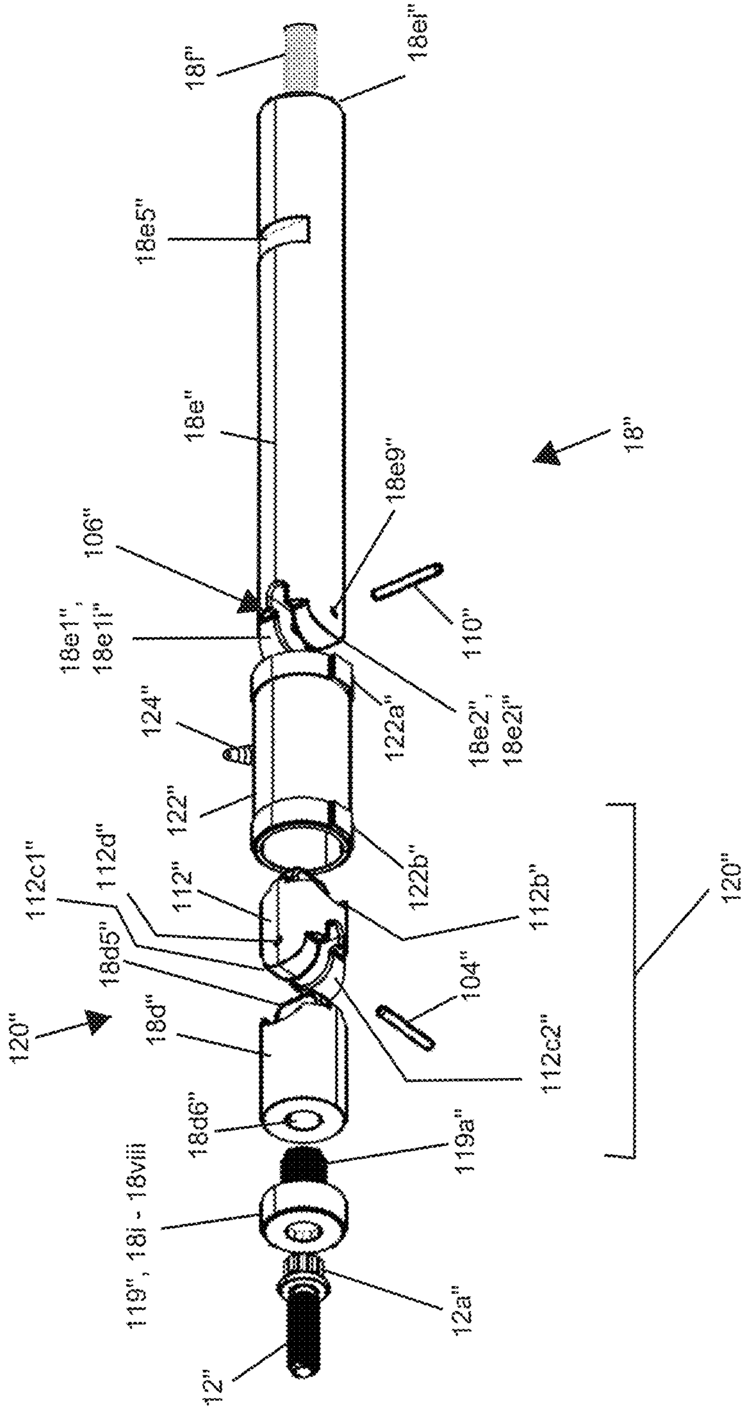
Figure 17H:
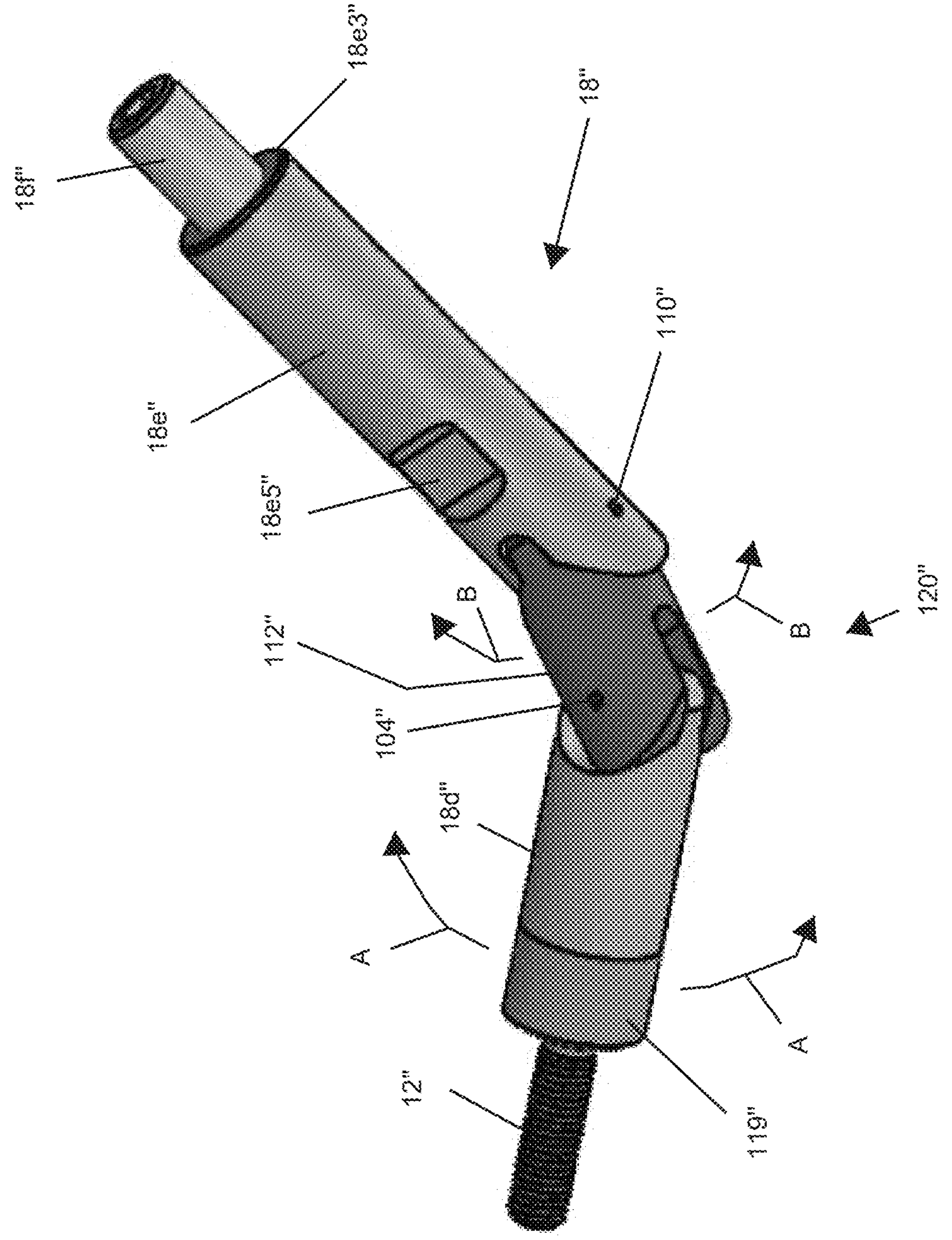
FIG. 17H is a full view of the embodiments of FIGS. 17A-17G.

Thus, the fluid storage area 113" in FIG. 16E and area 113" in FIG. 17E both define storage areas for storing the ultrasonic fluid and lubricant 114', 114" about the flexible ultrasonic joints 102' and 120", respectively, which facilitates the transfer of acoustic or ultrasonic energy through the horn body 18*e*" and into the fastener 12" to facilitate fastening or loosening the fastener 12". As mentioned earlier herein, the acoustic or ultrasonic energy may be applied separate from a rotational torque on the armature or on the horn body 18*e*" or it may be applied substantially simultaneously to the application of the rotational torque on the horn body 18*e*".

As with the prior embodiments, the horn body 18*e*" comprises a pair of opposing flat areas 18*e*5" (FIG. 17C) that are adapted and sized to receive the wrench or tool, such as the torque tool 40" shown in FIG. 1. Alternatively, and similar to the embodiment shown in FIG. 16D, the exterior horn body 18*e*" may be machined or provided to comprise a polygonal working surface, such as a hexagonal shape, for permitting a plurality of different tools to be used to apply a rotational torque, either counterclockwise or clockwise to the horn body 18*e*".

Advantageously, the embodiments of FIGS. 17A-17H enable the end 18*d*" or any tip 20" fastened thereto to pivot in both planes and at least partially about multiple axes PA1 and PA2 that are not co-axial. This feature and the pivoting embodiments of FIGS. 15-17H are particularly useful when the embodiments of FIGS. 1-14 cannot easily be used to access a fastener 12. During use, the horn end 18*d*", horn 18" or the tip 20" are caused to be at least partially pivoted about at least one axis and in at least one plane until it can be maneuvered and aligned to receive the fastener nut 12*a*" of the fastener 12". The acoustic or ultrasonic energy and rotational torque may then be applied to the fastener 12" either simultaneously or separately thereto. Of course, it should be understood that the devices and embodiments of FIGS. 15-17H can also be used without any or with minimal pivoting at all.

In one embodiment, note that the pivot axes PA1 and PA2 of the embodiment of FIGS. 17A-17H are offset. In a preferred embodiment, they are offset approximately 90 degrees.

Maintaining and Focusing Ultrasonic Energy

As alluded to earlier, a significant feature of the embodiments shown and described in FIG. 15-17H is that the tool and system 100', 100" comprises means, apparatus and is adapted and configured to facilitate transferring and focusing the ultrasonic energy as it passes through the fastener tool 16', 16" and the horn 18', 18". This feature is applicable to both the single flexible ultrasonic joint 102' as well as the dual flexible ultrasonic joint 120" embodiments. The inventor has found several approaches to be useful to transfer the ultrasonic energy through the horn 18', 18". In general, one approach is to provide a "dry" engagement or coupling between the various components of the flexible ultrasonic joints 102', 120" so that when an ultrasonic energy is passed through the horn 18', it passes and is focused through the horn body 18*e*', 18*e*", through the flexible ultrasonic joint 102', 120", through the horn end 18*d*', 18*d*" and ultimately to the fastener 12', 12".

Figures 18A, 18B:
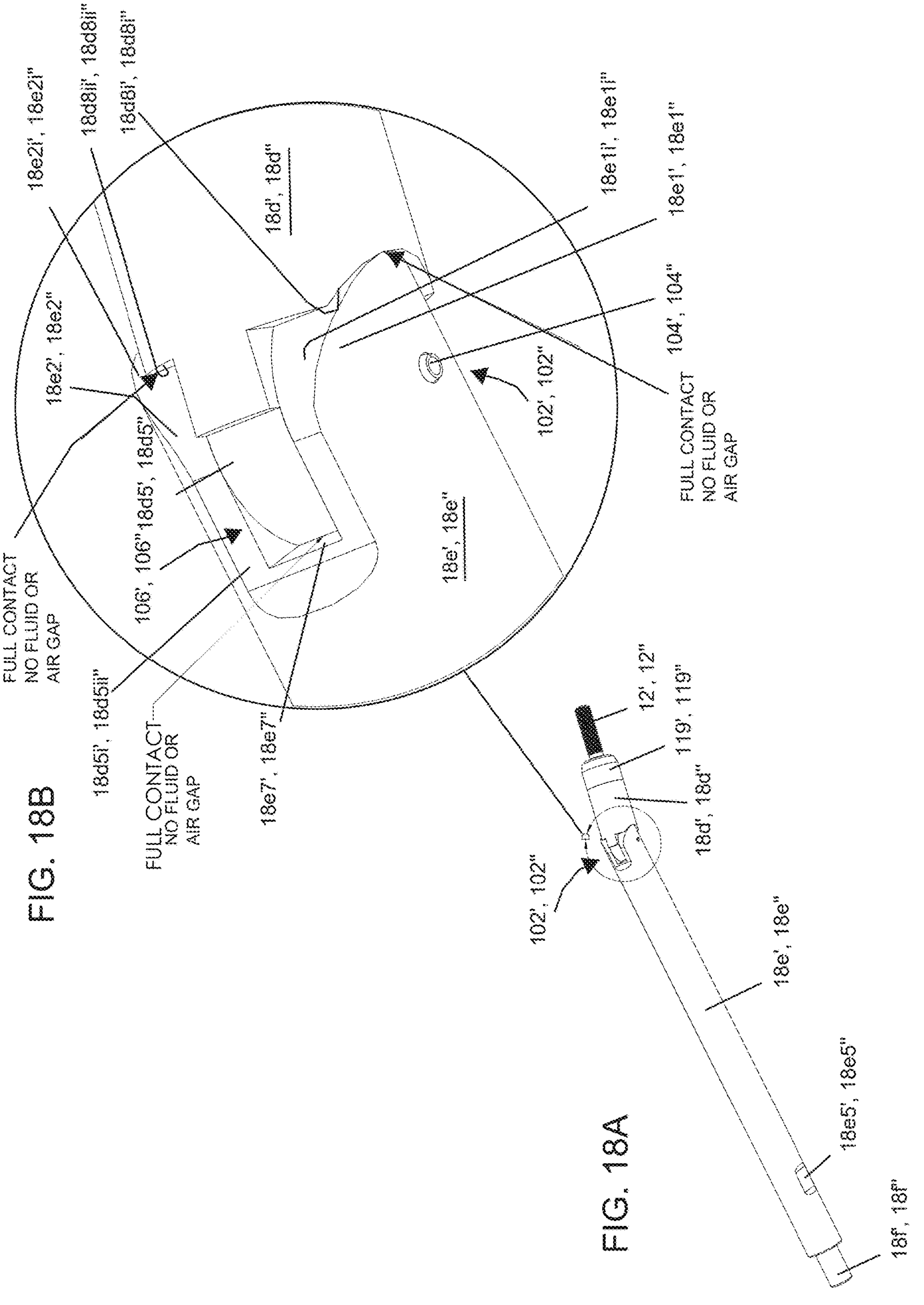
FIGS. 18A-18B illustrate at least one flexible ultrasonic joint having a "dry" connection.

FIGS. 18A-18B illustrate a single flexible ultrasonic joint 102' that utilizes a "dry" connection, and this same feature and description applies to the flexible ultrasonic joint 120". In this regard, notice in the enlarged view of FIG. 18B, the components of the flexible ultrasonic joint 102', the horn body 18*e*' and horn end 18*d*', are machined and adapted such that engaging surfaces of the components directly engage each other, and this direct engagement facilitates transfer of the ultrasonic energy to the fastener 12', 12". Notice in FIG. 18B that the arcuate or curved surfaces 18*d*8*i*' and 18*d*8*ii*' directly engage the end surfaces 18*e*1*i*' and 18*e*2*i*', respectively. Notice that the end 18*d*5*i*' of the male projection 18*d*5' directly engages a bottom surface 18*e*7' of the channel or slot 106'. It should be appreciated that these components are adapted, designed and manufactured to have zero or close-to-zero tolerances.

Because of this direct engagement and mating of engaging surfaces of the flexible ultrasonic joint 102', there is full contact engagement at each of the areas labeled "FULL CONTACT" in FIG. 18B. The inventor has found that through this direct engagement of the surfaces of the various components, the ultrasonic waveform transfers through the fastener tool 16' without interruption and with the waveform and energy being substantially intact and focused toward the horn end 18d', tip or horn 18' and the fastener 12'. The inventor has found that the direct engagement of the parts of the flexible ultrasonic joints 102', 120", allows the ultrasonic energy pass through the parts and ultimately to the fastener 12' even when the horn end 18d', 18d", the intermediate coupler 112', 112" or the like have been pivoted. Notice that there is no fluid or air gap between the engaging surfaces. The inventor has also found that by providing the component parts with arcuate, angled or curved surfaces, as opposed to flat or interrupted surfaces that may reflect the ultrasonic energy, the ultrasonic energy and waves pass through the flexible ultrasonic joint 102' and pass through the parts and ultimately to the fastener 12" without interruption, reflection or the like. It should be understood, that the sonics will generally follow a straight path, but can be reflected. The design has minimized any surfaces that can reflect the sonics. The design shows most surfaces angled or radiused pushing or directing the sonics distal, towards the fastener 12', 12". The curved surface allows for maximum surface area contact at every angle. If the surface was flat than the surface area would get reduced as you were angled.

Figures 18C, 18D:
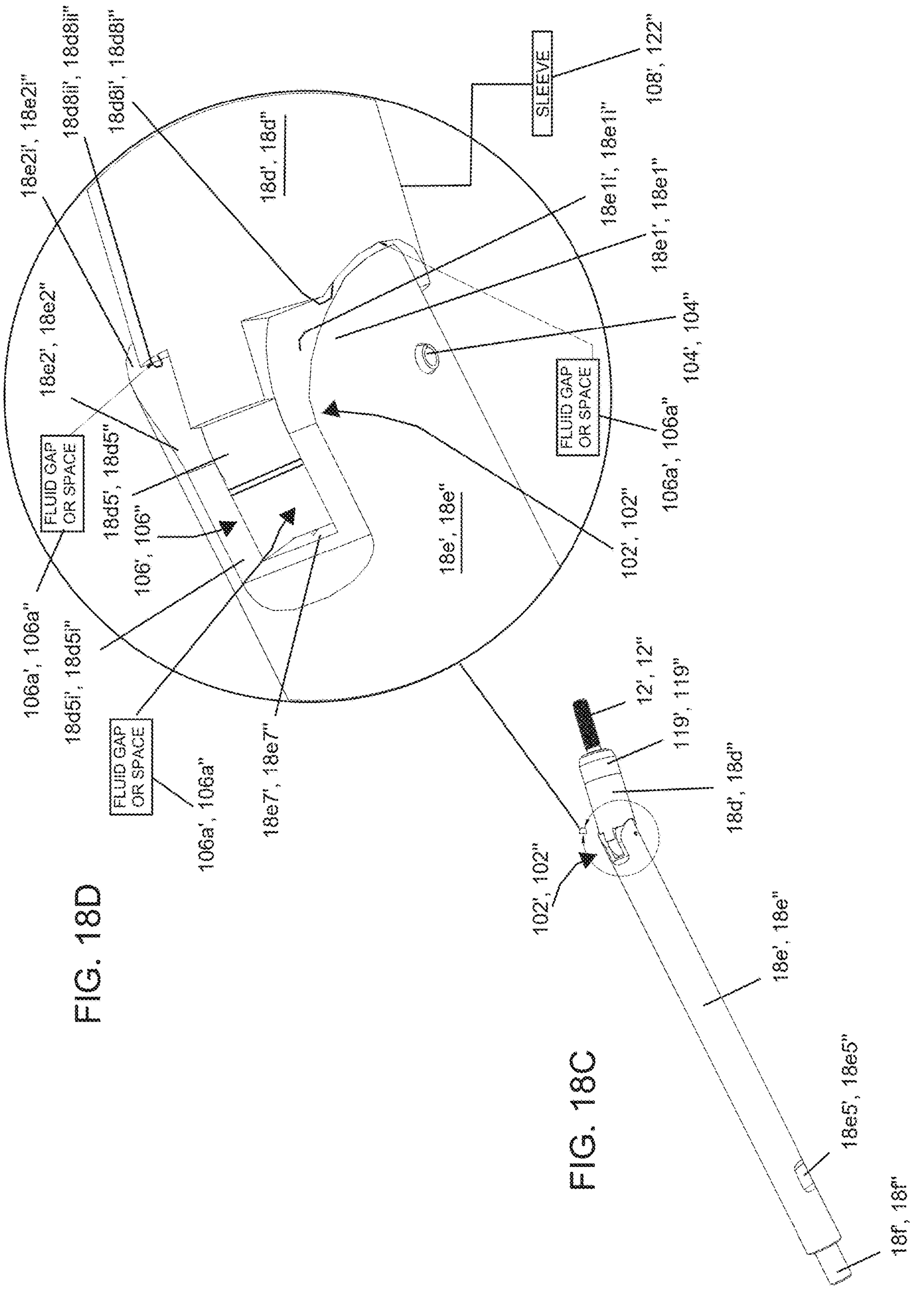
FIGS. 18C-18D is a view similar to FIGS. 18A-18B, except it shows at least one flexible ultrasonic joint having spaced relationship between parts for use in a "wet" environment.

In contrast, another embodiment illustrated in FIGS. 18C and 18D illustrates the "wet" environment. As explained earlier herein relative to the embodiments of FIGS. 16E and 17E, the fastener tool 16', 16" may use the "wet" environment wherein the ultrasonic fluid and lubricant 114', 114" encases and surrounds the flexible ultrasonic joint 102', 120". The inventor has found that utilizing an ultrasonic medium, such as the ultrasonic fluid and lubricant 114', 114", facilitates transferring the ultrasonic energy toward the horn end 18d', 18d" and fastener 12', 12". The embodiment may be utilized with the components described in the "dry" environment illustrated in FIGS. 18A-18B and as described herein. In the "wet" environment the sleeves 108' and 122" are used. Notice that an intentional spacing between engaging part surfaces is provided or machined between several adjacent working surfaces. In FIG. 18C, notice a spacing or gap between the surfaces of the parts 18d8i', 18e1i'; 18d8ii', 18e2i', 18d5' and 18e7' to enable the ultrasonic fluid and lubricant 114' to pass therebetween so that when ultrasonic energy is passed through the fastener tool 16', the ultrasonic fluid and lubricant 114' facilitates transferring the ultrasonic energy to the horn end 18d' and ultimately to the fastener 12'.

Again, the inventor has found that utilizing the ultrasonic fluid and lubricant 114', 114" not only lubricates the flexible ultrasonic joints 102', 120", but also facilitates transferring the ultrasonic energy through the fastener tool 16', 16". Accordingly, notice in FIG. 16C that the end 18d5i' of the male projection 18d5' is truncated and not rounded and is generally flat and cooperates with surface 18e7' (FIG. 18D) to define a fluid gap or space 106a' (FIG. 18D). The end 18d5i' (FIG. 16D) and end 18d5ii' (FIGS. 17B and 18D) are truncated or not rounded in the "wet" application. For ease of illustration and understanding, the fluid gap or space 106a' facilitates allowing the ultrasonic fluid and lubricant 114' to pass between the surfaces of the flexible ultrasonic joint 102'. Likewise, in each area of FIGS. 18C-18D labeled "FLUID GAP OR SPACE", define a fluid gap between adjacent surfaces as shown. Again, the ultrasonic fluid and lubricant 114' is received in each fluid gap or space and facilitates transferring and focusing the ultrasonic energy to and through these parts, the flexible ultrasonic joint 102', the horn end 18d' and ultimately to the fastener 12'.

Thus, it should be appreciated that flexible ultrasonic joint 102' may be operated in either a "dry" or "wet" environment. It should also be appreciated that in the "dry" environment, the sleeve 108' is optional. For ease of illustration, the sleeves 108' and 122" are shown schematically in FIG. 18B. Of course, if the "wet" approach is desired, then the sleeve 108' should be used with the ultrasonic fluid and lubricant 114' as described earlier herein.

Referring now to FIGS. 19A-19D, the "dry" and "wet" embodiments for the flexible ultrasonic joint 120" will now be described. In this embodiment of FIGS. 19A-19D, the various surfaces of engaging parts are in direct engagement and contact and facilitate transferring the ultrasonic energy through the flexible ultrasonic joint 120" in a manner similar to the embodiment shown and described relative to FIGS. 18A-18D.

Notice that the various surfaces of the components directly engage each other with zero or close-to-zero tolerance. In this regard, the end 112bi" (FIG. 19A) engages the surface 18e7" of the horn body 18e". Likewise, the curved surfaces 18e1i" and 18e2i" mate with and directly engage the arcuate or curved surfaces 112di" and 112dii", respectively. As mentioned, the end 112bi" of the male projection 112b" is received in the channel or slot 106". The end 112bi" engages directly with the surface 18e7". Similarly, the end surface 18d5i" of the male projection 18d5" directly engages a bottom 112e" of the channel or slot 115".

Figures 19A, 19B, 19C, 19D:
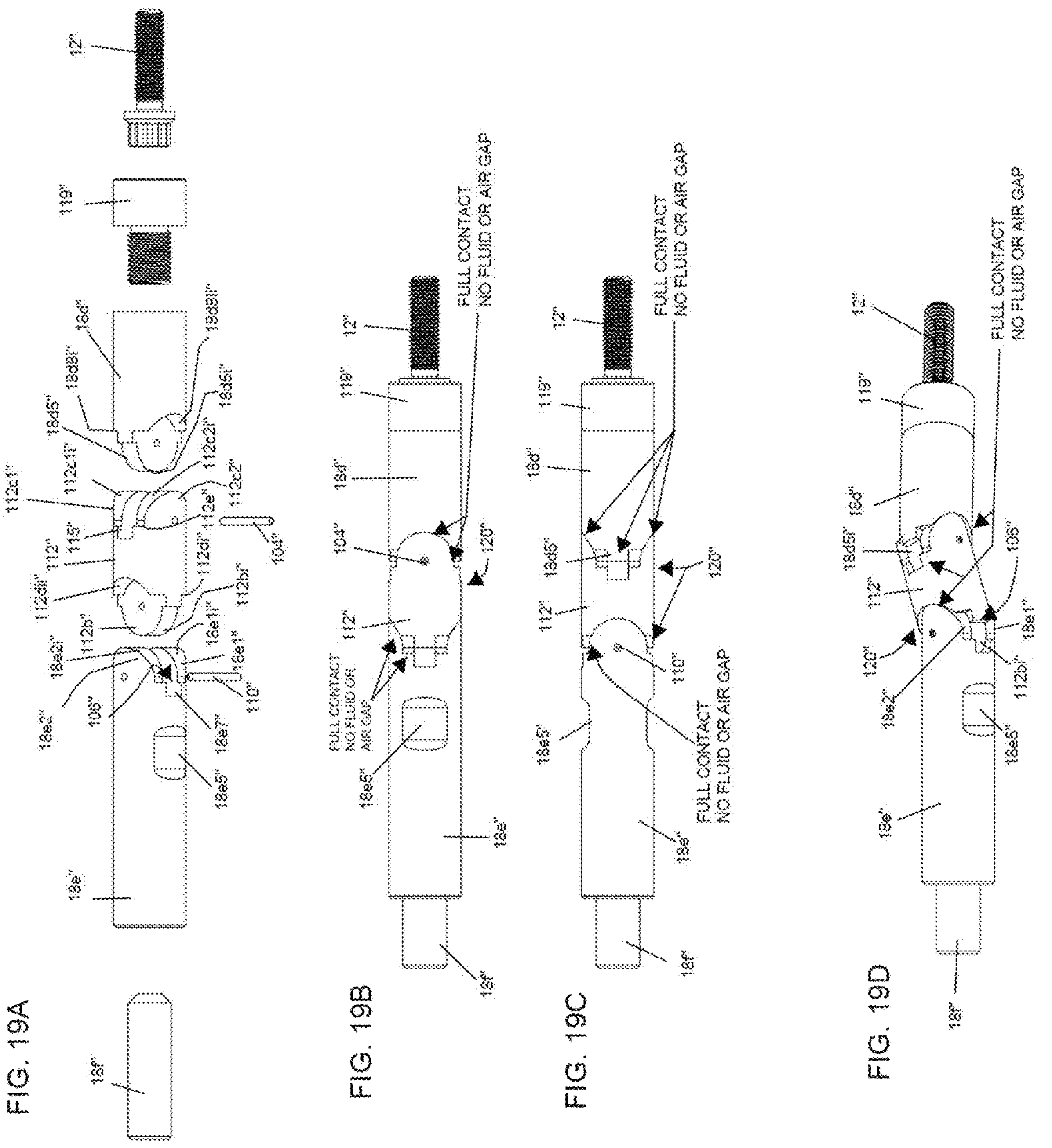
FIGS. 19A-19D are similar to the embodiment shown in FIGS. 17A-17H, except that this embodiment is preferably used in a "dry" environment.

Surfaces 112c1i" and 112c2i" directly engage the opposing arcuate or curved surfaces 18d8i" and 18d8ii", respectively, as best shown in FIG. 19A. Thus, it should be apparent that the intermediate coupler 112" and its surfaces directly engage the surfaces of the horn body 18e" and horn end 18e" to provide the advantages of the "dry" connection mentioned earlier herein. Again, the inventor has found that through this direct engagement and by providing arcuate or curved surfaces in the various components of the fastener tool 16" and of the flexible ultrasonic joint 120", there is an improved transfer of the ultrasonic energy through the fastener tool 16", the horn body 18e", flexible ultrasonic joint 120", horn end 18d" and ultimately the fastener 12". It should be understood that the surfaces are curved or angled with respect to the direction of travel of the ultrasonic wave so that minimal or no reflection of the ultrasonic wave occurs before it hits the fastener 12". This is especially advantageous when the horn end 18d" has been pivoted.

FIG. 19B is an assembled view of the embodiment shown in FIG. 19A and FIG. 19C is a view showing the horn 18" rotated (compared to FIG. 19B) approximately 90 degrees so that the pivot pins 104" and 110" and the flexible pivot joint 120" may be viewed. Notice in FIG. 19D, a view of the intermediate coupler 112" in an exemplary pivoted arrangement is shown. As mentioned earlier, because the horn end 18d" can be difficult to move or pivot by hand, the direct surface connection between adjacent parts and the flexible ultrasonic joint 120" can be "stiff". However, the inventor has found that this stiffness actually facilitates pre-setting the tool 16" when it is used in difficult-to-access areas, such as when servicing a jet engine component or another device where a straight-line access to the fastener 12" is not available.

In FIGS. 17D-17G, the embodiment of the dual flexible ultrasonic joint 120" shows the configuration of the various components of the flexible ultrasonic joint 120" for use with the ultrasonic fluid and lubricant 114" and with the sleeve 122". For ease of illustration and understanding, the sleeve 122" and its associated clamps or elastic ends 122a" and 122b" are shown schematically. Notice in FIG. 17F, the ends 18d5i" and 112b" are not curved. As with the embodiment described earlier in FIGS. 18A-18D, fluid gaps are provided or defined between the various component surfaces, including surfaces 18e1i"-112f" and 18e2i"-112g", surface 112bi" of the male projection 112b" and the surface 18e7", 112c1i" and 112c2i" and surfaces 18d8i" and 18d8ii", respectively; and surface 18d5i" and surface 112e". As with the prior embodiments, the gap or spacing between these engaging surfaces permit the ultrasonic fluid and lubricant 114" to surround and transfer the ultrasonic energy, especially when at least one or both of the horn end 18d" and the intermediate coupler 112" has been pivoted.

Referring now FIGS. 20A-20G, another embodiment is shown that is particularly useful in the "dry" application. For ease of illustration and description, like or similar parts in each of the embodiments are identified with the like part numbers, except a triple prime mark ("'"") has been added to the embodiment of FIGS. 20A-20G. In this embodiment, notice that the horn body 18e" and horn end 18d" are coupled together by an intermediate coupler 200" that functions similar to the intermediate coupler 112". Notice in FIGS. 20B and 20D that the intermediate coupler 200'" comprises a first leg 202'" and a second leg 204'" that cooperate with a bottom surface to define a gap or channel 206" therebetween. A second end 200b'" of the intermediate coupler 200" comprises a second pair of legs 210", 212" that are generally opposed and that cooperate to define a channel or groove 214" and the intermediate coupler 200" comprises a surface 216", similar to surface 208". The legs 210'" and 212'" cooperate with surface 216" to define the channel or groove 214" (FIG. 20D) and receive a leg or male extension 218" that is integral with the horn end 18d". The pivot pin 104'" pivotally couples the horn end 18d'" to the intermediate coupler 200'". Likewise, the horn body 18e'" comprises a leg 220'" that is received in the channel 206'". The horn body 18e" is pivotally coupled to the intermediate coupler 200'" with the pivot pin 110" and horn end 18d" is pivotally coupled to the intermediate coupler 200'" with the pivot pin 104".

Notice how the channels 206'" and 214" are offset by approximately 90 degrees to permit the horn end 18d'" to pivot in multiple planes and at least partially about multiple axes PA1, PA2 defined by the pivot pins 104" and 110". As with the embodiment described earlier herein relative to FIGS. 19A-19D, notice that the mating surfaces 202i'"-224'"; 202ii'"-208"; 18d5i'"-18d6i'" and 212'"-18d7'" are rounded or curved and directly engage to provide the "dry" ultrasonic connection between these parts. Notice in FIG. 20D that at each of the intersections between the adjacent components labeled "FULL CONTACT," there is no gap or space and the parts are in direct contact or engagement to facilitate permitting the ultrasonic energy or waveform to transfer or pass through the flexible ultrasonic joint 120".

Advantageously, this embodiment is similar to the embodiment of FIGS. 19A-19D in that the surfaces of these engaging components are in direct engagement and contact in order to facilitate transferring the ultrasonic energy to the horn end 18d'" and ultimately to the fastener 12'" in the manner described earlier herein. Of course, this embodiment may also be provided with gaps between the various component parts so that it can be used in a "wet" ultrasonic fluid and lubricant 114" environment of the type shown and described earlier herein. Accordingly, the sleeve 122" (shown in FIG. 20D) may be used with the embodiment shown in FIGS. 20A-20G.

As mentioned, this embodiment could also be provided similar to the embodiment shown in FIG. 18D wherein gaps or spaces are provided between adjacent components to permit ultrasonic fluid and lubricant 114" to pass into the gaps and between the components to facilitate transferring ultrasonic energy through the flexible ultrasonic joint 120". The sleeve 122" is optional, but is preferred in the "wet" embodiment so that ultrasonic fluid and lubricant 114" surrounds, envelops and is retained about the flexible ultrasonic joint 120'" in the manner discussed and described earlier herein.

Figures 20A, 20B:
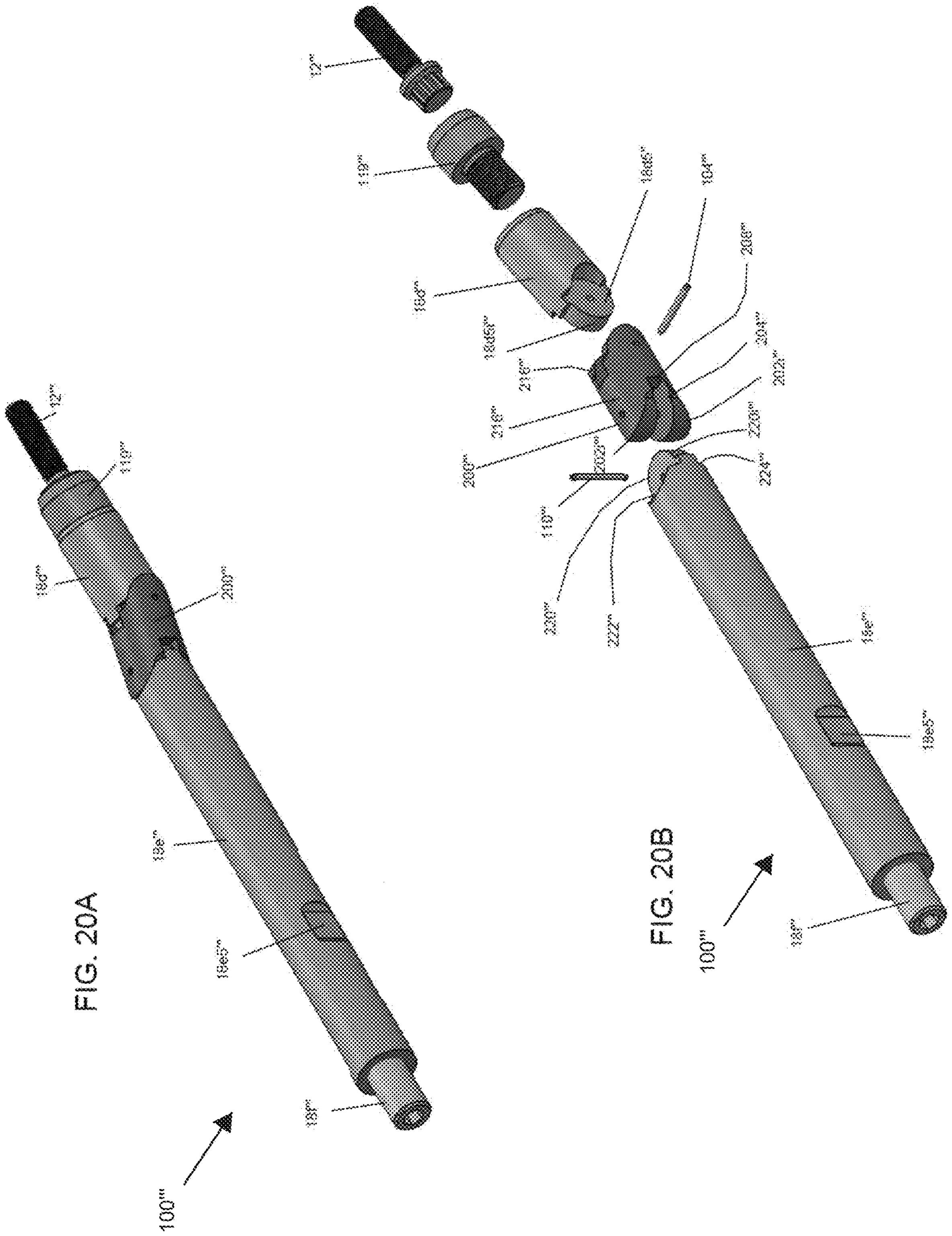
FIGS. 20A-20G illustrate another embodiment showing an intermediate coupler having spaced projections or legs on each end and oriented in different planes to provide a flexible ultrasonic joint that comprises a plurality of pivot joints.
Figure 20D:
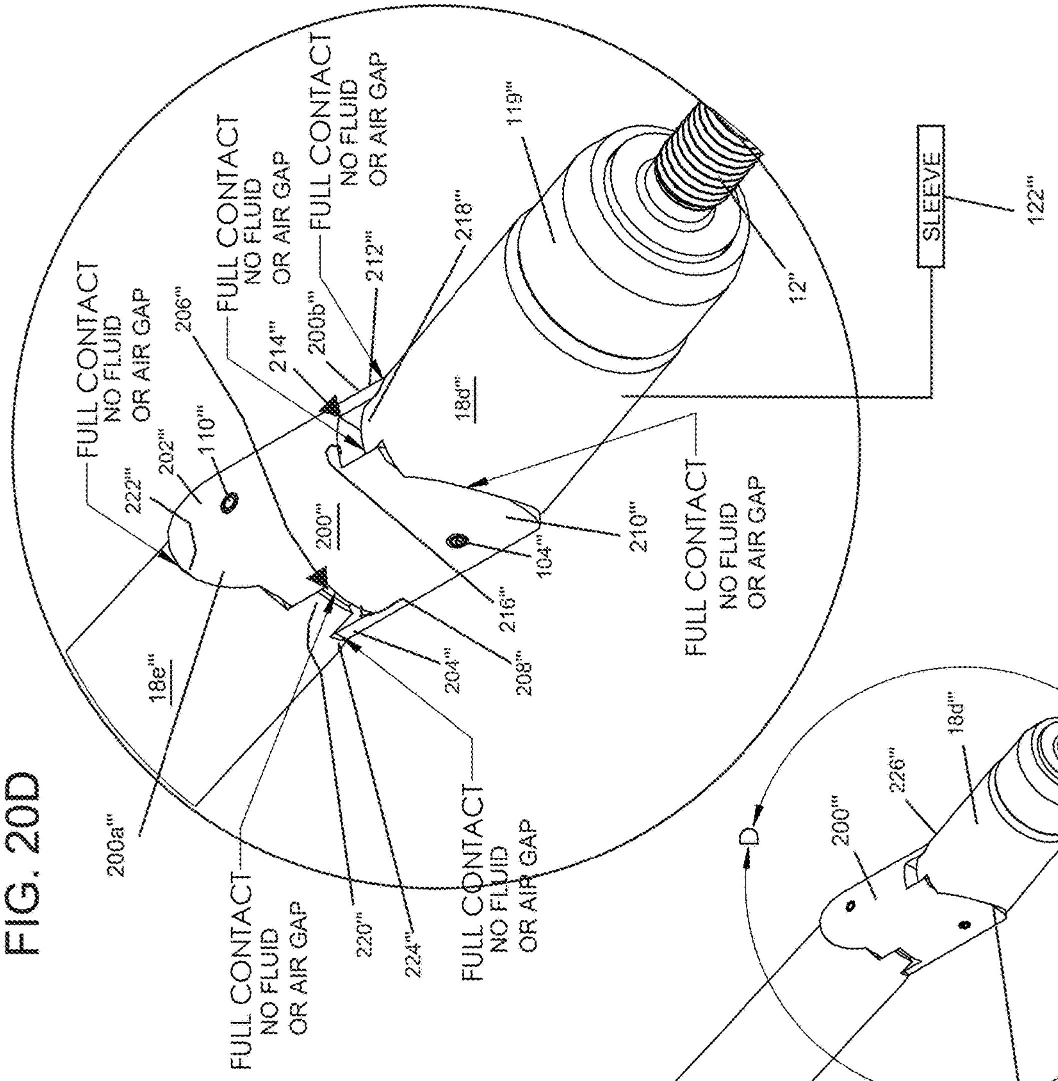
Figure 20C:
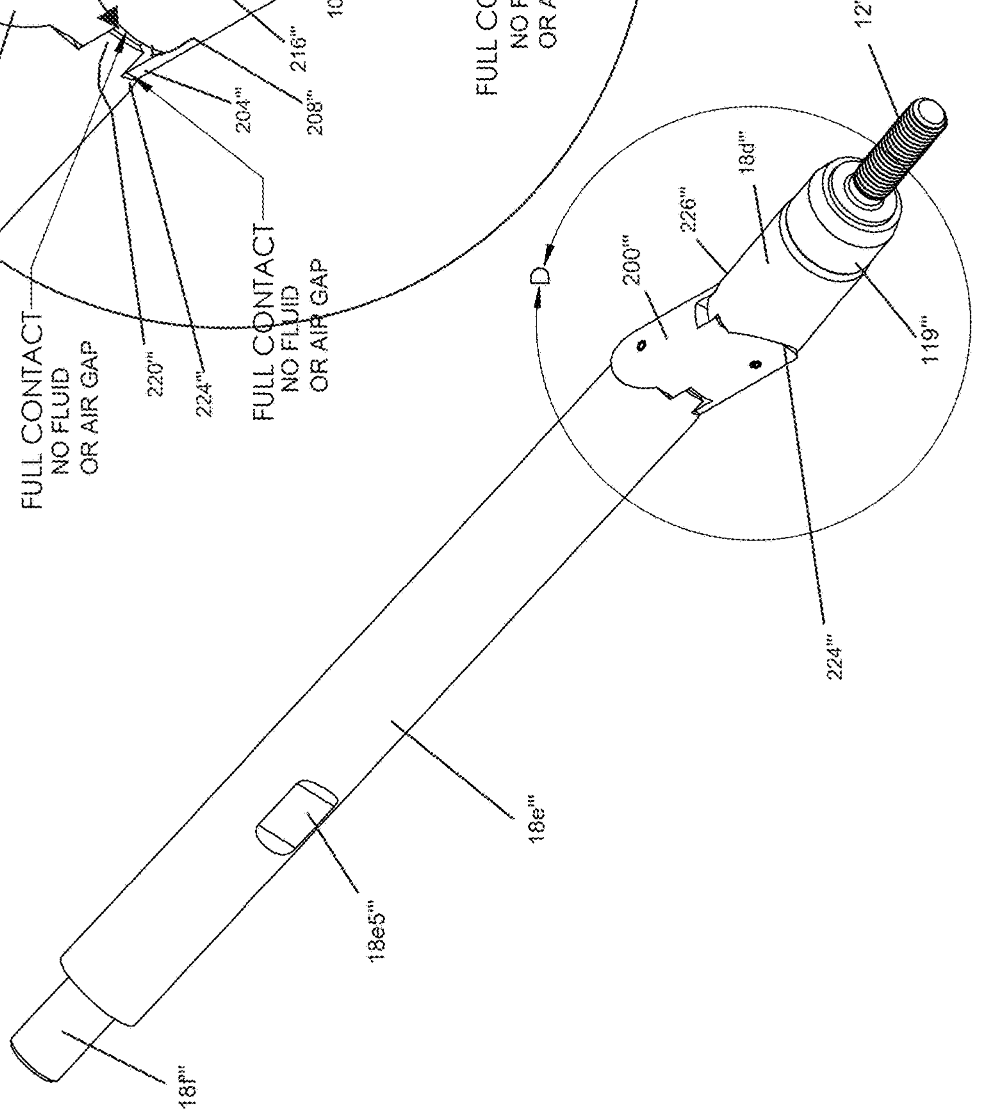
Figures 20E, 20F, 20G:
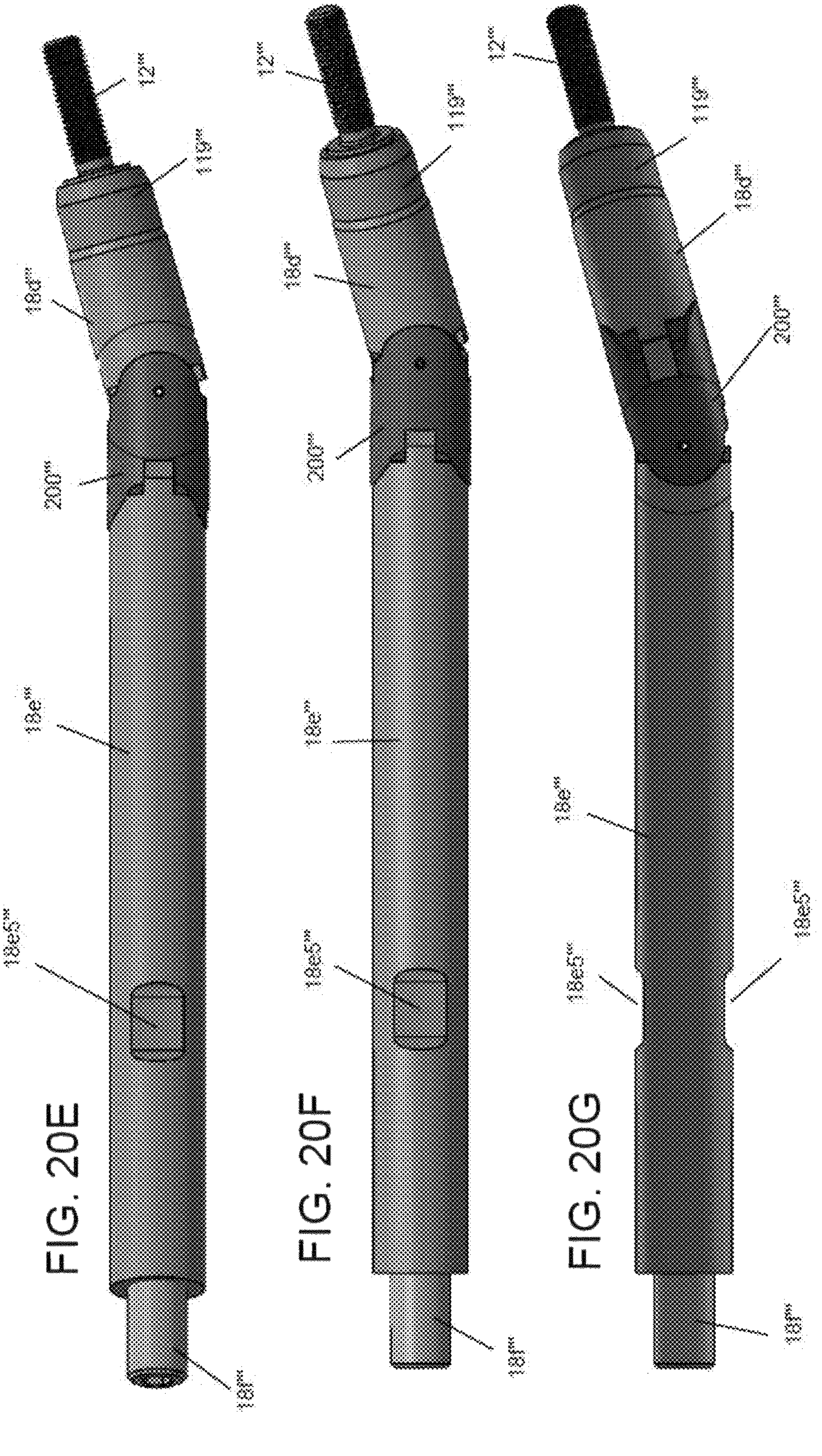

After the components are assembled together as illustrated in FIGS. 20A-20G, the horn end 18d" may be pivoted as illustrated (FIGS. 20C-20D) in one or a plurality of planes and at least partially about one or a plurality of axes as illustrated in the figures. Notice FIG. 20A, both the intermediate coupler 200'" and horn end 18d" are pivoted with respect to each other and with respect to the horn body 18e". In FIG. 20C, which is another view of the embodiment shown in FIG. 20A, the horn end 18d" has been pivoted in multiple planes and axes of the intermediate coupler 200" and the horn end 18d'" and they are not co-axial with each other or with the horn body 18e". In contrast, note in FIG. 20E that the intermediate coupler 200'" comprises an axis that is co-axial with the horn body 18e'", but not the horn end 18d'" which is pivoted upward in the figure. FIG. 20G illustrates the intermediate coupler 200" having an axis coaxial with the axis of the horn end 18d" and both the intermittent coupler 200'" and the horn end 18d'" pivoted upward as shown. It should be understood that FIG. 20F is similar to FIG. 20G except that the tool 10" has been rotated about its axis approximately 90 degrees. FIGS. 20C and 20D are similar to FIG. 20A in that the horn end 18d'" is pivoted in multiple imaginary planes and at least partially about the plurality of axes PA1 and PA2.

ADDITIONAL CONSIDERATIONS

Advantageously, one embodiment of this invention is that it removes the risk of breaking bolts; reduced manual labor; reduced skilled labor. In other words, one would not need to be a skilled machinist to extract bolts which would reduce overall maintenance time.

Advantageously, one embodiment of this invention facilitates eliminating the need to drill out broken bolts and reduces risk of damage to engine/other components, which also removes possibility for debris to fall into the engine or undesirable locations through a drilled through hole.

The fastener tool 16, 16', 16", 16" may comprise a transducer that is directly connected to the ultrasonic generator 14, 14', 14", 14'" and a booster (not shown). The horns 18, 18', 18", 18'" are screwed directly into the booster so that the horn 18, 18', 18", 18" may be directly coupled to the transducer, which may or may not have a booster installed. The Dukane device referenced earlier herein may facilitate such coupling and operation.

It should be understood that the bolt head 12a1, 12a1', 12a1", 12a1" may comprise any predetermined shape adapted or capable of transferring ultrasonic energy and/or receiving a complementary shaped socket for rotatably driving the fastener 12, 12', 12", 12". Thus, the fastener tool 16, 16', 16", 16" is adapted to accommodate any polygonal or other head shape.

Thus, it should be appreciated that the fastener tool 16, 16', 16", 16" may comprise a transducer that may comprise a booster with the armature 16a, 16a', 16a", 16a'". The booster is typically installed to boost the amplitude ~2.5× but the transducer can operate also without the booster.

Advantageously, another embodiment of this invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A fastener tool for loosening or tightening a fastener mounted on a structure, said fastener tool comprising:

a tool body;

a horn adapted and sized to apply an acoustic or ultrasonic energy into said fastener; and an acoustic/ultrasonic generator for generating said acoustic or ultrasonic energy that passes through said horn and into said fastener to facilitate fastening or loosening said fastener; and a flexible ultrasonic joint that couples said tool body to said horn, said flexible ultrasonic joint permitting said horn to pivot about at least one predetermined axis, said flexible ultrasonic joint being adapted to transmit a rotational torque to said horn and permitting said horn to pivot relative to said body so that an axis of said horn is not coaxial with an axis of said tool body while transmitting said acoustic or ultrasonic energy to said fastener;

wherein said fastener comprises an end that is directly or indirectly engaged by said horn during loosening or fastening when said acoustic or ultrasonic energy is applied thereto, said acoustic/ultrasonic generator generating said ultrasonic or acoustic energy that travels through said horn and into said fastener and becomes concentrated or focused at a predetermined target location in said fastener;

said predetermined target location being along a length of said fastener so that a friction between threads of said fasteners and threads of the structures is at least partly reduced during loosening or tightening.

2. The fastener tool as recited in claim 1 wherein said horn comprises a generally flat surface for applying said acoustic or ultrasonic energy to said fastener.

3. The fastener tool as recited in claim 1 wherein said fastener comprises an end that is directly or indirectly engaged by said horn during loosening or fastening when said acoustic or ultrasonic energy is applied thereto, said acoustic/ultrasonic generator generating said ultrasonic or acoustic energy that travels into said fastener and becomes concentrated or focused at a predetermined location in said fastener.

4. The fastener tool as recited in claim 3 wherein said end comprises an end that mates with a head and/or nut that engages said structure at a head and/or nut engagement area of said structure when said fastener is mounted thereto, said predetermined location being in said fastener.

5. The fastener tool as recited in claim 3 wherein said end comprises a head and/or nut that becomes situated at a head and/or nut engagement area of the structure when said fastener is mounted thereto, said predetermined location being along a length of said fastener and downstream/upstream of said head and/or nut engagement area so that when said ultrasonic or acoustic energy is applied to said fastener, a friction or pressure between the head and/or nut mating surfaces and mating thread surfaces between said fastener and said structure is at least partly reduced.

6. The fastener tool as recited in claim 5 wherein the fastener comprises threads that mate with mating threads at a thread-engagement location, said predetermined targeted location to be between the head and/or nut and its mating structure surface(s) along with the mating threads of the fastener and structure(s).

7. The fastener tool as recited in claim 6 wherein said predetermined targeted location is between the head and/or nut and its mating structure surface(s) along with the mating threads of the fastener and structure(s).

8. The fastener tool as recited in claim 6 wherein said predetermined location is between said head and/or nut and a distal end of the bolt, and a first thread of mating female threads.

9. The fastener tool as recited in claim 3 wherein said end comprises a head and/or nut that engages a mating surface at a head and/or nut engagement area where said head and/or nut engages the structure when said fastener is mounted thereto, said predetermined location being downstream/upstream of said head and/or nut engagement area so that when said ultrasonic or acoustic energy is applied to said fastener, a friction or pressure between said head and/or nut and said mating surface along with mating threads between the fastener and structure is at least partly reduced.

10. The fastener tool as recited in claim 1 wherein said fastener tool comprises a rotational torque applicator for applying a rotational torque to said fastener while said ultrasonic or acoustic energy passes into said fastener;

wherein said rotational torque is at least one of mechanical torque or an acoustic/ultrasonic torque that is applied substantially simultaneously as said horn causes said acoustic or ultrasonic energy to pass into said fastener.

11. The fastener tool as recited in claim 4 wherein said horn is adapted to apply said rotational torque substantially simultaneously as said ultrasonic or acoustic energy passes into said fastener.

12. The fastener tool as recited in claim 1 wherein said horn comprises a socket, screwdriver bit, and/or torque bit sized and adapted to receive a head and/or nut of said fastener.

13. The fastener tool as recited in claim 1 wherein said acoustic/ultrasonic generator applies said ultrasonic or acoustic energy at a frequency equal to or larger than 1 kHz.

14. The fastener tool as recited in claim 1 wherein said fastener has a head and/or nut, said horn being adapted and sized to receive or engage said head and/or nut to apply a tightening or loosening torque to said head and/or nut when said acoustic or ultrasonic energy passes therethrough.

15. The fastener tool as recited in claim 14 wherein said horn comprises a socket, screwdriver bit, and/or torque bit tip that is sized and adapted to engage said head and/or nut and apply a rotational torque when said ultrasonic or acoustic energy passes into said fastener.

16. The fastener tool as recited in claim 14 wherein said fastener tool comprises a plurality of horns that are sized and adapted for a plurality of fasteners that have a plurality of heads, respectively, of different shapes or sizes.

17. The fastener tool as recited in claim 1 wherein said fastener tool comprises a plurality of horns that are sized and adapted for a plurality of fasteners that have a plurality of heads, respectively, of different shapes or sizes.

18. The fastener tool as recited in claim 1 wherein said horn is configured or adapted to receive a plurality of sockets, screwdriver bits, and/or torque bit tips of different sizes so that said horn may be used to apply said ultrasonic or acoustic energy directly into and through said socket, screwdriver bit, and/or torque bit tip and into said fastener when said fastener is being tightened or loosened.

19. The fastener tool as recited in claim 1 wherein said horn comprises:

a horn body;

at least one replaceable tip that is removably coupled to said horn body.

20. The fastener tool as recited in claim 19 wherein said fastener tool comprises a plurality of interchangeable or replaceable tips of different shapes or sizes to accommodate fasteners of different shapes or sizes, respectively, said at least one replaceable tip being selected from said plurality of interchangeable or replaceable tips.

21. The fastener tool as recited in claim 20 wherein at least one of said plurality of interchangeable or replaceable tips comprises a generally optimized geometry of at least a flat, conical, radial or curved fastener-engaging surface.

22. The fastener tool as recited in claim 19 wherein said horn body comprises a plurality of replaceable tips to accommodate fasteners of different sizes.

23. The fastener tool as recited in claim 19 wherein said horn body is threaded and said at least one replaceable tip comprises mating threads, a thread direction of said horn body threads being a direction opposite a thread direction of threads of said fastener.

24. The fastener tool as recited in claim 19 wherein said horn body is threaded and said at least one replaceable tip comprises mating threads, mating thread on the horn being of a larger diameter than the mating threads on said fastener.

25. The fastener tool as recited in claim 1 wherein said horn comprises a helical or frusto-conical surface for engaging said fastener to apply a longitudinal signal during loosening or tightening of said fastener.

26. The fastener tool as recited in claim 1 wherein said fastener tool comprises a rotational force generator that is separate from said acoustic/ultrasonic generator, said rotational force generator generates said rotational tortional signal and force to rotate said fastener as said acoustic/ultrasonic generator generates said ultrasonic or acoustic energy that passes into said fastener.

27. The fastener tool as recited in claim 1 wherein said fastener tool comprises an energy transfer facilitator for facilitating transferring said ultrasonic or acoustic energy into said fastener.

28. The fastener tool as recited in claim 27 wherein said energy transfer facilitator comprises at least one of a fluid or material is arranged between said horn and at least one of said fastener or a socket, screwdriver bit, and/or torque bit tips mounted on said fastener, said fluid or material absorbing a minimal amount of the acoustic or ultrasonic energy traveling into said fastener.

29. The fastener tool as recited in claim 28 wherein said energy transfer facilitator may comprise not limited to Teflon, oil, water, gel, foam, glycol, glycerin, and/or a polymer film or a minimally energy absorbing spacer.

30. The fastener tool as recited in claim 1 wherein said fastener tool is "dry coupled" such that any contact surfaces that carry or transmit said acoustic or ultrasonic energy to said fastener tool are in direct contact and without any energy transfer facilitation.

31. The fastener tool as recited in claim 1 wherein said fastener is a bolt/screw and/or nut but not limited to an airplane component, large industrial, and/or automotive fastener for fastening at least two components together.

32. The fastener tool as recited in claim 1 wherein said horn comprises a predetermined resonant frequency selected to generally correspond to the fastener resonant frequency.

33. The fastener tool as recited in claim 1 wherein said fastener comprises at least one of a concave end surface, a convex end surface or a flat end surface.

34. The fastener tool as recited in claim 1 wherein said at least one predetermined axis comprises a first predetermined pivot axis, said flexible ultrasonic joint being adapted to permit said horn to pivot at least partially about said first predetermined pivot axis.

35. The fastener tool as recited in claim 1 wherein said flexible ultrasonic joint is adapted to permit said horn to pivot at least partially about a plurality of predetermined pivot axes that are not coaxial with either each other or with a tool axis of said fastener tool.

36. The fastener tool as recited in claim 35 wherein said flexible ultrasonic joint comprises a first pivot joint and a second pivot joint that enable said horn to pivot in a first predetermined plane and a second predetermined plane, respectively, said second predetermined plane being different from said first plane.

37. The fastener tool as recited in claim 36 wherein said second predetermined plane is offset generally 90 degrees relative to said first predetermined plane.

38. The fastener tool as recited in claim 36 wherein said flexible ultrasonic joint comprises a flexible ultrasonic adapter adapted to receive said horn and a flexible ultrasonic coupler adapter coupled to said tool body, said flexible ultrasonic adapter and said flexible ultrasonic coupler being pivotally coupled together to permit said horn to pivot in said first predetermined plane.

39. The fastener tool as recited in claim 38 wherein said intermediate flexible ultrasonic coupler and said flexible ultrasonic coupler are adapted and configured to provide a second pivot connection to permit said horn to at least partially pivot about said first predetermined axis.

40. The fastener tool as recited in claim 38 wherein said flexible ultrasonic coupler comprises a first pair of legs that are generally opposed and spaced and that define a first groove therebetween, said flexible ultrasonic adapter comprising a cooperating mating male projection that is adapted and sized to be received in said first groove and to permit said flexible ultrasonic adapter to pivot in said first predetermined plane and at least partially about said first predetermined pivot axis, wherein said first predetermined pivot axis generally intersects a center axis of said fastener tool.

41. The fastener tool as recited in claim 35 wherein said flexible ultrasonic joint comprises a flexible ultrasonic adapter that is adapted to define or receive said horn or at least one tip, a flexible ultrasonic coupler adapted to be coupled to said tool body, and an intermediate flexible ultrasonic coupler adapted to pivotally couple said flexible ultrasonic adapter to said flexible ultrasonic coupler, said flexible ultrasonic adapter, said flexible ultrasonic coupler and said intermediate flexible ultrasonic coupler being adapted to permit said horn to pivot or be pivoted at least partially about each of said plurality of predetermined pivot axes while substantially simultaneously applying said acoustic or ultrasonic energy that passes through said horn and into said fastener to facilitate fastening or loosening said fastener.

42. The fastener tool as recited in claim 41 wherein said flexible intermediate ultrasonic adapter and said flexible ultrasonic coupler are adapted, configured and cooperate to provide a first fork and tongue coupling and a second fork and tongue coupling, said first and second fork and tongue couplings permitting said horn to at least partially pivot in said first predetermined plane about said first predetermined axis and also permitting said horn to at least partially pivot in said second predetermined plane about said second predetermined when said acoustic or ultrasonic energy passes through said horn and into said fastener to facilitate fastening or loosening said fastener.

43. The fastener tool as recited in claim 41 wherein said flexible ultrasonic coupler comprises a first pair of legs that are generally opposed and spaced and that define a first groove therebetween, said intermediate flexible ultrasonic coupler comprising a first end having a mating male projection adapted and sized to be received in said first groove and pivotally secured together with a first pivot pin, said intermediate flexible ultrasonic coupler comprising a second end having a second pair of legs that are generally opposed and spaced and that define a second groove therebetween, said flexible ultrasonic adapter having a first end adapted to receive said horn and a second end having a second male projection adapted and sized to be received in said second groove and pivotally secured together with a second pivot pin.

44. The fastener tool as recited in claim 1 wherein said flexible ultrasonic joint comprises a first pivot joint that permits said horn to pivot in a first plane.

45. The fastener tool as recited in claim 1 wherein said flexible ultrasonic joint comprises a first pivot joint that permits said horn to pivot in a first plane and a second pivot joint that permits said horn to pivot in a second plane, said second plane being different from said first plane.

46. The fastener tool as recited in claim 1 wherein said second plane is offset approximately 90 degrees relative to said first plane.

47. The fastener tool as recited in claim 1 wherein said first and second flexible ultrasonic joints are pivot pin joints.

48. The fastener tool as recited in claim 1 wherein said fastener tool comprises at least one of a transducer or a booster.

49. A fastener tool for loosening or tightening a fastener mounted on a structure, said fastener tool comprising;

a tool body;

a horn adapted and sized to apply an acoustic or ultrasonic energy into said fastener; and an acoustic/ultrasonic generator for generating said acoustic or ultrasonic energy that passes through said horn and into said fastener to facilitate fastening or loosening said fastener; and a flexible ultrasonic joint that couples said tool body to said horn, said flexible ultrasonic joint permitting said horn to pivot about at least one predetermined axis, said flexible ultrasonic joint being adapted to transmit a rotational torque to said horn and permitting said horn to pivot so that an axis of said horn is not coaxial with an axis of said tool body while transmitting said acoustic or ultrasonic energy to said fastener;

wherein said fastening tool comprises a sleeve for covering said flexible ultrasonic joint and for defining a fluid storage area about said flexible ultrasonic joint for storing a fluid, said fluid facilitating a transfer of said acoustic or ultrasonic energy through said horn and into said fastener to facilitate fastening or loosening said fastener.

50. The fastener tool as recited in claim 49 wherein said sleeve is a flexible and adapted to permit said horn to pivot relative to and axis of said fastener tool and when a torque is applied to said horn.

51. A system for rotating a fastener that is fastened to a structure; said system comprising:

an acoustic/ultrasonic wave generator for generating an acoustic/ultrasonic signal that passes longitudinally through said fastener to elongate said fastener and to introduce a cyclic strain and heating within said fastener to reduce a frictional force between threads on said fastener and mating threads on said structure;

a tool having a horn for transmitting said acoustic/ultrasonic signal into said fastener; and a flexible ultrasonic joint that couples said tool body to said horn, said flexible ultrasonic joint permitting said horn to pivot about at least one predetermined axis, said flexible ultrasonic joint being adapted to transmit a rotational torque to said horn and permitting said horn to pivot relative to said tool body so that an axis of said horn is not coaxial with an axis of said tool body while transmitting said acoustic or ultrasonic energy to said fastener;

wherein said acoustic/ultrasonic wave generator and said horn cooperate to focus or apply said acoustic/ultrasonic signal to a predetermined distance into said fastener in order to reduce a coefficient of friction between said fastener and said structure when said horn is in operative relationship with fastener and said acoustic/ultrasonic signal is applied thereto;

wherein said fastener comprises an end that is directly or indirectly engaged by said horn during loosening or fastening when said acoustic or ultrasonic energy is applied thereto, said acoustic/ultrasonic generator generating said ultrasonic or acoustic energy that travels through said horn and into said fastener and becomes concentrated or focused at a predetermined target location in said fastener;

said predetermined target location being along a length of said fastener so that a friction between threads of said fastener and threads of a structure is at least partly reduced during loosening or tightening.

52. The system as recited in claim 51 wherein said fastener comprises a head and/or nut having a shoulder (if present) that engages said structure at a shoulder engagement area of said structure, said predetermined distance being between the head and/or nut and its mating structure surface(s) along with the mating threads of the fastener and structure(s).

53. The system as recited in claim 52 wherein said predetermined distance is located between the head and/or nut and its mating structure surface(s) along with the mating threads of the fastener and structure(s).

54. The system as recited in claim 51 wherein an end of said fastener comprises a head and/or nut that becomes situated at a head and/or nut engagement area of the structure when said fastener is mounted thereto, a predetermined location being along a length of said fastener and downstream/upstream of said head and/or nut engagement area so that when said acoustic/ultrasonic signal is applied to said fastener, a friction or pressure between the head and/or nut and its mating surface(s) along with the mating threads of the fastener and structure(s) is at least partly reduced.

55. The system as recited in claim 51 wherein said system comprises a rotational torque applicator adapted to apply a rotational torque to said fastener substantially simultaneously as said acoustic/ultrasonic signal passes through said fastener.

56. The system as recited in claim 55 wherein said a rotational torque applicator and said acoustic/ultrasonic wave generator are integrated into a common tool body.

57. The system as recited in claim 51 wherein said horn is sized and adapted to receive a head and/or nut or end of said fastener.

58. The system as recited in claim 51 wherein said flexible ultrasonic joint comprises a first pivot joint that permits said horn to pivot in a first plane.

59. The system as recited in claim 51 wherein said flexible ultrasonic joint comprises a first pivot joint that permits said horn to pivot in a first plane and a second pivot joint that permits said horn to pivot in a second plane, said second plane being different from said first plane.

60. The system as recited in claim 51 wherein said second plane is offset approximately 90 degrees relative to said first plane.

61. The system as recited in claim 51 wherein said first and second flexible ultrasonic joints are pivot pin joints.

62. The system as recited in claim 51 wherein said horn comprises a socket, screwdriver bit, and/or torque bit tip that is sized and adapted to engage said head and/or nut and apply a rotational torque when said acoustic/ultrasonic signal passes into said fastener.

63. The system as recited in claim 51 wherein said system comprises a plurality of horns that are sized and adapted for a plurality of fasteners that have a plurality of heads, respectively, of different shapes or sizes.

64. The system as recited in claim 51 wherein said horn is configured or adapted to receive a plurality of sockets, screwdriver bits, and/or torque bit tips of different sizes so that said horn may be used to apply said acoustic/ultrasonic signal directly into and through said socket, screwdriver bit, and/or torque bit tips and into said fastener when said fastener is being tightened or loosened.

65. The system as recited in claim 51 wherein said horn comprises:

a horn end;

at least one replaceable tip removably coupled to said horn end.

66. The system as recited in claim 65 wherein said horn body comprises a plurality of replaceable tips to accommodate fasteners of different sizes.

67. The system as recited in claim 65 wherein said horn body comprises a threaded aperture and said at least one replaceable tip comprises mating threads, a thread direction of the threads of said horn body being a direction opposite a thread direction of threads of said fastener.

68. The system as recited in claim 65 wherein said horn body is threaded and said at least one replaceable tip comprises mating threads, the horn body threaded diameter being larger than the said fastener threaded diameter.

69. The system as recited in claim 51 wherein said fastener comprises an end that is engaged by said horn during loosening or fastening, said acoustic/ultrasonic generator generating said acoustic/ultrasonic signal that travels into said fastener said predetermined distance and becomes concentrated or focused at a predetermined location in said fastener.

70. The system as recited in claim 69 wherein said end comprises a head and/or nut that engages a mating surface of said structure at a head and/or nut engagement area where said head and/or nut engages said structure when said fastener is mounted thereto, said predetermined location being downstream/upstream of said head and/or nut engagement area so that when said acoustic/ultrasonic signal is applied to said fastener, a friction or pressure between the head and/or nut and its mating surface(s} along with the mating threads of the fastener and structure(s) is at least partly reduced.

71. The system as recited in claim 51 wherein said horn is configured or adapted to receive a plurality of sockets, screwdriver bits, and/or torque bit tips of different sizes so that said horn may be used to apply said acoustic/ultrasonic signal directly into and through said socket, screwdriver bit, and/or torque bit tips and into said fastener when said fastener is being tightened or loosened.

72. The system as recited in claim 51 wherein said acoustic/ultrasonic generator applies said acoustic/ultrasonic signal at a frequency equal to or larger than 1 kHz.

73. The system as recited in claim 51 wherein said fastener has a head and/or nut, said horn comprises an end that is adapted and sized to receive said head and/or nut and to apply a tightening or fastening torque to said head and/or nut while said acoustic/ultrasonic signal passes therethrough.

74. The system as recited in claim 51 wherein said tool comprises a plurality of horns that are sized and adapted for a plurality of fasteners that have a plurality of heads, respectively, of different shapes or sizes.

75. The system as recited in claim 51 wherein said system comprises an energy transfer facilitator for facilitating transferring said acoustic/ultrasonic signal into said fastener.

76. The system as recited in claim 75 wherein said energy transfer facilitator comprises at least one of a fluid or material is arranged between said horn and at least one of said fastener or a socket, screwdriver bit, and/or torque bit tips mounted on said fastener, said fluid or minimally absorbing material of said acoustic/ultrasonic signal traveling into said fastener.

77. The system as recited in claim 75 wherein said energy transfer facilitator may comprise but not limited to Teflon, oil, water, gel, foam, glycol, glycerin, and/or a polymer film or a minimally energy absorbing spacer.

78. The system as recited in claim 51 wherein said fastener tool is "dry coupled" such that any contact surfaces that carry or transmit said acoustic or ultrasonic energy to said fastener tool are in direct contact and without any energy transfer facilitation.

79. A system for rotating a fastener that is fastened to a structure; said system comprising:

an acoustic/ultrasonic wave generator for generating an acoustic/ultrasonic signal that passes longitudinally through said fastener to elongate said fastener and to introduce a cyclic strain and heating within said fastener to reduce a frictional force between threads on said fastener and mating threads on said structure;

a tool having a horn for transmitting said acoustic/ultrasonic signal into said fastener; and a flexible ultrasonic joint that couples said tool body to said horn, said flexible ultrasonic joint permitting said horn to pivot about at least one predetermined axis, said flexible ultrasonic joint being adapted to transmit a rotational torque to said horn and permitting said horn to pivot so that an axis of said horn is not coaxial with an axis of said tool body while transmitting said acoustic or ultrasonic energy to said fastener;

wherein said acoustic/ultrasonic wave generator and said horn cooperate to focus or apply said acoustic/ultrasonic signal to a predetermined distance into said fastener in order to reduce a coefficient of friction between said fastener and said structure when said horns is in operative relationship with said fastener and said acoustic/ultrasonic signal is applied thereto;

wherein said fastening tool comprises a sleeve for covering said flexible ultrasonic joint and for defining a storage area about said flexible ultrasonic joint for storing a fluid, said fluid facilitating a transfer of said acoustic or ultrasonic energy through said horn and into said fastener to facilitate fastening or loosening said fastener.

80. The system as recited in claim 79 wherein said sleeve is a flexible and adapted to permit said horn to pivot relative to and axis of said fastener tool and when a torque is applied to said horn.

81. An ultrasonic fastener tool for loosening or tightening a fastener, said ultrasonic fastener tool comprising:

a horn body adapted to receive ultrasonic or acoustic energy from an ultrasonic generator and transmit acoustic or ultrasonic energy into the fastener;

a horn end also adapted to transmit said acoustic or ultrasonic energy, said horn end being sized and adapted to receive at least a portion of said fastener so that said acoustic or ultrasonic energy may be applied to the fastener; and a flexible ultrasonic joint coupling the horn body to the horn end and permitting said horn end to pivot in at least one plane and at least partially about one pivot axis;

a flexible ultrasonic joint that couples said tool body to said horn, said flexible ultrasonic joint permitting said horn to pivot about at least one predetermined axis, said flexible ultrasonic joint being adapted to transmit a rotational torque to said horn and permitting said horn to pivot so that an axis of said horn is not coaxial with an axis of said tool body while transmitting said acoustic or ultrasonic energy to said fastener;

wherein said fastener comprises an end that is directly or indirectly engaged by said horn during loosening or fastening when said acoustic or ultrasonic energy is applied by thereto; said ultrasonic generator generating said ultrasonic or acoustic energy that travels through said horn and into said fastener and becomes concentrated or focused at a predetermined target location in said fastener;

said predetermined target location being along a length of said fastener so that a friction between threads of said fastener and threads of a structure is at least partly reduced during loosening or tightening;

said predetermined target location of concentrated or focused energy being along a length of said fastener between a head and/or nut and an opposite end of said fastener, thereby facilitating reducing a breaking force necessary to loosen said fastener or a tightening force for tightening said fastener.

82. The ultrasonic fastener tool as recited in claim 81 wherein said flexible ultrasonic joint comprises a single pivot joint that permits said horn end to pivot in a first predetermined plane and at least partially about a first predetermined axis.

83. The ultrasonic fastener tool as recited in claim 82 wherein said single pivot joint comprises a plurality of parts having a plurality of engaging surfaces, respectively, said plurality of engaging surfaces comprising no fluid gap or spacing and defining or providing a "dry" engagement so that said plurality of engaging surfaces engage in order to facilitate transfer of the acoustic or ultrasonic energy to said horn end and ultimately to said fastener when said ultrasonic fastener tool is used to loosen or tighten said fastener.

84. The ultrasonic fastener tool as recited in claim 83 wherein said plurality of engaging surfaces, respectively, said plurality of engaging surfaces are curved or angled to facilitate focusing said acoustic or ultrasonic energy through said plurality of parts.

85. The ultrasonic fastener tool as recited in claim 82 wherein said flexible ultrasonic joint comprises a plurality of parts having a plurality of engaging surfaces, respectively, each of said plurality of engaging surfaces comprising a fluid gap or spacing therebetween for receiving an ultrasonic fluid and defining or providing a "wet" joint so that said ultrasonic fluid facilitates transferring said acoustic or ultrasonic energy directly between such plurality of engaging surfaces in order to facilitate transfer of the acoustic or ultrasonic energy to said horn end and ultimately to said ultrasonic fastener when said ultrasonic fastener tool is used to loosen or tighten said fastener.

86. The ultrasonic fastener tool as recited in claim 81 wherein said flexible ultrasonic joint comprises a dual pivot joint that permits said horn end to pivot in a first predetermined plane and a second predetermined plane and at least partially about a second predetermined axis, respectively.

87. The ultrasonic fastener tool as recited in claim 86 wherein said dual pivot joint comprises a plurality of parts having a plurality of engaging surfaces, respectively, said plurality of engaging surfaces comprising no fluid gap or spacing and defining or providing a "dry" engagement so that said plurality of engaging surfaces engage in order to facilitate transfer of the acoustic or ultrasonic energy to said horn end and ultimately to said fastener when said ultrasonic fastener tool is used to loosen or tighten said fastener.

88. The ultrasonic fastener tool as recited in claim 87 wherein said plurality of engaging surfaces, respectively, said plurality of engaging surfaces are curved or angled to facilitate focusing said acoustic or ultrasonic energy through said plurality of parts.

89. The ultrasonic fastener tool as recited in claim 86 wherein said flexible ultrasonic joint comprises a plurality of parts having a plurality of engaging surfaces, respectively, each of said plurality of engaging surfaces comprising a fluid gap or spacing therebetween for receiving an ultrasonic fluid and defining or providing a "wet" joint so that said ultrasonic fluid facilitates transferring said acoustic or ultrasonic energy directly between such plurality of engaging surfaces in order to facilitate transfer of the acoustic or ultrasonic energy to said horn end and ultimately to said ultrasonic fastener when said ultrasonic fastener tool is used to loosen or tighten said fastener.

90. The ultrasonic fastener tool as recited in claim 81 wherein said flexible ultrasonic joint comprising a plurality of parts having a plurality of engaging surfaces, respectively, said plurality of engaging surfaces comprising no fluid gap or spacing and defining or providing a "dry" engagement so that said plurality of engaging surfaces engage in order to facilitate transfer of the acoustic or ultrasonic energy to said horn end and ultimately to said fastener when said ultrasonic fastener tool is used to loosen or tighten said fastener.

91. The ultrasonic fastener tool as recited in claim 90 wherein said plurality of engaging surfaces, respectively, said plurality of engaging surfaces are curved or angled to facilitate focusing said acoustic or ultrasonic energy through said plurality of parts.

92. The ultrasonic fastener tool as recited in claim 81 wherein said flexible ultrasonic joint comprises plurality of parts having a plurality of engaging surfaces, respectively, each of said plurality of engaging surfaces comprising a fluid gap or spacing therebetween for receiving an ultrasonic fluid and defining or providing a "wet" joint so that said ultrasonic fluid facilitates transferring said acoustic or ultrasonic energy directly between such plurality of engaging surfaces in order to facilitate transfer of the acoustic or ultrasonic energy to said horn end and ultimately to said ultrasonic fastener when said ultrasonic fastener tool is used to loosen or tighten said fastener.

93. The ultrasonic fastener tool as recited in claim 81 wherein said horn body and said horn end are adapted and configured to be pivotally coupled together so that said horn end may pivot with respect to said horn body while said acoustic or ultrasonic energy is being applied to said fastener of engaging surfaces.

94. The ultrasonic fastener tool as recited in claim 93 wherein a first pivot pin joint pivotally secures said horn body to said horn end.

95. The ultrasonic fastener tool as recited in claim 81 wherein said ultrasonic fastener tool comprises at least one intermediate coupler for pivotally coupling said horn body to said horn end, said at least one intermediate coupler adapted and configured to pivotally couple said horn body to said horn end so that said horn end may pivot with respect to said horn body in said plurality of planes and at least partially about said plurality of axes.

96. The ultrasonic fastener tool as recited in claim 95 wherein a first pivot pin joint pivotally secures said horn body to a first end of said intermediate coupler and a second pivot pin joint pivotally secures said horn end to a second end of said intermediate coupler; said first pivot pin joint permitting said horn end to pivot at least partially about a first pivot axis and said second pivot pin joint permitting said horn end to pivot at least partially about a second pivot axis that is not the same as the first pivot axis.

97. The ultrasonic fastener tool as recited in claim 96 wherein a first pivot axis and said second pivot axis is offset by about 90 degrees.

98. The ultrasonic fastener tool as recited in claim 95 wherein said intermediate coupler comprises a groove on one end for pivotally receiving a male projection of said horn body and an intermediate coupler male projection for pivotally coupling to an end of said horn body.

99. The ultrasonic fastener tool as recited in claim 95 wherein said intermediate coupler comprises a first channel or groove on a first end for pivotally receiving a male projection of said horn end and permitting said horn end to at least partially pivot about a first predetermined axis, said intermediate coupler also comprises a second channel or groove on a second end for receiving a second male projection for permitting said horn end to at least partially pivot about a second predetermined axis.

100. An ultrasonic fastener tool for loosening or tightening a fastener, said ultrasonic fastener tool comprising;

a horn body adapted to transmit acoustic or ultrasonic energy;

a horn end also adapted to transmit said acoustic or ultrasonic energy, said horn end being sized and adapted to receive at least a portion of said fastener so that said acoustic or ultrasonic energy may be applied to said fastener; and a flexible ultrasonic joint coupling said horn body end and permitting said horn end to pivot in at least one plane and at least partially about one pivot axis;

wherein said flexible ultrasonic joint comprises a plurality of parts having a plurality of engaging surfaces, respectively, each of said plurality of engaging surfaces comprising a fluid gap or spacing therebetween for receiving an ultrasonic fluid and defining or providing a “wet” joint so that said ultrasonic fluid facilitates transferring said acoustic or ultrasonic energy directly between said plurality of engaging surfaces in order to facilitate transfer of said acoustic or ultrasonic energy to said horn end and ultimately to said ultrasonic fastener when said ultrasonic fastener tool is used to loosen or tighten said fastener;

wherein said ultrasonic fastener tool comprises a boot or sleeve that surrounds said flexible ultrasonic joint to retain said ultrasonic fluid about said flexible ultrasonic joint.

101. An ultrasonic fastener tool for loosening or tightening a fastener, said ultrasonic fastener tool comprising:

a horn body adapted to transmit acoustic or ultrasonic energy;

a horn end also adapted to transmit said acoustic or ultrasonic energy, said horn end being sized and adapted to receive at least a portion of said fastener so that said acoustic or ultrasonic energy may be applied to said fastener; and a flexible ultrasonic joint coupling said horn body to said horn end and permitting said horn end to pivot in at least one plane and at least partially about one pivot axis;

wherein said flexible ultrasonic joint comprises a single pivot join that permits said horn end to pivot in a first predetermined plane and at least partially about a first predetermined axis;

wherein said flexible ultrasonic joint comprises a plurality of parts having a plurality of engaging surfaces, respectively, each of said plurality of engaging surfaces comprising a fluid gap or spacing therebetween for receiving an ultrasonic fluid and defining or providing a “wet” joint so that said ultrasonic fluid facilitates transferring said acoustic or ultrasonic energy directly between said plurality of engaging surfaces in order to facilitate transfer of said acoustic or ultrasonic energy to said horn end and ultimately to said ultrasonic fastener when said ultrasonic fastener tool is used to loosen or tighten said fastener;

wherein said ultrasonic fastener tool comprises a boot or sleeve that surrounds said flexible ultrasonic joint to retain said ultrasonic fluid about said flexible ultrasonic joint.

102. An ultrasonic fastener tool for loosening or tightening a fastener, said ultrasonic fastener tool comprising:

a horn body adapted to transmit acoustic or ultrasonic energy;

a horn end also adapted to transmit said acoustic or ultrasonic energy, said horn end being sized and adapted to receive at least a portion of said fastener so that said acoustic or ultrasonic energy may be applied to said fastener; and a flexible ultrasonic joint coupling said horn body to said horn end and permitting said horn end to pivot in at least one plane and at least partially about one pivot axis;

wherein said flexible ultrasonic joint comprises a dual pivot join that permits said horn end to pivot in a first predetermined plane and a second predetermined plane an at least a partially about a second predetermined axis, respectively;

wherein said flexible ultrasonic joint comprises a plurality of parts having a plurality of engaging surfaces, respectively, each of said plurality of engaging surfaces comprising a fluid gap or spacing therebetween for receiving an ultrasonic fluid and defining or providing a “wet” joint so that said ultrasonic fluid facilitates transferring said acoustic or ultrasonic energy directly between said plurality of engaging surfaces in order to facilitate transfer of the acoustic or ultrasonic energy to said horn end and ultimately to said ultrasonic fastener when said ultrasonic fastener tool is used to loosen or tighten said fastener;

wherein said ultrasonic fastener tool comprises a boot or sleeve that surrounds said flexible ultrasonic joint to retain said ultrasonic fluid about said flexible ultrasonic joint.

* * * * *